(12) United States Patent
Rodriguez et al.

(10) Patent No.: US 10,259,719 B2
(45) Date of Patent: Apr. 16, 2019

(54) PROCESS FOR OBTAINING LITHIUM FROM ALUMINOSILICATES AND INTERMEDIATE COMPOUNDS

(71) Applicants: INIS BIOTECH LLC, Milford, DE (US); CONSEJO NACIONAL DE INVESTIGACIONES CIENTIFICAS Y TECNICAS (CONICET), Ciudad Autonoma de Buenos Aires (AR); UNIVERSIDAD NACIONAL DE CUYO, Prov. de Mendoza, Ciudad de Mendoza (AR)

(72) Inventors: Mario Humberto Rodriguez, Pcia. de Mendoza (AR); Gustavo Daniel Rosales, Pcia. de Mendoza (AR); Maria del Carmen Ruiz, Pcia. de San Luis (AR)

(73) Assignees: Inis Biotech LLC, Milford, DE (US); Consejo Nacional De Investigaciones Cientificas Y Tecnicas (Conicet), Ciudad Autonoma de Buenos Aires (AR); Universidad Nacional De Cuyo, Prov. de Mendoza (AR)

( * ) Notice: Subject to any disclaimer, the term of this patent is extended or adjusted under 35 U.S.C. 154(b) by 0 days.

(21) Appl. No.: 15/302,434

(22) PCT Filed: Apr. 7, 2015

(86) PCT No.: PCT/IB2015/052512
§ 371 (c)(1),
(2) Date: Oct. 6, 2016

(87) PCT Pub. No.: WO2015/155684
PCT Pub. Date: Oct. 15, 2015

(65) Prior Publication Data
US 2017/0022068 A1    Jan. 26, 2017

(30) Foreign Application Priority Data
Apr. 9, 2014 (AR) .............................. 20140101536

(51) Int. Cl.
*C01D 15/08* (2006.01)
*C01D 15/04* (2006.01)
*C22B 3/06* (2006.01)
*C22B 3/12* (2006.01)

(52) U.S. Cl.
CPC ............. *C01D 15/08* (2013.01); *C01D 15/04* (2013.01); *C22B 3/06* (2013.01); *C22B 3/12* (2013.01)

(58) Field of Classification Search
CPC .................................................... C01D 15/08
See application file for complete search history.

(56) References Cited

U.S. PATENT DOCUMENTS

| 2,942,940 A | 6/1960 | Osthoff et al. |
| 3,151,934 A | 10/1964 | King |
| 4,159,308 A | 6/1979 | Mclaughlin |
| 2012/0189516 A1 | 7/2012 | Donaldson et al. |

FOREIGN PATENT DOCUMENTS

| CN | 101235441 B | 9/2010 |
| CN | 102690961 A1 | 9/2012 |
| RU | 2168556 C1 | 6/2001 |
| RU | 2262544 C1 | 10/2005 |

OTHER PUBLICATIONS

Sitando, 0 et al.; "Processing of a Zimbabwean petalite to obtain lithium carbonate"; International Journal of Mineral Processing 102-103; 2012; p. 45-50.

*Primary Examiner* — Stuart L Hendrickson
(74) *Attorney, Agent, or Firm* — Muncy, Geissler, Olds & Lowe, P.C.

(57) ABSTRACT

Process for obtaining lithium compounds and intermediate compounds, comprising the following steps: a) contacting aluminosilicate particles, for example α-spodumene, with at least one fluorine compound, for example HF, NaF or others; b) stirring the mixture increasing the temperature until reaching an appropriate temperature; c) carrying out at least a precipitation and filtration process of the mixture of step b), and, d) recovering the lithium compound. The process may comprise using HF at a concentration between 5 and 30% v/v or NaF at a concentration between 5 and 30% w/v; a solid/liquid ratio of step a) between 0.9 and 14.4% w/v; a particle size of between 29 and 200 μm. The final lithium product of the process may be lithium carbonate or lithium fluoride.

8 Claims, 75 Drawing Sheets

PROCESS FOR OBTAINING LITHIUM FROM ALUMINOSILICATES AND INTERMEDIATE COMPOUNDS

The present invention relates to a process for obtaining lithium compounds and intermediate compounds comprising the following steps: a) contacting aluminosilicate particles, for example α-spodumene, lepidolite or petalite, with at least a fluorine compound, for example HF or NaF or KF or $NH_4FHF$ or $CaF_2$ and an acid, for example HCl, $H_2SO_4$, $HNO_3$ and $H_2C_2O_4$; b) stirring the mixture increasing the temperature until reaching an appropriate temperature; c) carrying out at least a precipitation and filtration process of the mixture of step b), and d) recovering the lithium compound. The process may comprise using HF at a concentration of between 5 and 30% v/v or NaF or KF at a concentration of between 5 and 30% w/v; $NH_4FHF$ at a concentration of between 5 and 20% w/v or $CaF_2$ at a concentration of between 10 and 30% w/v; a solid/liquid ratio of the step a) of between 0.9 and 14.4% w/v; a particle size of between 29 and 200 μm. The final product of the process may be lithium carbonate or lithium fluoride.

BACKGROUND

Nowadays, Lithium (Li) is considered a strategic metal whose use has been significantly expanded. Among other applications, Li and its compounds are used in the manufacturing of lubricants, in the manufacturing of glass and special alloys. Moreover, it forms part of medicament formulation for psychiatric medication. The current high demand constitutes its use as a component of the Li ion and Lithium-polymer type batteries, used in calculators, video recorders, laptop computers, cell phones and other electronic equipment, as well as in weapons and automatic probe equipment. In the case of larger batteries, its use is extended to communications equipment as well as the automotive industry. A potentially important use of lithium is atomic fusion, wherein by means of bombardment with neutrons, isotope 6 of lithium is transformed in tritium which in turn, is fused with deuterium to form helium, both reactions producing a great amount of energy. In this context, it is essential to develop new techniques which allow for its extraction from primary sources poorly exploited.

Lithium is a relatively rare metal in nature, however, it is found in many minerals due to its high chemical reactivity. Nevertheless, a few minerals exist which are commercially useful for the production of lithium, being spodumene the most important, which generally is found mixed with quartz, feldspar and mica, with a maximum theoretical $Li_2O$ content of 8.03%.

In Argentina, the main lithium deposits are divided into those from salt lakes and those of spodumene. The salt lake with the highest lithium content is located between the provinces of Salta and Catamarca, and is known as "El Salar del Hombre Muerto", with an amount of 800,000 tons of lithium. The main reservoirs of spodumene are located in the provinces of Salta, San Luis and Córdoba, and are characterized by having a large mineralogical variability.

Spodumene has the formula $LiAlSi_2O_6$. At temperatures higher than 1000° C. natural phase α-spodumene undergoes an irreversible change to phase β-spodumene, this phase change requires an important energy load which increases the process cost.

The most widely used methodologies for the extraction of lithium from spodumene at an industrial level may be divided into:

A) acid digestion, by lixiviating the β-spodumene mineral with concentrated sulfuric acid at a temperature above 250° C. The obtained lithium sulfate is converted into lithium carbonate by adding calcium carbonate to the pulp, this being the final product of the process;

B) alkaline digestion, where α-spodumene is treated with CaO at 1040° C., to obtain lithium oxide, which is then hydrolyzed to obtain lithium hydroxide as a final product;

C) ion exchange, where β-spodumene is heated with sodium or potassium carbonates at 400° C., to produce an exchange of the cation of the carbonate for $Li^+$. The final product obtained is lithium carbonate.

In the state of the art several processes have been disclosed, for example, dissolution of β-spodumene in autoclave at temperatures above 250° C. Other authors suggest the combination of pyro- and hydrometallurgical processes, first carrying out the calcination of β-spodumene with some Na or Ca salt ($Cl^-$, $SO_4^{-2}$, $CO_3^{-2}$) and then, dissolution in water of the mixture obtained.

Lepidolite has a theoretical content of $Li_2O$ of 4%, together with petalite, they are mainly used as minerals in glass and ceramic industry.

The most widely used methodologies for the extraction of lithium from lepidolite or petalite at an industrial level are, similarly to spodumene: acid or alkaline digestion and ion exchange, similar to those used for the processing of spodumene, previously described.

Petalite has a theoretical content of $Li_2O$ of 4.9%, has the formula $LiAlSi_4O_{10}$. At temperatures above 1100° C. it undergoes an irreversible change to phase β-spodumene and $SiO_2$, this phase change requires a great energy load and hence increases the costs of the process.

BRIEF DESCRIPTION OF THE INVENTION

A process for obtaining lithium compounds comprising at least the following steps:
  a) contacting aluminosilicate particles with at least one fluorine compound;
  b) stirring the mixture while heating until reaching a temperature between 75 and 220° C.;
  c) carrying out at least a precipitation and filtration process of the mixture of step b); and
  d) recovering the lithium compounds.

The fluorine compound may be any fluorine compound, for example HF, NaF, KF, $NH_4FHF$, $CaF_2$ or combinations thereof. When the fluorine compound is HF, the same is present at a concentration between 5 and 30% v/v. When the fluorine compound is NaF, the same is present at a concentration between 5 and 30% w/v. When the fluorine compound is KF the same is present at a concentration of between 5 and 30% w/v. When the fluorine compound is $NH_4FHF$ the same is present at a concentration of between 5 and 20% w/v. When the fluorine compound is $CaF_2$ the same is present at a concentration of between 10 and 30% w/v. In the process, the solid/liquid ratio of step a) is comprised between 0.9 and 14.4% w/v and the aluminosilicate particles have a particle size of between 29 and 200 μm. In a preferred embodiment, the aluminosilicate may be α-spodumene, lepidolite or petalite. In step b) stirring is carried out at a speed up to 1100 rpm. The lithium compound obtained may be lithium carbonate or lithium fluoride.

The process may further comprise in step a), contacting the aluminosilicate particles with an acid, such as HCl, $H_2SO_4$, $HNO_3$ and $H_2C_2O_4$, wherein the $H_2SO_4$ acid is added at a concentration between 4 and 20% v/v; the HCl acid is added at a concentration between 7 and 40% v/v; the HNO₃ acid is added at a concentration between 7 and 40% v/v; the $H_2C_2O_4$ acid is added at a concentration between 5 and 20% w/v. In step a), the process may further comprise adding NaCl at a concentration between 5 and 20% w/v.

The process may also be useful for obtaining intermediates such as $Na_3AlF_6$, $Na_2SiF_6$, $Fe(OH)_3$, $CaF_2$, $K_2SiF_6$, $(NH_4)_3AlF_6$, $(NH_4)_2SiF_6$.

DETAILED DESCRIPTION OF THE INVENTION

The present invention relates to a process for recovering Li from the processing of α-spodumene. The process is carried out in two steps: In the first step, dissolution of the mineral α-spodumene is carried out with an acid, for example, dilute hydrofluoric acid, in a closed vessel; in the second step, separation of Li from the lixiviates of the previous step is carried out by precipitation thereof as, for example, lithium carbonate.

The claimed process, as opposed to the state of the art, has as a starting material or raw material, the natural phase α-spodumene, thereby preventing the transformation of the phase β-spodumene. The present process allows to obtain a high dissolution of α-spodumene at temperatures below 170° C. and in the presence of HF in a dilute solution. The dissolution reaction which takes place has a great selectivity.

In the separation step, besides obtaining the compound of interest ($Li_2CO_3$), by-products and raw materials of high value and great industrial application are obtained, such as: cryolite, mainly used as a flux in the electrolysis process for obtaining metallic aluminum and sodium hexafluorosilicate, useful as an antiseptic in the wood industry, as an acid-resistant hygroscopic agent in concrete; additive in zinc, iron and nickel plates; plastic fillers; fluorinating agent in pharmaceutical products and drinking water.

Experimental tests were carried out in a 450 mL Parr reactor built in Monel alloy, provided with an electromagnetic stirring system, a heating mantle and a controlling unit.

The mineral used was α-spodumene from the mines located in the San Martin Department, in the province of San Luis, Argentina.

Characterization of the mineral by X-ray diffraction (XRD) was performed in a Rigaku D-Max III C diffractometer, operated at 35 kV and 30 mA and using Cu Kα radiation and a Ni filter, λ=0.15418 nm. Whereas, morphological analysis was performed by means of scanning electron microscopy (SEM) on a LEO 1450VP microscope equipped with an EDAX energy-dispersive X-ray spectrometer, Genesis 2000, which was used to determine the semi quantitative composition of the precipitates. Analysis by atomic absorption spectrometry (AAS) was performed using a Varian SpectrAA 55 spectrometer and X-Ray Fluorescence (XRF) analysis was performed on a Philips PW 1400 apparatus.

Table 1 shows overall composition of the mineral as determined by AAS and XRF.

TABLE 1

| Overall composition of the mineral | | | | | |
|---|---|---|---|---|---|
| Compound | % (w/w) | Compound | % (w/w) | Compound | % (w/w) |
| $SiO_2$ | 68.1 | CaO | 0.52 | $Na_2O$ | 1.8 |
| $Al_2O_3$ | 18.6 | MgO | 0.3 | $Li_2O$ | 7.03 |
| $Fe_2O_3$ | 3.1 | $K_2O$ | 0.14 | $TiO_2$ | 0.11 |

Figure 1:
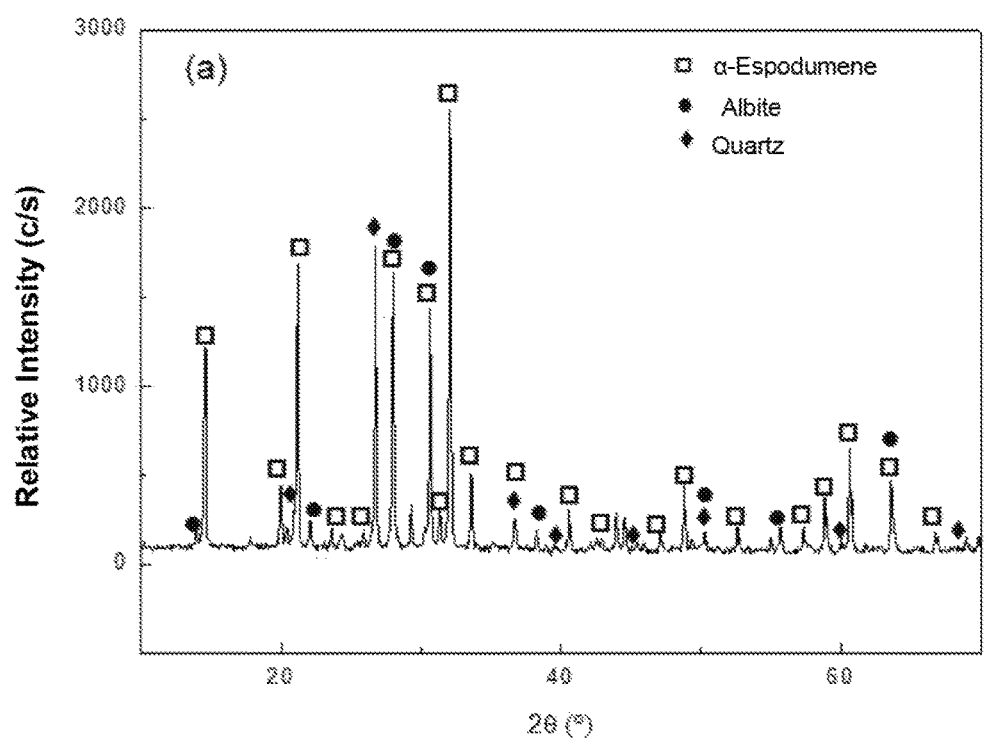
FIG. 1. Diffractograms of the α-spodumene mineral.

The results obtained from the characterization by XRD are shown in FIG. 1, wherein the sample is shown to be mainly composed of α-spodumene (JCPDS 33-786), together with albite (ICDD 96-900-1631) and quartz (JCPDS 33-1161).

Quartz content of the sample was 8% w/w, as determined by XRD using the method of standard addition (diffraction line 26.7 degrees of $SiO_2$ as the standard) and the albite content (6.74% w/w) was calculated from sodium content as determined by AAS.

In a preferred embodiment, the lixiviating agent used for all tests was hydrofluoric acid (HF) either alone or in combination with an acid or a salt. In another preferred embodiment, the lixiviating agent was sodium fluoride (NaF) combined with an acid.

For example, in one embodiment the procedure was as follows: a known mass of mineral was placed in the reactor and a volume of 275 ml of the lixiviating solution was added. The mixture was then heated with stirring and using a heating rate comprised between 5 and 10° C./min, according to the working temperature. The reaction time was recorded from the moment the set temperature for each test was reached. After this time, the reactor was allowed to cool down for about 25 min without stirring. The content of the reactor was filtered, dried at 75° C. and then weighed.

Then, Li recovery was carried out in four steps. Said recovery was performed from the filtrates of α-spodumene dissolutions with HF showing values higher than 80%. The working methodology used in each separation step was as follows: a volume of filtrate to be treated and a known mass of the solution of precipitating agent were added to a Teflon vessel. This mixture was continuously stirred at 330 rpm for 30 min. After that time, stirring was suspended leaving the mixture at rest for 20 min. Then, the content of the vessel was filtrated, dried in stove and finally weighed. All the solids obtained in each one of the separation steps were then characterized by XRD.

The following reaction would correspond to the dissolution of α-spodumene:

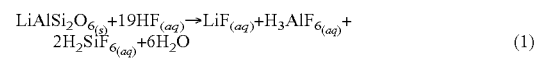

$$LiAlSi_2O_{6(s)} + 19HF_{(aq)} \rightarrow LiF_{(aq)} + H_3AlF_{6(aq)} + 2H_2SiF_{6(aq)} + 6H_2O \quad (1)$$

The course of the dissolution reaction was followed by using the expression below to define the extent of dissolution:

$$X\% = \left(\frac{m_i - m_f}{m_i}\right) \times 100 \quad (2)$$

Wherein: X %, is the conversion percentage; $m_i$, is the initial mass of the mineral and $m_f$, is the final mass of the residue after lixiviation.

The studied operation variables were: temperature; solid-liquid (S/L) ratio; HF concentration; reaction time; stirring speed and particle size.

Figure 2:
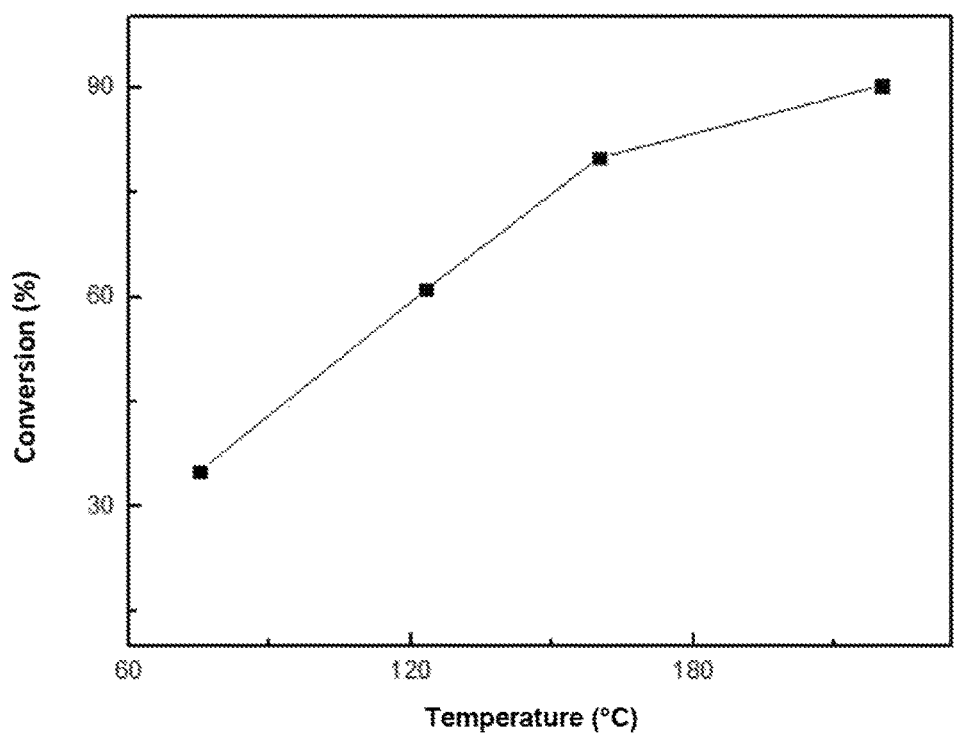
FIG. 2. A graph is shown of the effect of the reaction temperature on the conversion of α-spodumene (HF 7% v/v).
Figure 3:
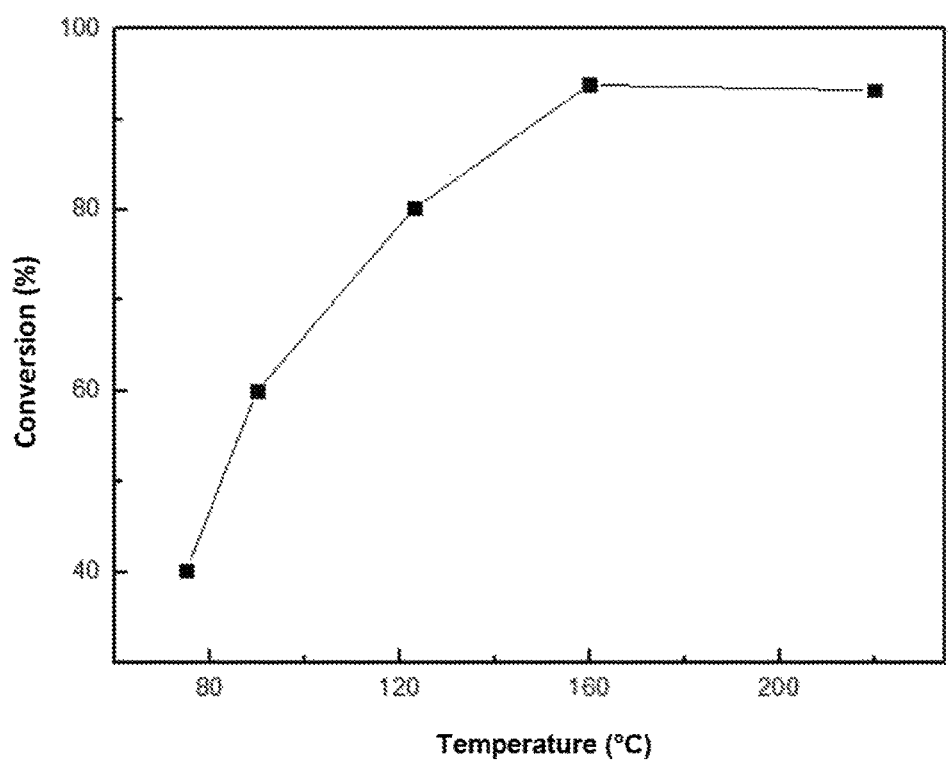
FIG. 3. A graph is shown of the effect of the reaction temperature on the conversion of α-spodumene (HF 15% v/v).

Temperature effect: the effect of the reaction temperature was studied on the dissolution of α-spodumene. The results are shown in FIGS. 2 and 3. For these assays, the operation variables that were kept constant were the following: solid liquid ratio, 1.82% w/v; stirring speed, 330 rpm; reaction time 120 min and a particle size comprised between 29 and 45 μm. Used HF concentrations were, HF 7% (v/v) and HF 15% (v/v).

FIGS. 2 and 3 show that the dissolution of the mineral increases as reaction temperature increases. These results are consisting with the known effect of temperature on reactivity of solids, favoring the dissolution reaction.

FIG. 2 shows that by working at 220° C. with an HF concentration slightly above the stoichiometric value (7% v/v) calculated for reaction (1), a dissolution of the mineral close to 90% was obtained.

On the other hand, it may be seen in FIG. 3 that by working at HF concentrations higher than that stoichiometrically calculated from reaction (1), 7% v/v, conversions higher than 90% are achieved as from 160° C. This way, by working with HF concentrations close to 15% v/v the working temperature may be reduced, thereby achieving important dissolution of the mineral.

Effect of the solid-liquid (S/L) ratio: the effect of the S/L ratio has been studied for the following values: 0.9, 1.8, 3.6, 7.2 and 14.4% w/v, and HF concentrations of 7, 14, 21, 28 and 35% v/v, respectively. The other operation variables were kept constant at the following values: temperature, 123° C.; stirring speed, 330 rpm; particle size, between 29 and 45 μm and reaction time, 60 min (FIG. 4).

Figure 4:
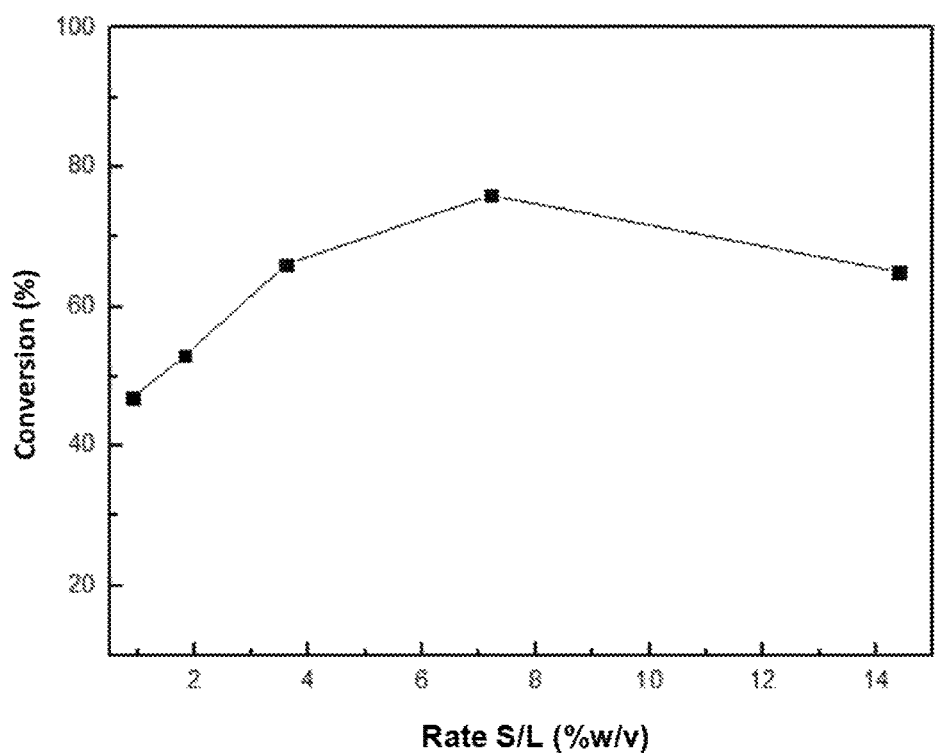
FIG. 4. A graph is shown of the effect of the (solid/liquid) S/L ratio on the conversion of α-spodumene.

As can be seen in FIG. 4, the increase in the S/L ratio shows a marked effect on dissolution of the mineral, thus causing an increase in conversion thereof. This increase is due to the low values of S/L ratio, the lixiviating agent is more diluted, as the S/L ratio is increased, the HF concentration is also increased, leading to a higher dissolution of the mineral. This effect is observed up to a value of 7.2% w/v. Above this value, conversion of the mineral begins to decrease. This is due to the fact that for high S/L ratios (14.4% w/v) the HF concentration is very high (35% v/v) for said S/L ratio, leading to precipitation of fluorinated compounds. These results were confirmed by XRD and EMPA analysis.

Effect of HF concentration: the assays for mineral lixiviation with different HF concentrations were performed using a particle size comprised between 29 and 45 μm, a reaction time of 60 min and a stirring speed of 330 rpm.

Figure 5:
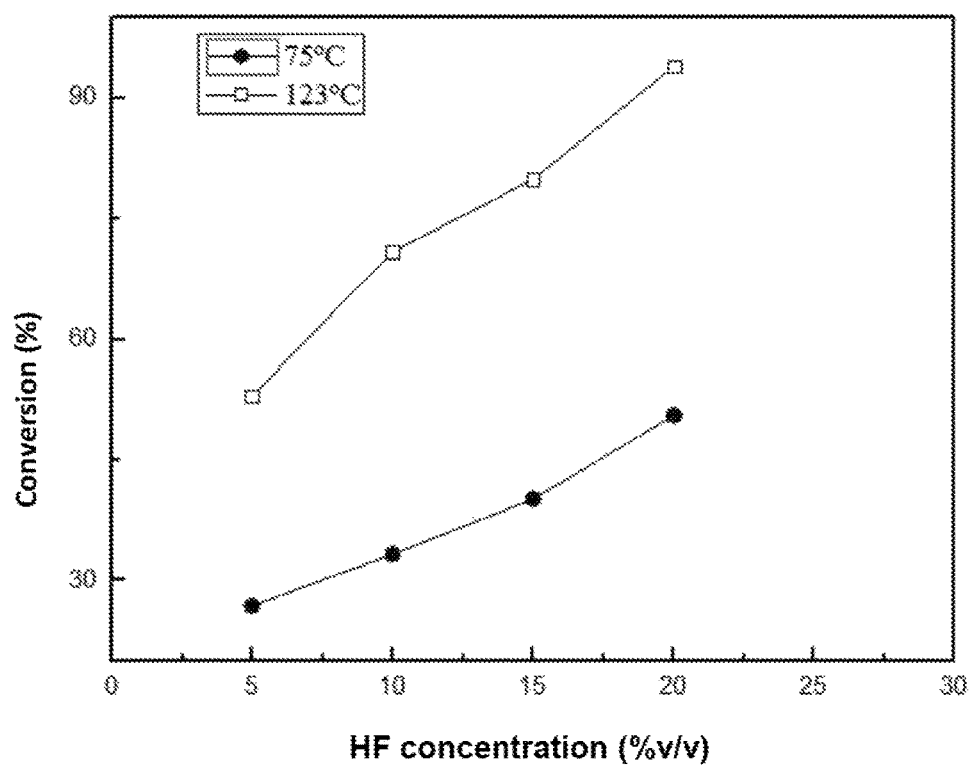
FIG. 5. The effect of HF concentration is shown on the conversion of α-spodumene (●75° C. and □123° C.).

Effect of HF concentration at 75 and 123° C.: FIG. 5 shows the results obtained for the effect of the HF concentration on the dissolution of α-spodumene working between 75 and 123° C. for a S/L ratio of 1.82% w/v. It can be seen that the increase in the concentration of lixiviating agent produces an increase in the dissolution of the mineral. This is due to the fact that at higher HF concentrations there is a higher availability of $F^-$ and $H^+$ ions for reacting with the mineral and forming the soluble products. In turn, this increase is observed to be favored even more with the increase in temperature.

Figure 6:
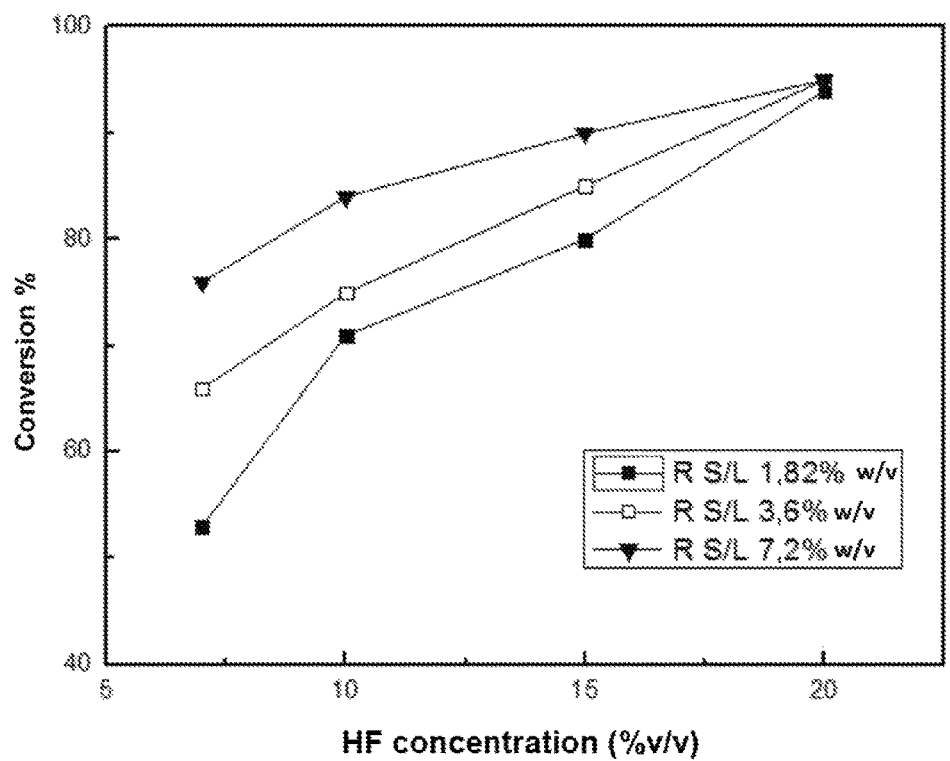
FIG. 6. A graph is shown of the effect of HF concentration on the conversion of α-spodumene (■1.82; □3.6 and ▼7.2% w/v).

Effect of HF concentration at S/L ratios (1.82, 3.6 and 7.2% w/v): FIG. 6 shows the results obtained for the effect of the HF concentration on the dissolution of α-spodumene working at the following S/L ratios: 1.82, 3.6 and 7.2% w/v. It is observed that both the increase in HF concentration and in S/L ratio lead to an increase in the dissolution of the mineral. It should be noted that a dissolution of more than 90% of the mineral was achieved, by working at a concentration of HF of 20% v/v, for all 3 S/L ratios tested.

Effect of reaction time: the lixiviation assays of the mineral at different reaction times were carried out at a temperature of 123° C., a particle size comprised between 29 and 45 μm and a stirring speed of 330 rpm.

The reaction times assessed were: 30, 60, 120, 180 and 240 minutes.

Figure 7:
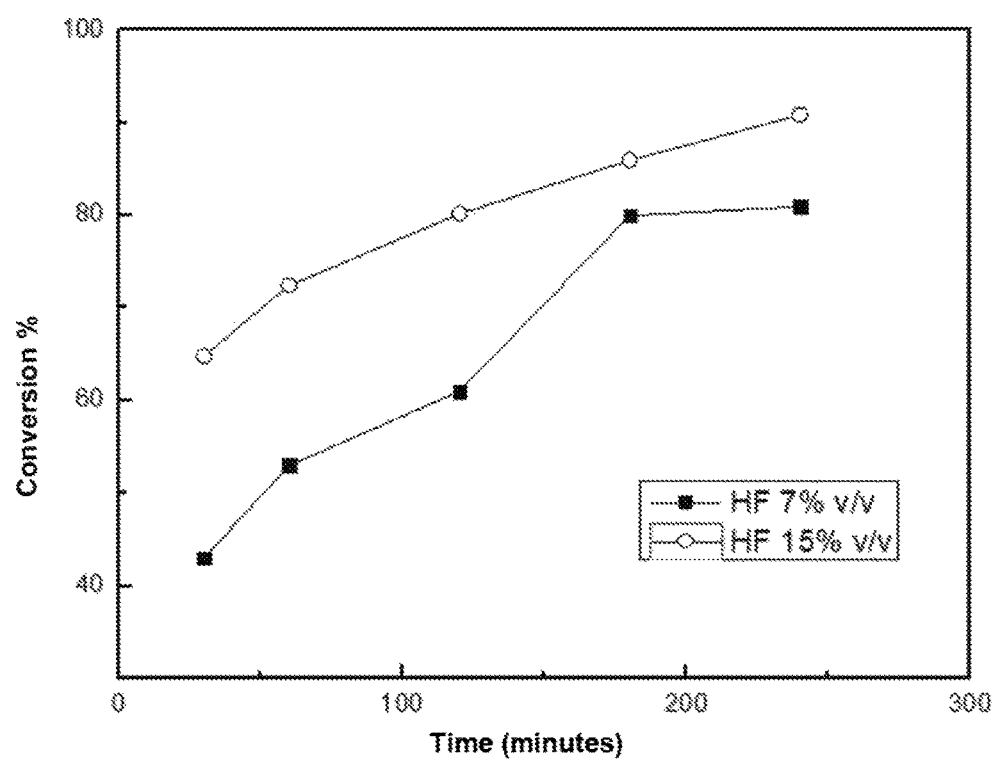
FIG. 7. A graph is shown of the effect of the reaction time on the conversion of α-spodumene (HF 7 and 15% (v/v)).

Effect of reaction time at 7 and 15% v/v of HF: in FIG. 7 results are shown of the effect that reaction time has over dissolution of α-spodumene, working at two HF concentrations (7 and 15% v/v).

Data shown in FIG. 7 show that for the two HF concentrations used, increasing reaction time produces an increase in the dissolution of the mineral. The increase in contact time between the mineral and the lixiviating agent leads to a larger dissolution of the solid. In addition, increase in the concentration of the lixiviating agent favors the dissolution of the mineral. When comparing both curves in FIG. 7 it can be seen that high dissolutions of α-spodumene are obtained in all cases for an HF concentration of 15% v/v. Hence, by working at HF concentrations of 15% v/v high conversions may be achieved in shorter reaction time periods.

Figure 8:
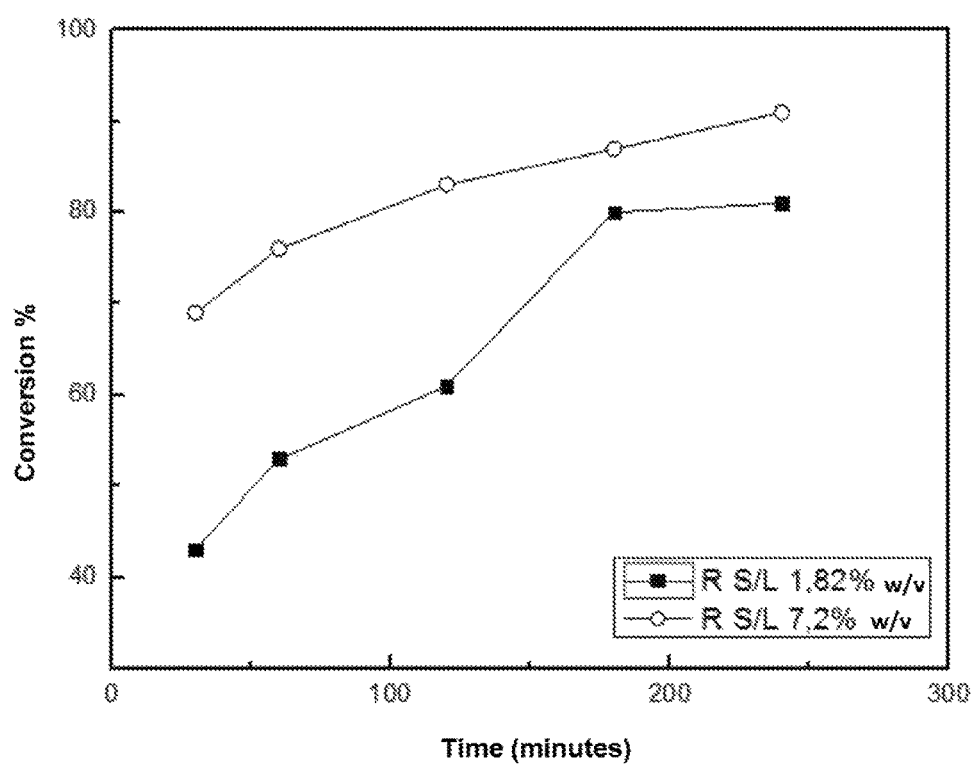
FIG. 8. A graph is shown of the effect of the reaction time on the conversion of α-spodumene (■1.82% and ○ 7.2% w/v).

Effect of reaction time at different S/L ratios: in FIG. 8 the results obtained of the effect reaction time has over dissolution of α-spodumene working at S/L ratios of 1.82 and 7.2% w/v are shown. It is observed that both the increase in reaction time and the increase in S/L ratio lead to an increase in the dissolution of the mineral. This way, working at high S/L ratios, high dissolution may be achieved for shorter reaction time periods.

Figure 9:
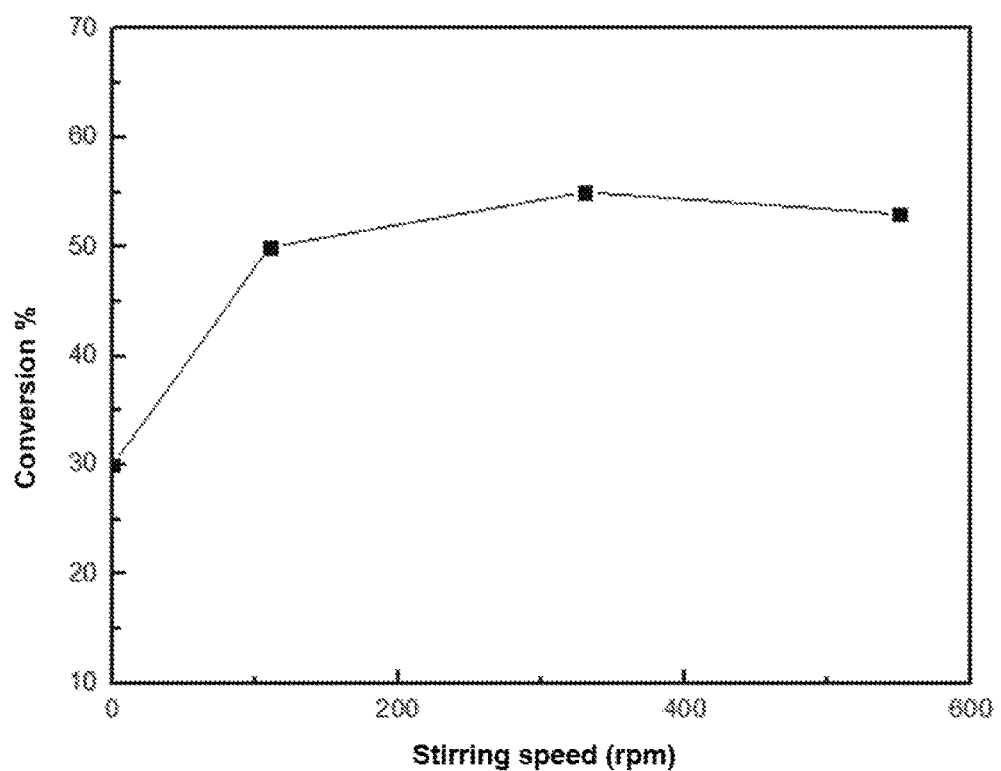
FIG. 9. A graph is shown of the effect of stirring speed on the conversion of α-spodumene (HF 7% (v/v)).
Figure 10:
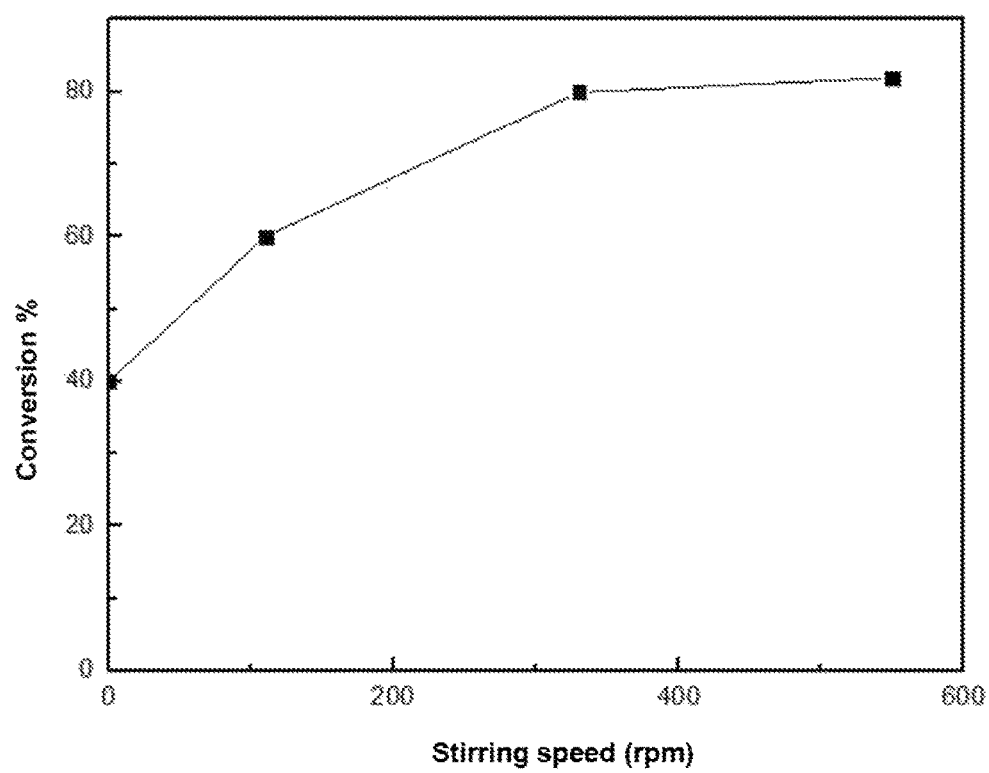
FIG. 10. A graph is shown of the effect of stirring speed on the conversion of α-spodumene (HF 15% (v/v)).

Effect of stirring speed: the effect of stirring speed was assessed by keeping the following operative variables constant: temperature, 123° C.; time, 60 min; S/L ratio, 1.82% (p/v); particle size, (between 29 and 42.5 μm) and HF concentration (7 and 15%). In FIGS. 9 and 10 the results obtained are shown. These results show that increasing the stirring speed between 0 and 330 rpm produces an increase in the dissolution of the mineral. Above 330 rpm no considerable changes are observed in the conversion of the mineral. This fact indicates that once said stirring speed is reached, the width of the film surrounding the solid is minimum, therefore, it does not affect the HF transfer rate from within the solution to the surface of the particle, since speed has reached its maximum value.

Figure 11:
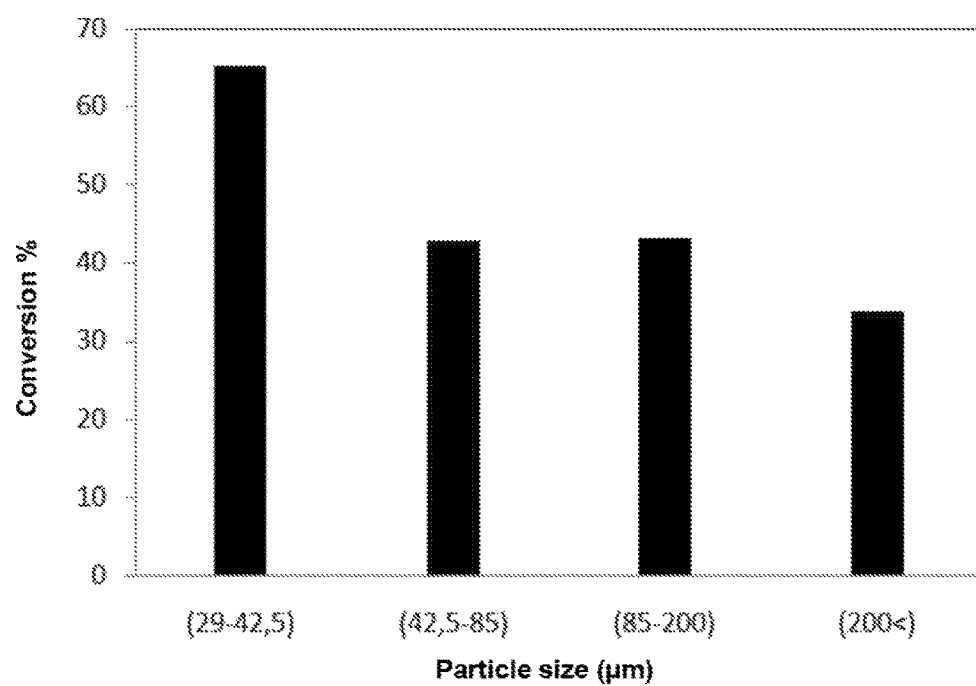
FIG. 11. A graph is shown of the effect of particle size on the conversion of α-spodumene.

Effect of particle size: influence of particle size over dissolution of α-spodumene is shown in FIG. 11. For these assays the other operative variables were kept constant at the following values: temperature, 123° C.; reaction time, 60 min; solid liquid ratio, 1.82% (p/v); stirring speed, 330 rpm and concentration de HF, 7% (v/v).

In FIG. 11, it can be seen that the increase in particle size produces a marked decrease in mineral conversion. Said decrease is due to the fact that when particle size increases, contact surface between the solid and the lixiviating agent decreases, which causes a decrease in mineral conversion.

Separation assays for obtaining the intermediate compounds $Na_3AlF_6$, $Na_2SiF_6$, $Fe(OH)_3$ and $CaF_2$ and the final compound $Li_2CO_3$:

Step 1: separation of Al and Si from the solution as $Na_3AlF_6$ and $Na_2SiF_6$.

In this step, the solutions generated from the lixiviation are treated with an amount of NaOH as calculated from reaction (3). The pH reached by the solution in this step was below 3.

$$5NaOH_{(aq)} + H_3AlF_{6(aq)} + H_2SiF_{6(aq)} \rightarrow Na_2SiF_{6(s)} + Na_3AlF_{6(s)} + 5H_2O \quad (3)$$

Figure 12:
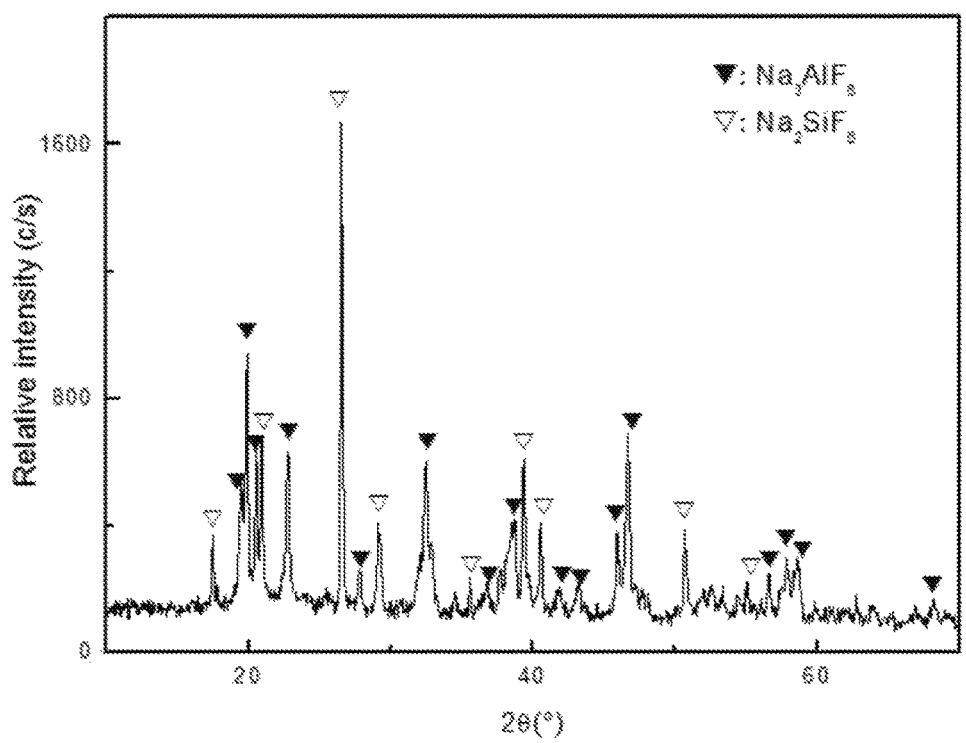
FIG. 12. Diffractogram of the solids obtained in step 1.

In FIG. 12, diffractograms of the solids obtained at this stage are shown. The results obtained show that with the addition of NaOH selective precipitation of the compounds $Na_2SiF_6$ and $Na_3AlF_6$ was achieved, since no appearance of lithium compounds was observed. By carrying out a gravimetric analysis of the precipitate, precipitation was confirmed to be quantitative (total) with respect to reaction 3 shown above.

Figure 13:
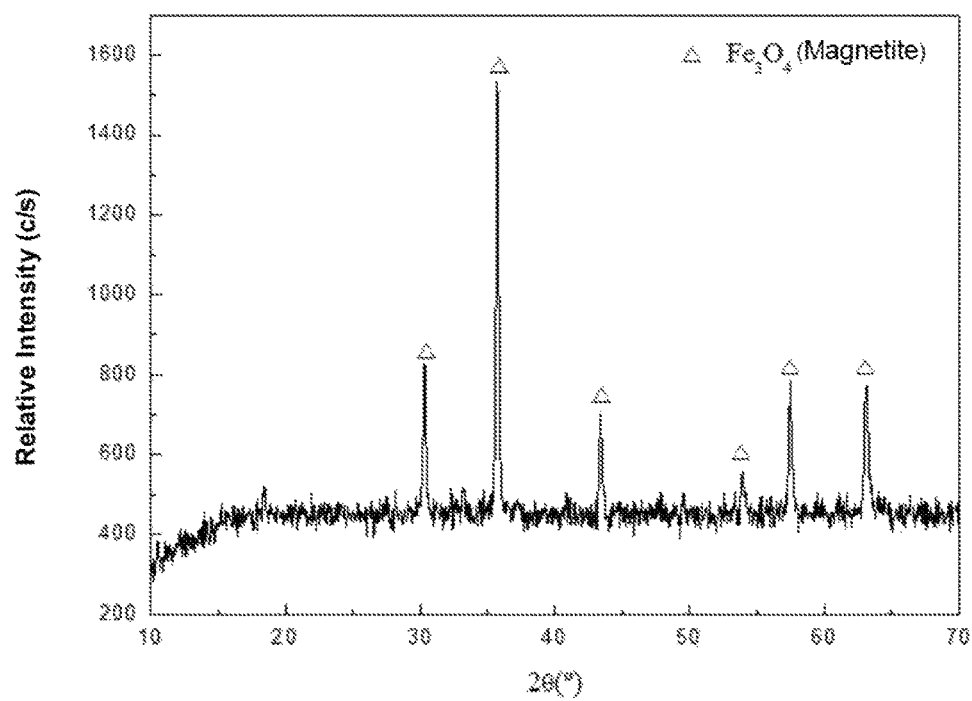
FIG. 13. Diffractogram of the solid obtained in step 2.

Step 2: separation of Fe as $Fe(OH)_3$: To the filtrate obtained in Step 1 an amount of NaOH was added again, in order to adjust the pH of the solution to 5. At this pH value, an insoluble iron compound, $Fe(OH)_3$, is formed, which precipitates and is filtered out. Then, this precipitate may be calcined at 800° C. In FIG. 13 diffractograms of the compound obtained at this stage are shown. The appearance of a magnetite phase ($Fe_3O_4$) is observed, which is obtained by thermal decomposition of the precipitated $Fe(OH)_3$ in an oxidizing atmosphere.

Figure 14:
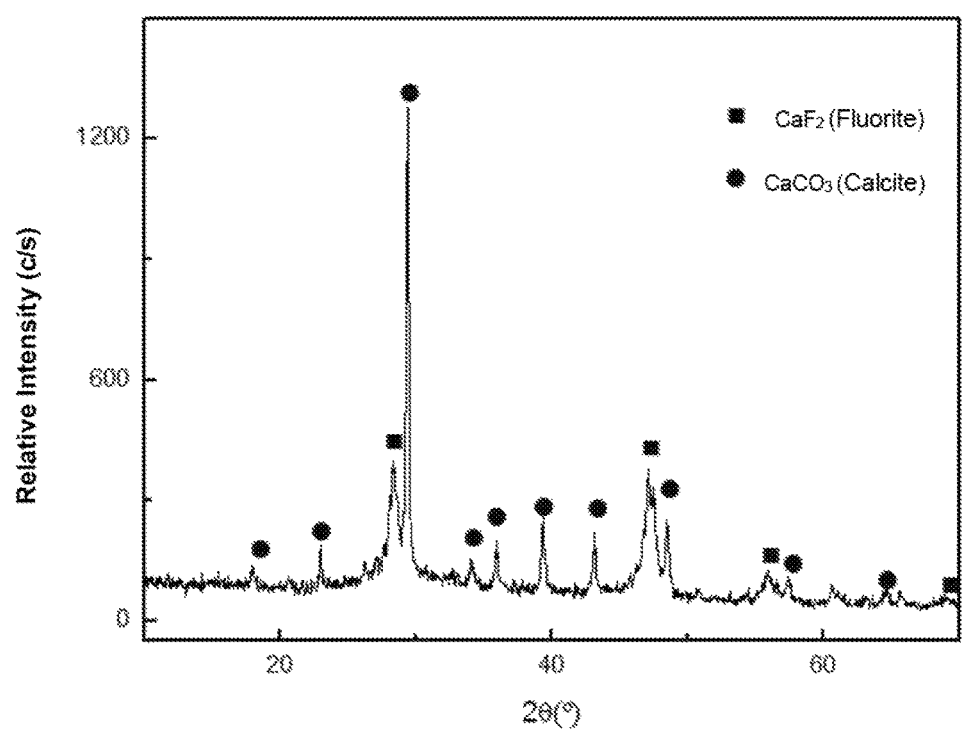
FIG. 14. Diffractogram of the solids obtained in step 3.

Step 3: removal of remaining $F^-$ as $CaF_2$: The filtrate obtained in Step 2 is treated with a $Ca(OH)_2$ solution in order to remove $F^-$ from the medium as solid $CaF_2$, which precipitates and is filtered out. In FIG. 14, diffractograms of the compounds obtained at this stage are shown. It may be seen that the compound $CaF_2$ may be precipitated and that calcite is detected, coming from the precipitating agent $Ca(OH)_2$.

Figure 15:
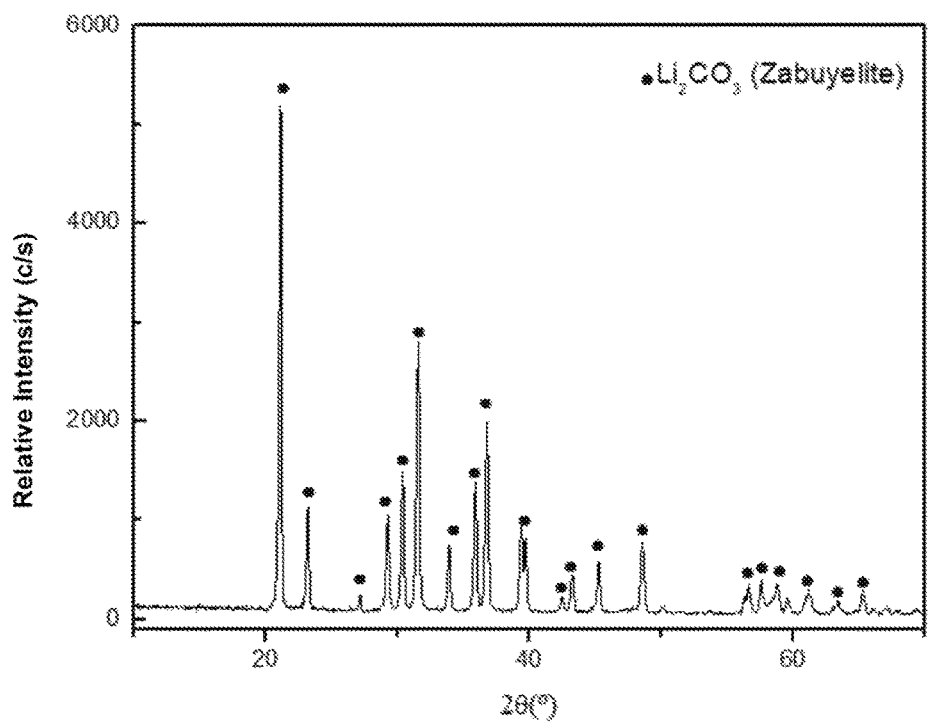
FIG. 15. Diffractogram of the solid obtained in step 4.

Step 4: recovery of Li as $Li_2CO_3$: The filtrate obtained in Step 3, to which fluorine ion content was totally removed, is subjected to evaporation until reaching a Li concentration of 20 g/L. Then, the pH of this solution is adjusted (pH 13-14) and carbonation thereof is performed using any known process, for example, bubbling $CO_2$ (g) or adding a $Na_2CO_3$ saturated solution to lower the pH of the solution down to 6.5. Finally, the solution is heated at a temperature of 95° C., thus causing precipitation of Li as $Li_2CO_3$. In FIG. 15 the diffractogram of the solid obtained in this stage is shown. It may be seen that the compound $Li_2CO_3$ was obtained without the presence of impurities. Analyzing the residual solutions obtained by AAS a recovery of Li of more than 90% could be determined.

Separation assays for obtaining the intermediate compounds $Na_3AlF_6$, $K_2SiF_6$, $CaF_2$ and NaF; the final compound LiF:

This process is applicable to the filtrates coming from the lixiviation of α-spodumene with HF or HF—$H_2SO_4$.

The main characteristics of this process are: I) LiF is obtained as the main product; II) Al and Si are separately precipitated as $Na_3AlF_6$ and $K_2SiF_6$; and III) NaF is produced.

Separation Assays

Step 1: separation of Si from the solution as $K_2SiF_6$. In this step, the solutions generated from lixiviation are treated with an amount of KCl as calculated from reaction (4). The pH of the solution is kept constant.

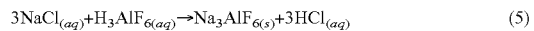

$$2KCl_{(aq)} + H_2SiF_{6(aq)} \rightarrow K_2SiF_{6(s)} + 2HCl_{(aq)} \quad (4)$$

Figure 16:
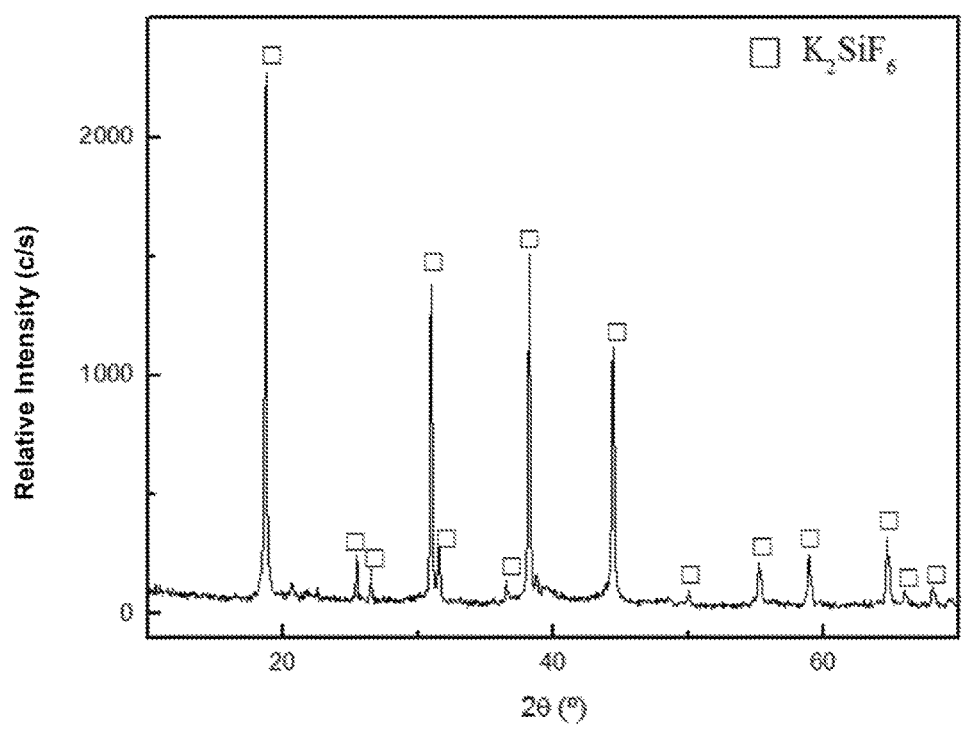
FIG. 16. Diffractogram of the solid obtained in step 1.

In FIG. 16, the diffractogram of the solid obtained at this stage is shown. The results obtained show that with the addition of KCl, selective precipitation of the compound $K_2SiF_6$ was achieved, since no appearance of other phases are observed in the diffractogram. By carrying out a gravimetric analysis of the precipitate, the precipitation was confirmed to be quantitative (total) with respect to reaction 4 shown above.

Step 2: Separation of Al as $Na_3AlF_6$

In this step, the solutions from the previous step are treated with an amount of NaCl as calculated from reaction (5). The pH of the solution is kept constant.

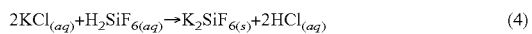

$$3NaCl_{(aq)} + H_3AlF_{6(aq)} \rightarrow Na_3AlF_{6(s)} + 3HCl_{(aq)} \quad (5)$$

Figure 17:
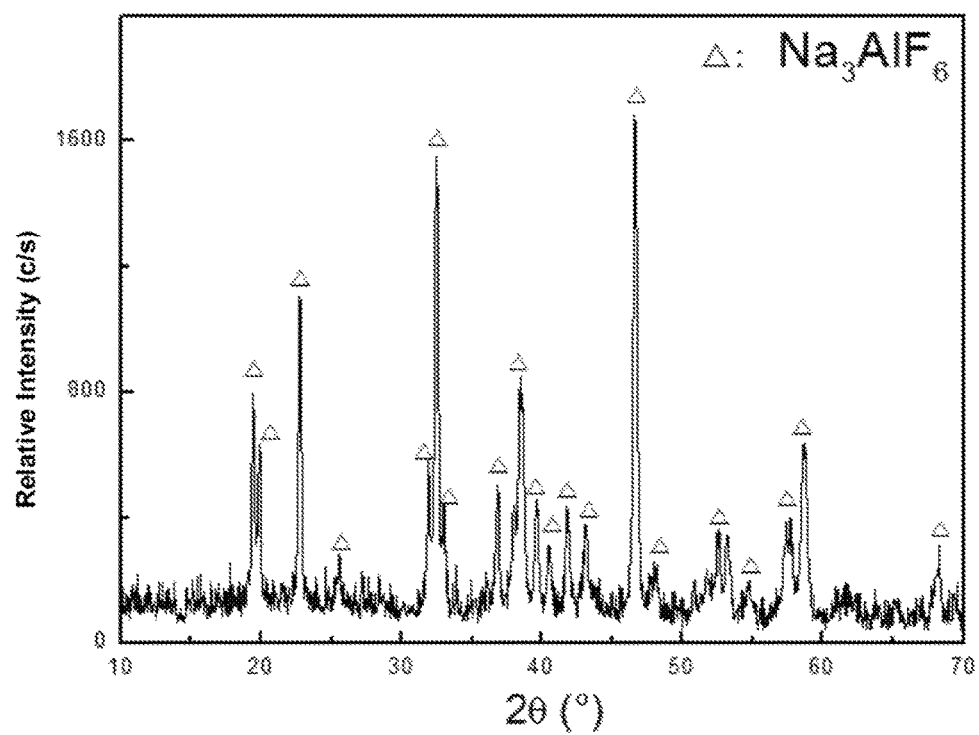
FIG. 17. Diffractogram of the solid obtained in step 2.

In FIG. 17, the diffractogram of the solid obtained in this stage is shown. The results obtained show that with the addition of NaCl, selective precipitation of the compound $Na_3AlF_6$ since no appearance of other crystalline phase of another compound is observed. By carrying out a gravimetric analysis of the precipitate, the precipitation was confirmed to be quantitative (total) with respect to postulated reaction 5.

Step 3: Separation of Fe as $Fe(OH)_3$

Figure 18:
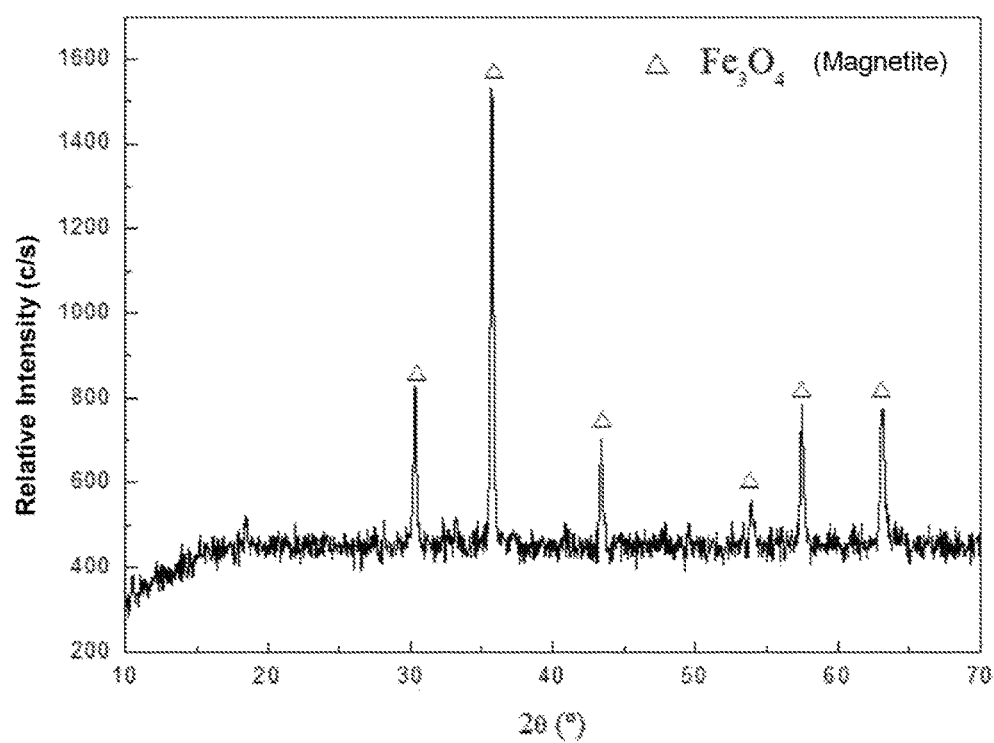
FIG. 18. Diffractogram of the solid obtained in step 3.

To the filtrate obtained in Step 2 an amount of NaOH is added again in order to adjust the pH of the solution to 5. At this pH value an insoluble iron compound, $Fe(OH)_3$, is formed, which precipitates and filtered out. Then, this precipitate may be calcined at 800° C. In FIG. 18 diffractograms of the compound obtained at this stage are shown. The appearance of a magnetite ($Fe_3O_4$) phase is observed, which is obtained by thermal decomposition of the precipitated $Fe(OH)_3$ in an oxidizing atmosphere.

Step 4: Recovery of Li as LiF

The filtrate obtained in Step 3, is subjected to evaporation at 95° C., until appearance of a gelatinous white precipitate is observed.

Figure 19:
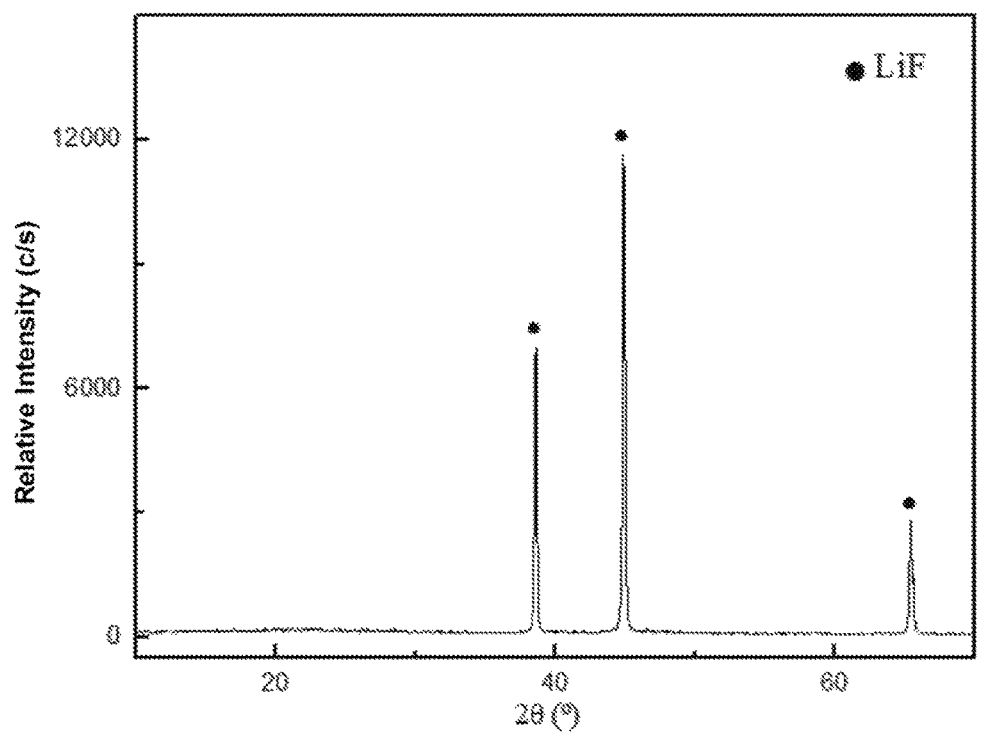
FIG. 19. Diffractogram of the solid obtained in step 4.

In FIG. 19 the diffractogram of the solid obtained at this stage is shown. The compound LiF was observed to be obtained without the presence of other phases as impurities. Analyzing the residual solutions obtained by AAS a recovery of Li of more than 90% could be determined.

Figure 20:
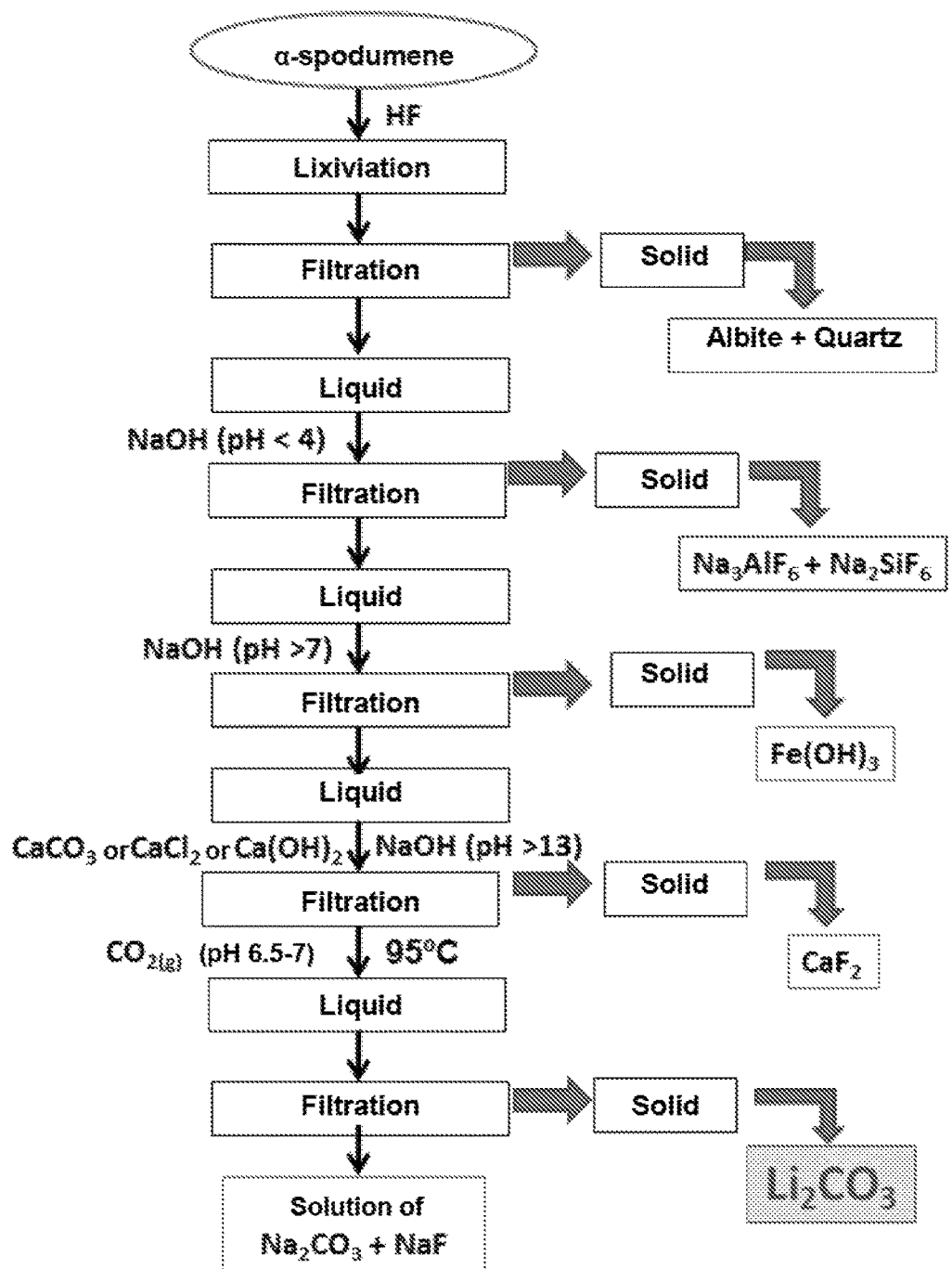
FIG. 20. Flow sheet of the obtainment of $Li_2CO_3$ from lixiviation of α-spodumene with HF.

In brief:

In a preferred embodiment, the process of the invention comprises the process A (FIG. 20) wherein production of $Li_2CO_3$ is carried out from α-spodumene and HF. $Li_2CO_3$ is obtained as the main product, and $Na_3AlF_6$, $Na_2SiF_6$, $Fe(OH)_3$ and $CaF_2$ as by-products.

Figure 21:
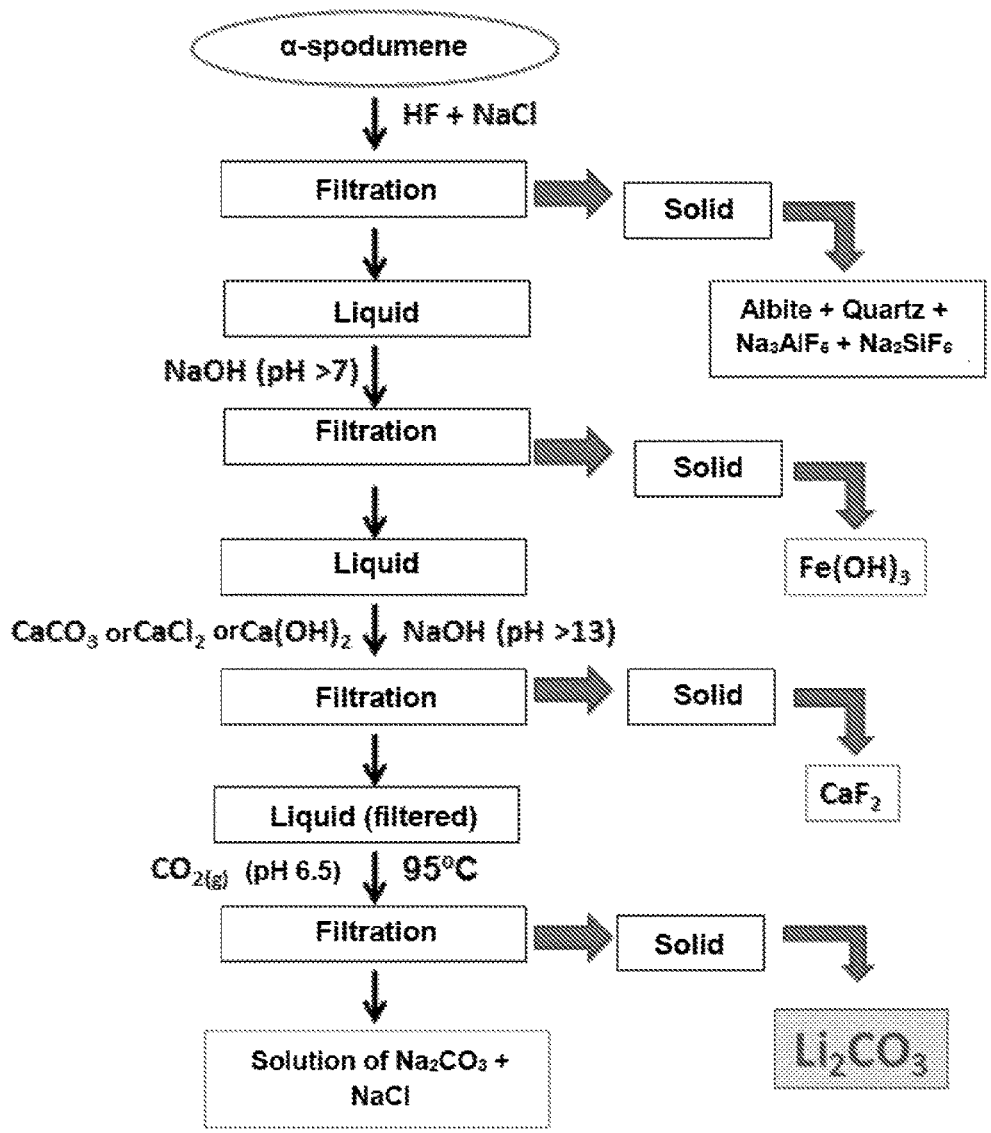
FIG. 21. Flow sheet of the obtainment of $Li_2CO_3$ from lixiviation of α-spodumene with HF—NaCl.

In another preferred embodiment, the process of the invention comprises the process B (FIG. 21) for the production of $Li_2CO_3$ from α-spodumene and HF+NaCl. $Li_2CO_3$ is obtained as the main product and $Na_3AlF_6$, $Na_2SiF_6$, $Fe(OH)_3$ and $CaF_2$ as by-products.

Figure 22:
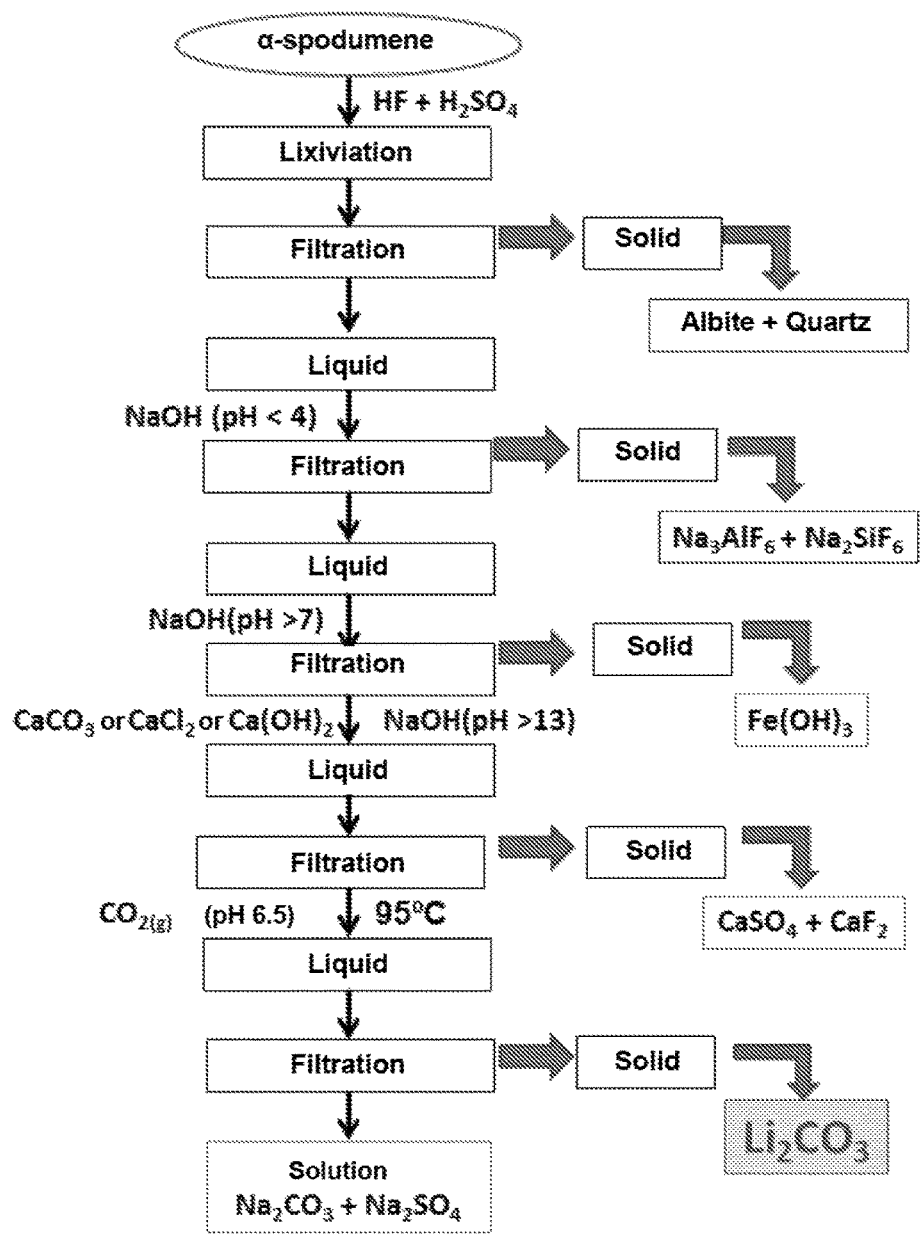
FIG. 22. Flow sheet of the obtainment of $Li_2CO_3$ from lixiviation of α-spodumene with HF—$H_2SO_4$.

In another preferred embodiment, the process of the invention comprises the process C (FIG. 22) for the production of $Li_2CO_3$ from α-spodumene and HF+$H_2SO_4$. $Li_2CO_3$ is obtained as the main product and $Na_3AlF_6$, $Na_2SiF_6$, $Fe(OH)_3$ and $CaF_2$ as by-products. The most important advantages of this process are: it minimizes the use of HF; the separation steps are simpler due to the lower fluorine content in the medium and the use of $H_2SO_4$ decreases the cost of the process.

Figure 23:
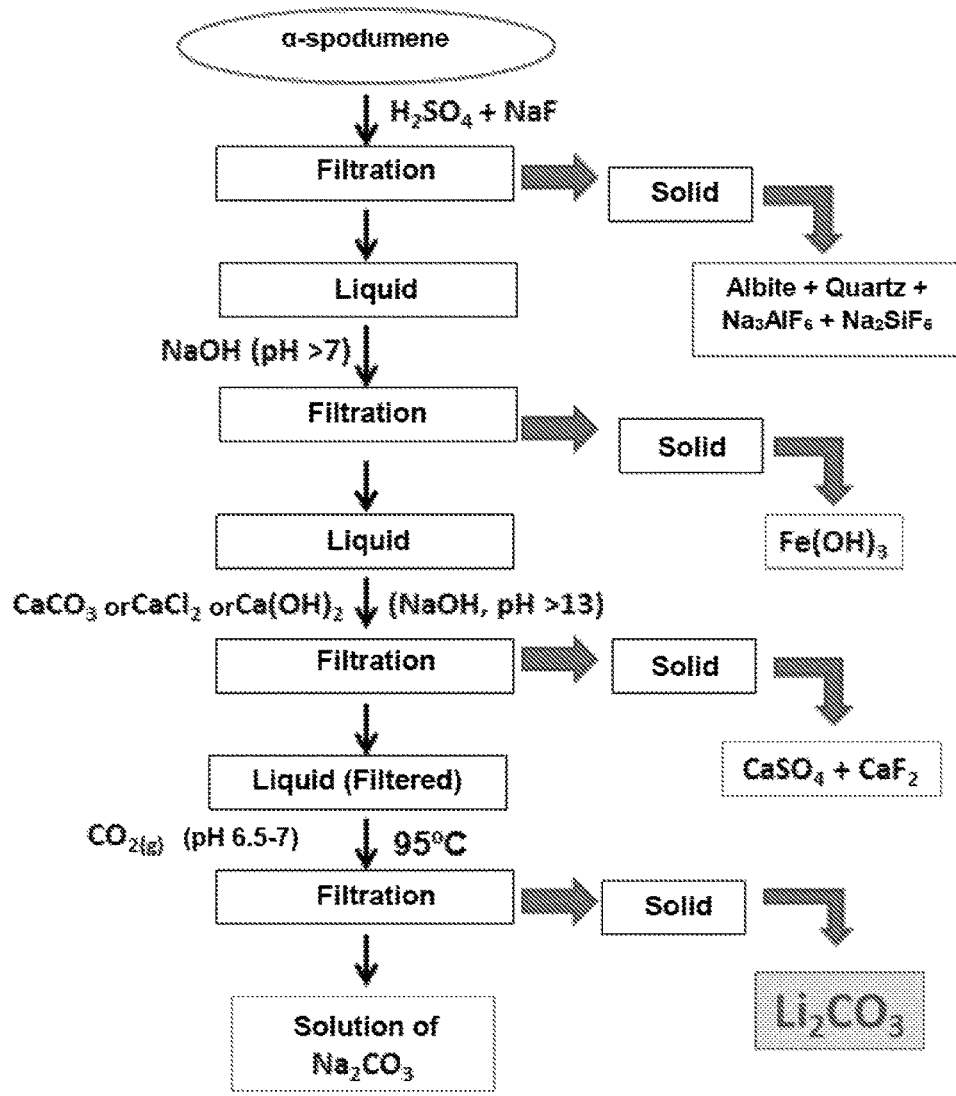
FIG. 23. Flow sheet of the obtainment of $Li_2CO_3$ from lixiviation of α-spodumene with $H_2SO_4$—NaF.

In another preferred embodiment, the process of the invention comprises the process D (FIG. 23) for the production of $Li_2CO_3$ from α-spodumene and $H_2SO_4$+NaF. $Li_2CO_3$ is obtained as the main product and $Na_3AlF_6$, $Na_2SiF_6$, $Fe(OH)_3$, $CaF_2$ and NaF as by-products. In this process, the separation steps are simpler due to the lower fluorine content in the medium and the use of $H_2SO_4$ decreases the cost of the process.

Figure 24:
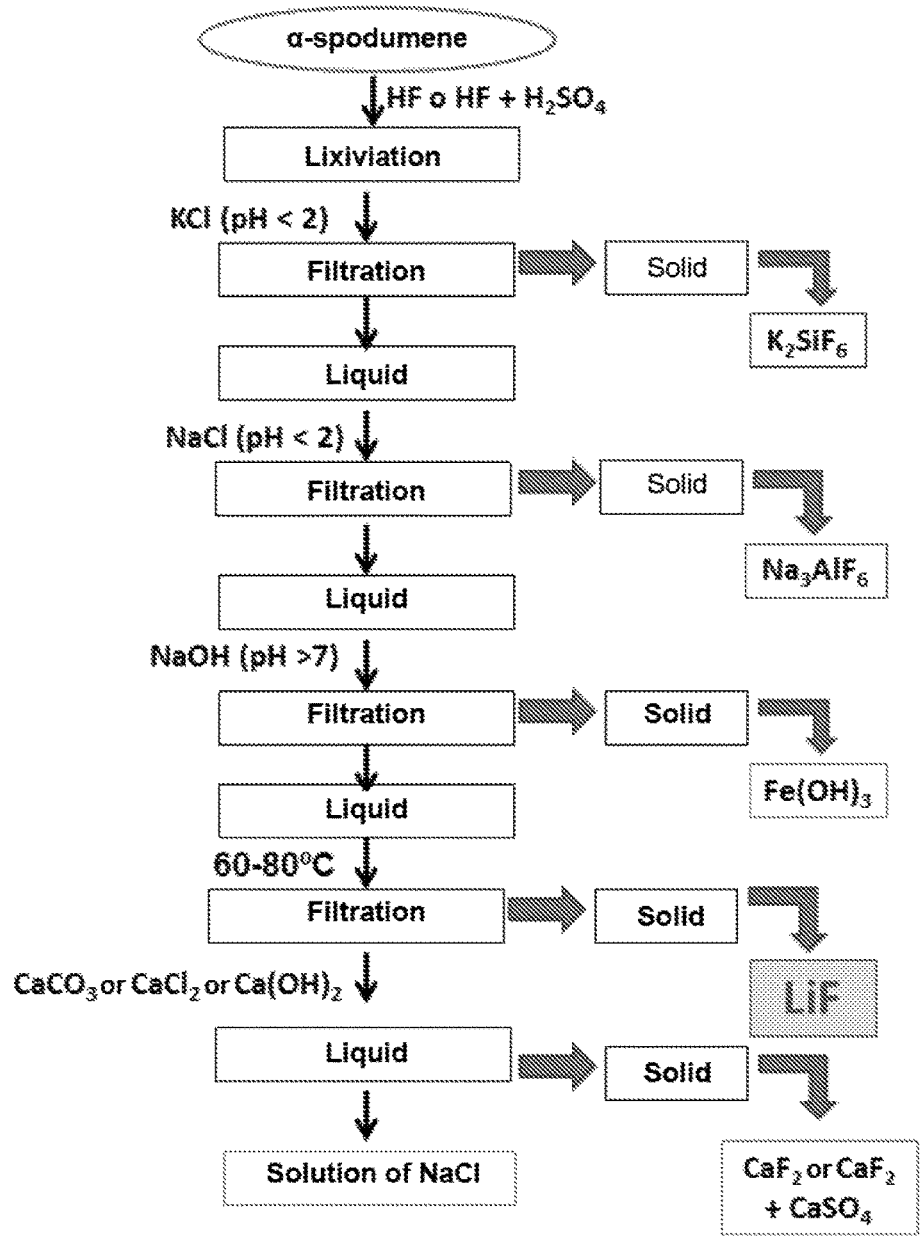
FIG. 24. Flow sheet of the obtainment of LiF from lixiviation of α-spodumene with HF or HF—$H_2SO_4$.
Figure 25:
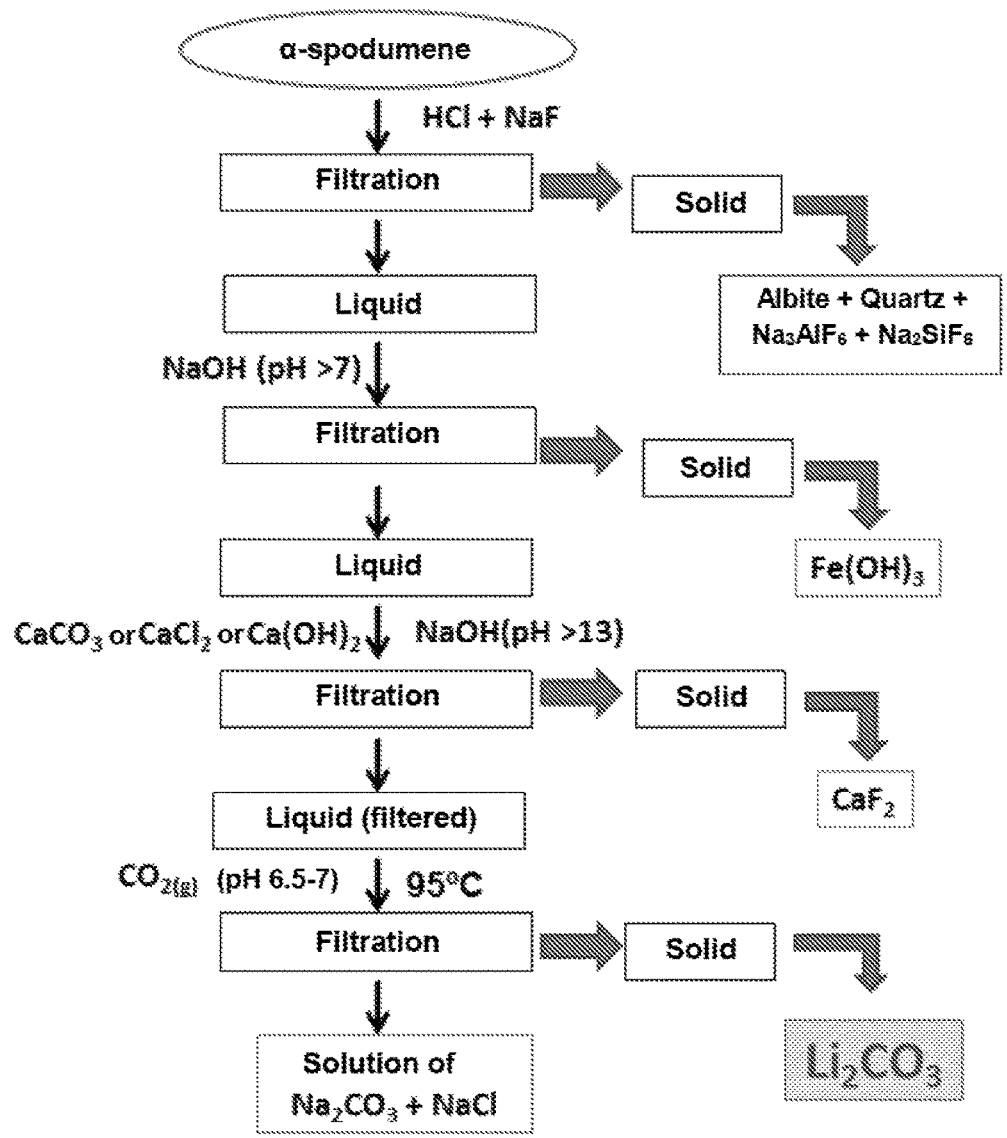
FIG. 25. Flow sheet of the obtainment of $Li_2CO_3$ from lixiviation of α-spodumene with HCl—NaF.
Figure 26:
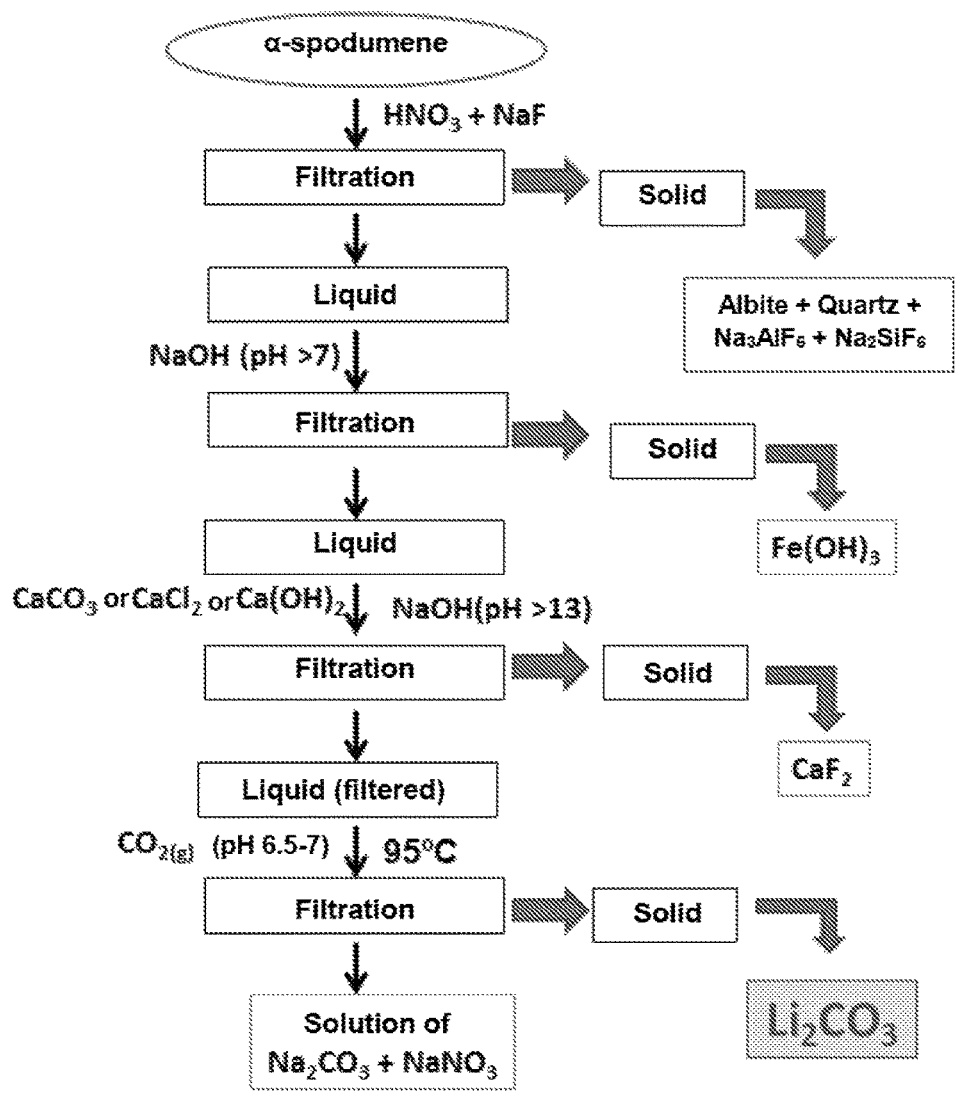
FIG. 26. Flow sheet of the obtainment of $Li_2CO_3$ from lixiviation of α-spodumene with HNO₃—NaF.
Figure 27:
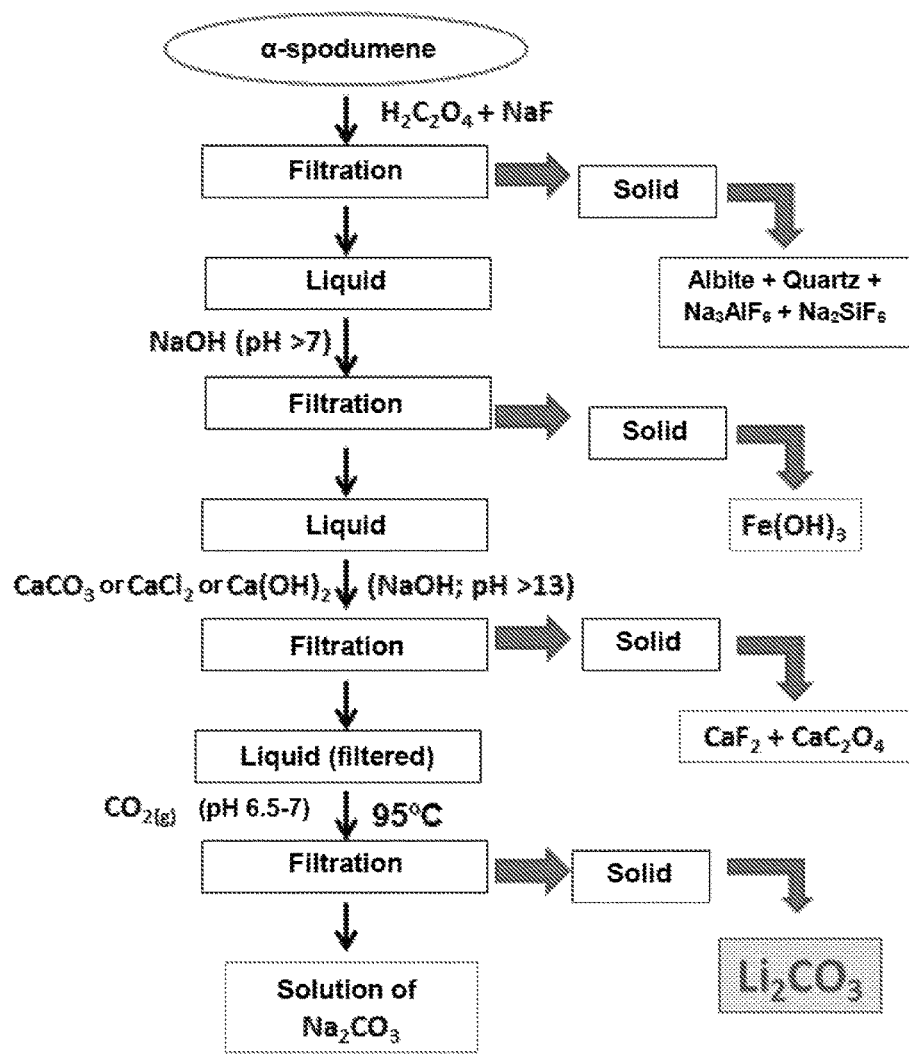
FIG. 27. Flow sheet of the obtainment of $Li_2CO_3$ from lixiviation of α-spodumene with $H_2C_2O_4$—NaF.
Figure 28:
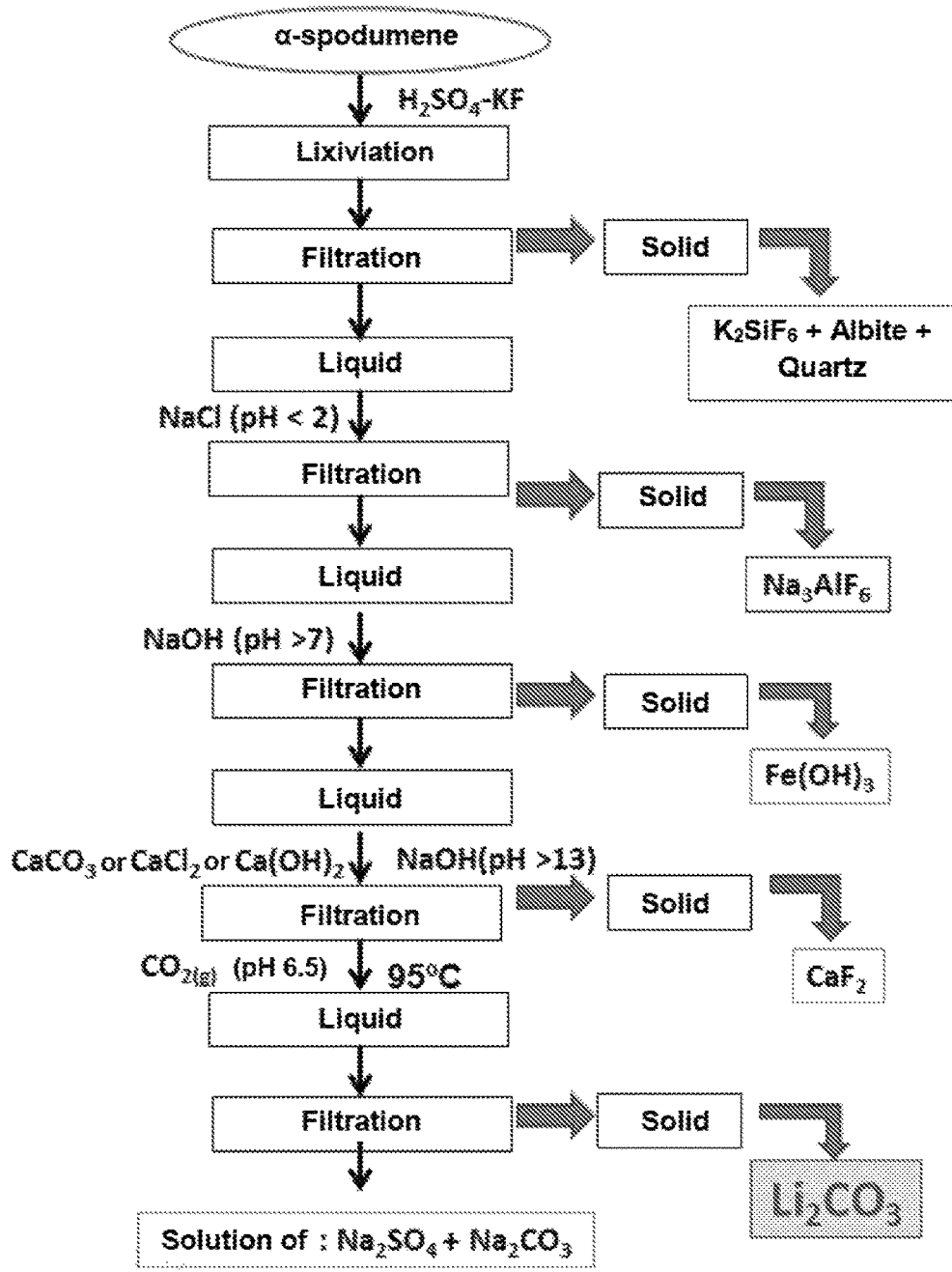
FIG. 28. Flow sheet of the obtainment of $Li_2CO_3$ from lixiviation of α-spodumene with $H_2SO_4$—HF.
Figure 29:
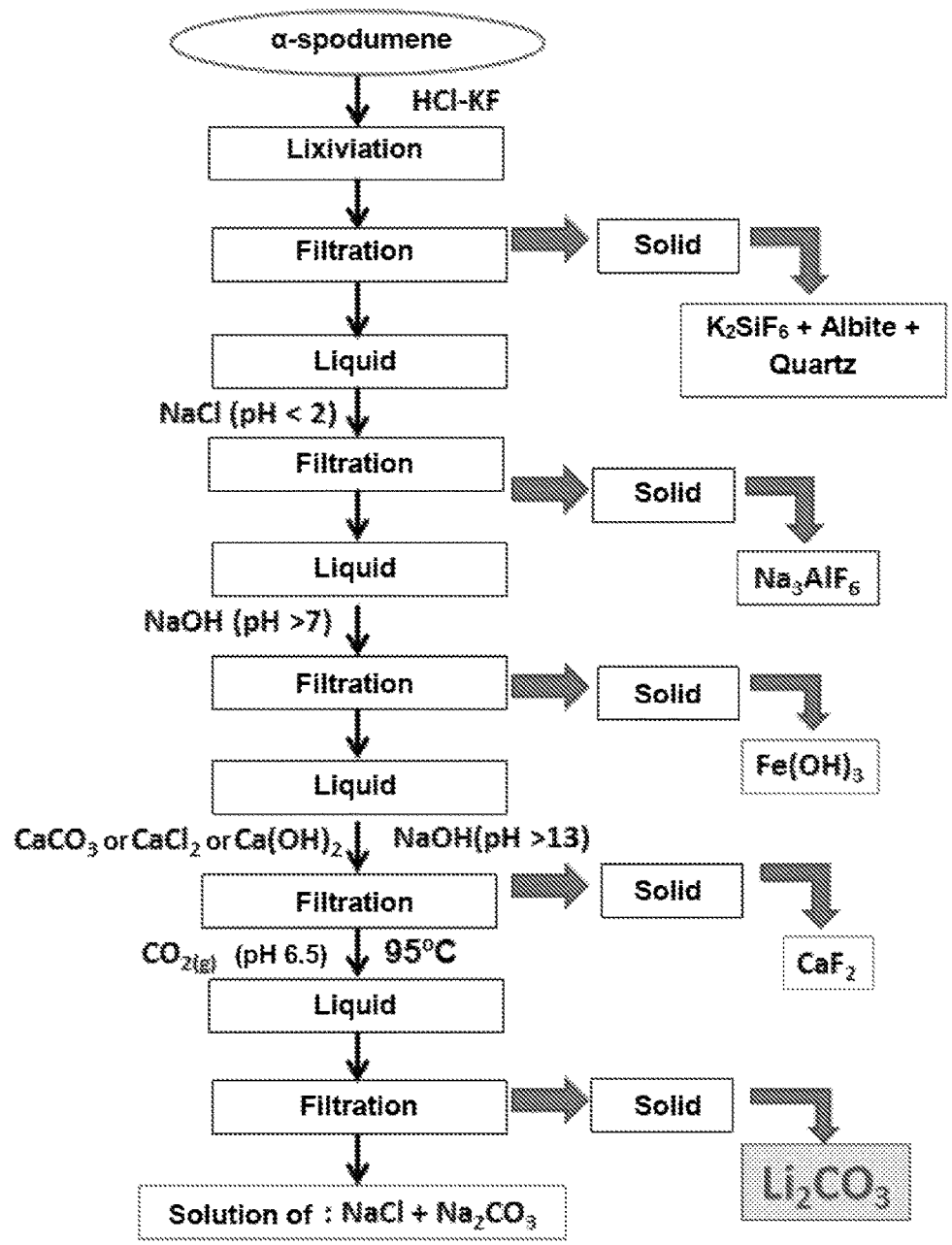
FIG. 29. Flow sheet of the obtainment of $Li_2CO_3$ from lixiviation of α-spodumene with HCl—KF.
Figure 30:
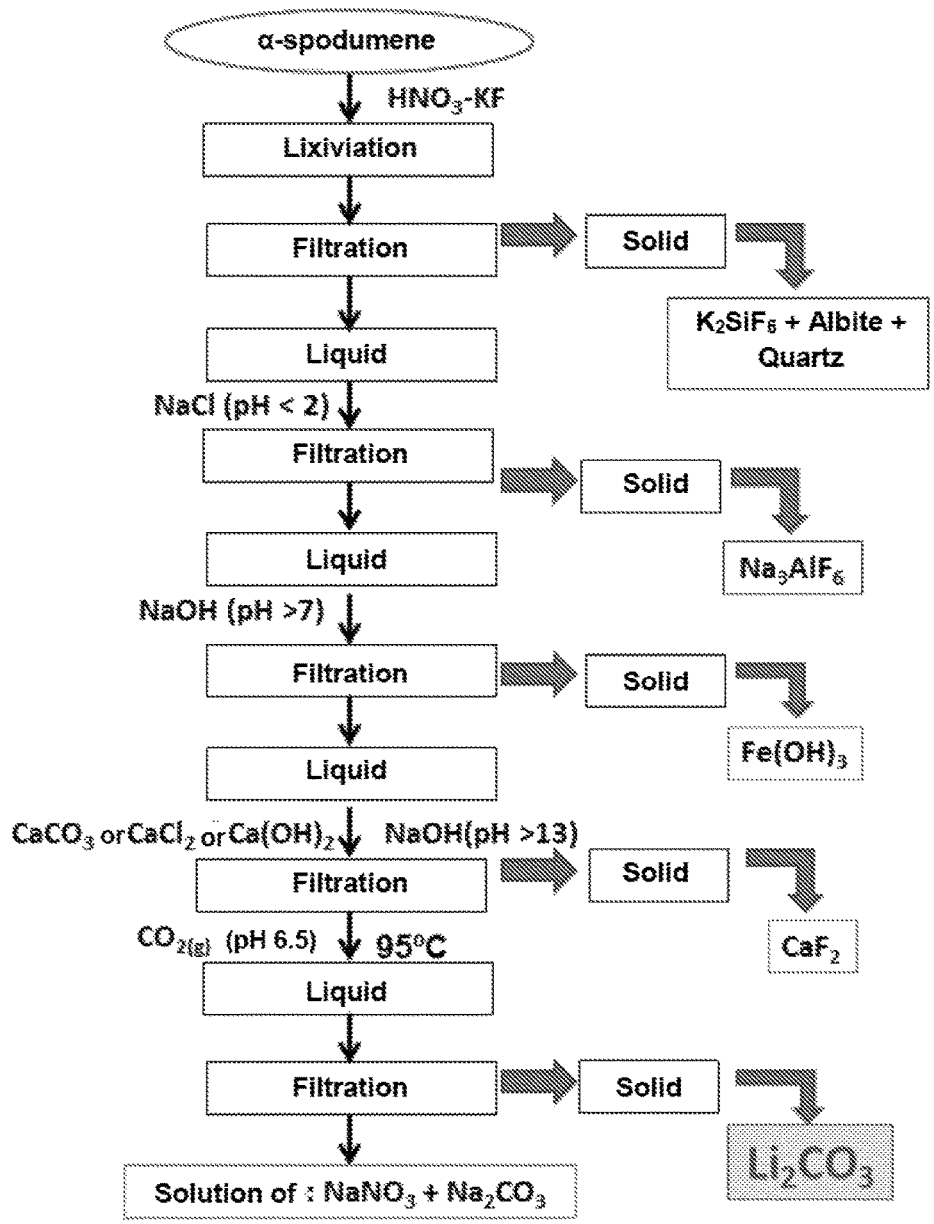
FIG. 30. Flow sheet of the obtainment of $Li_2CO_3$ from lixiviation of α-spodumene with HNO₃—KF.
Figure 31:
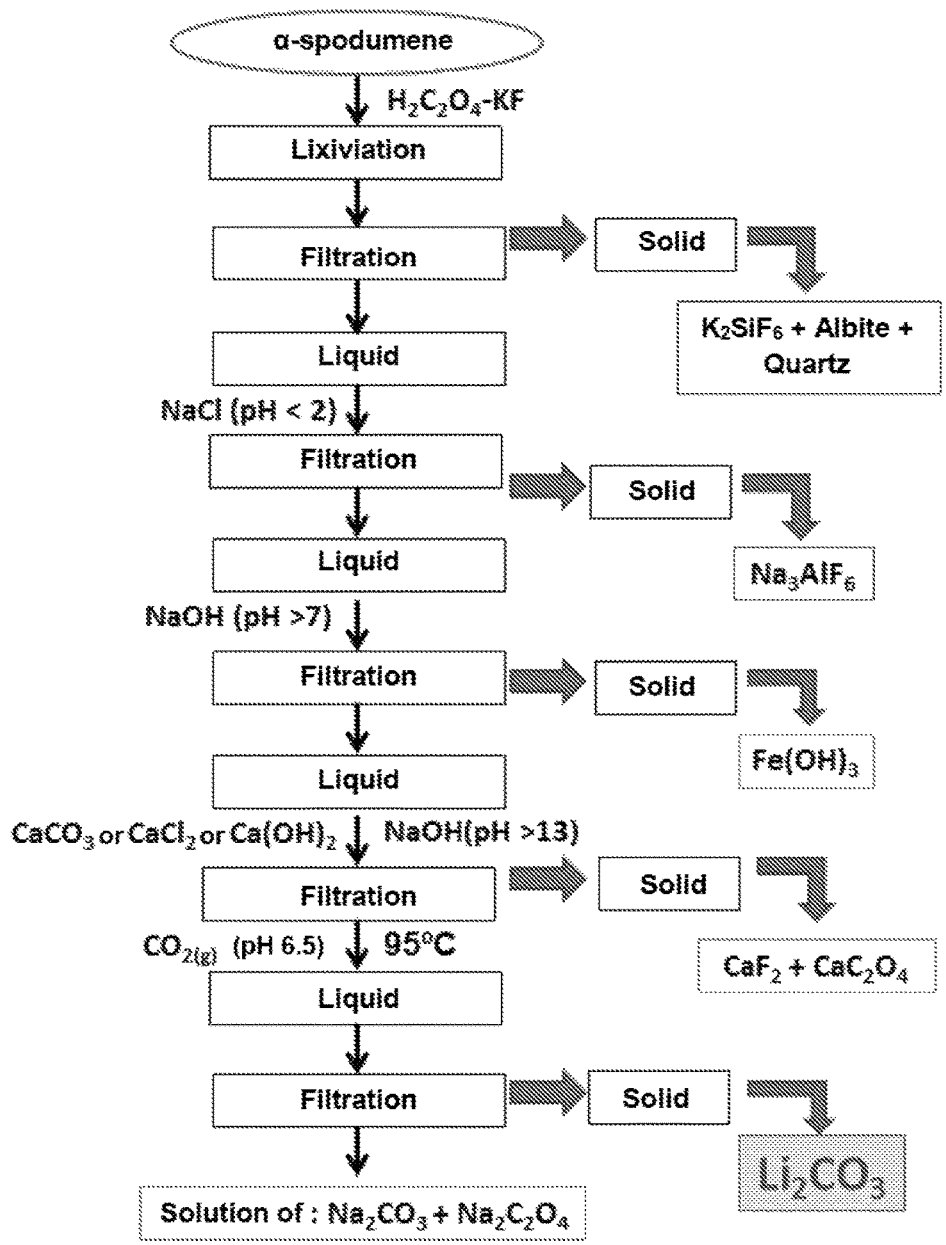
FIG. 31. Flow sheet of the obtainment of $Li_2CO_3$ from lixiviation of α-spodumene with $H_2C_2O_4$—KF.
Figure 32:
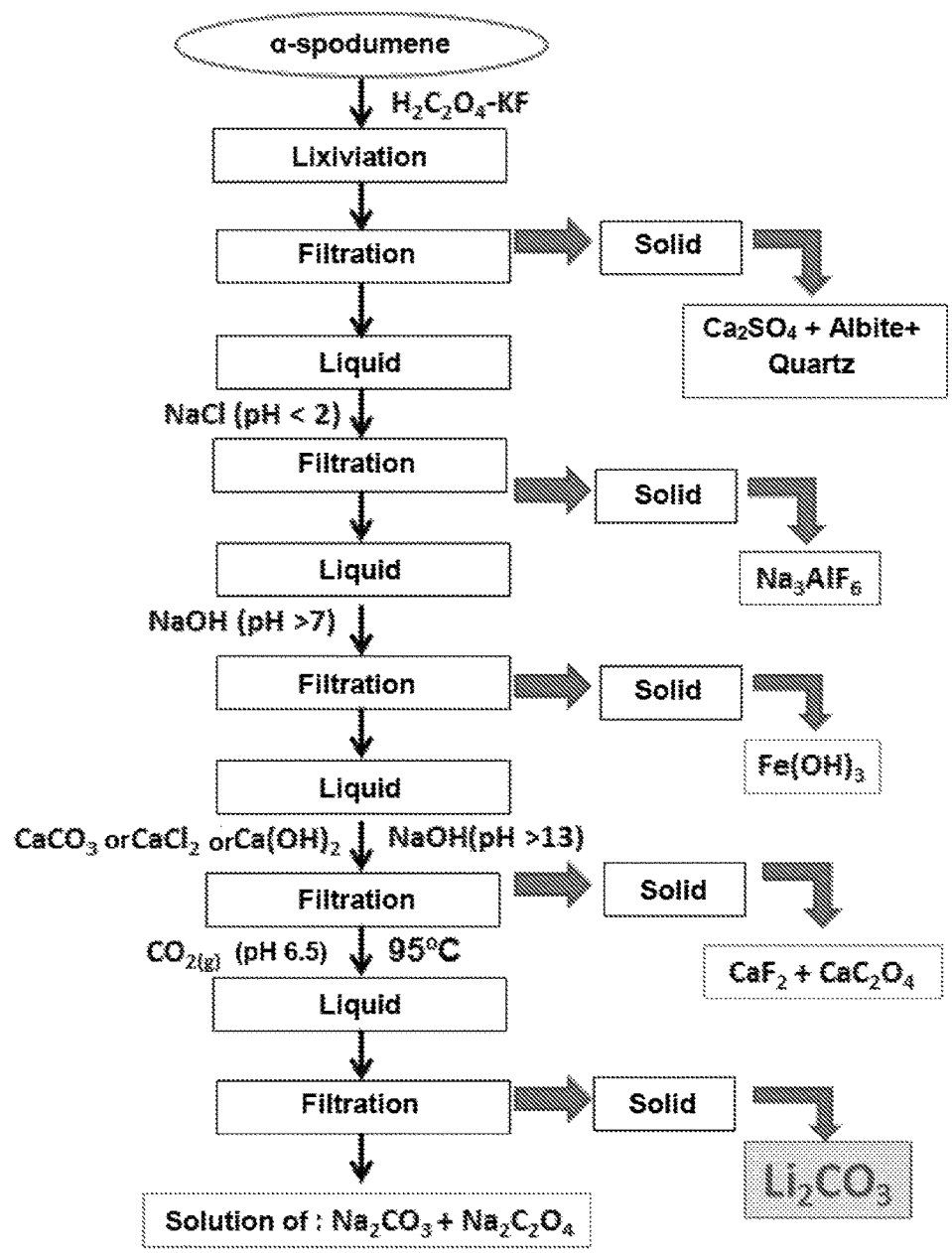
FIG. 32. Flow sheet of the obtainment of $Li_2CO_3$ from lixiviation of α-spodumene with $CaF_2$—$H_2SO_4$.
Figure 33:
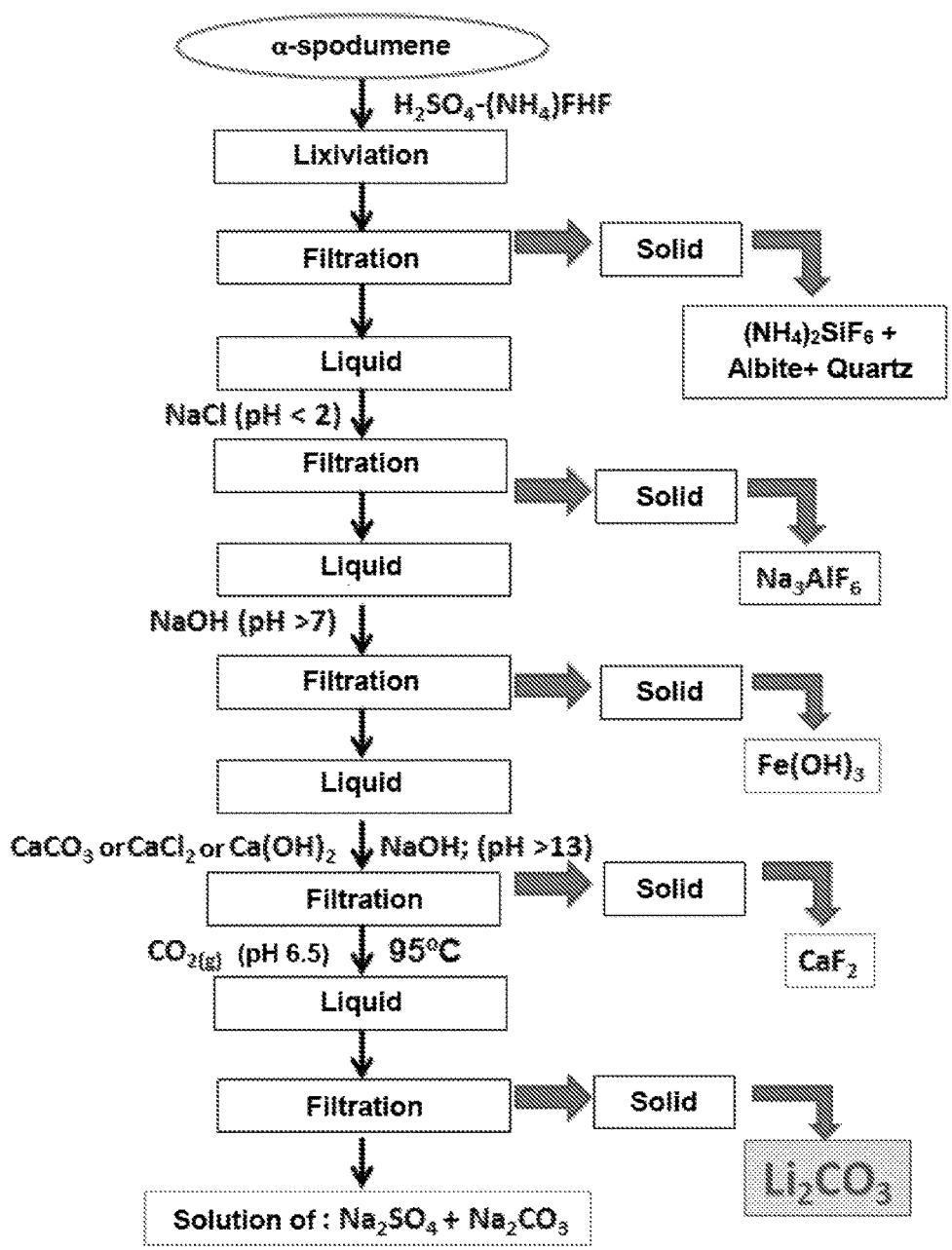
FIG. 33. Flow sheet of the obtainment of $Li_2CO_3$ from lixiviation of α-spodumene with $H_2SO_4$—$(NH_4)FHF$.
Figure 34:
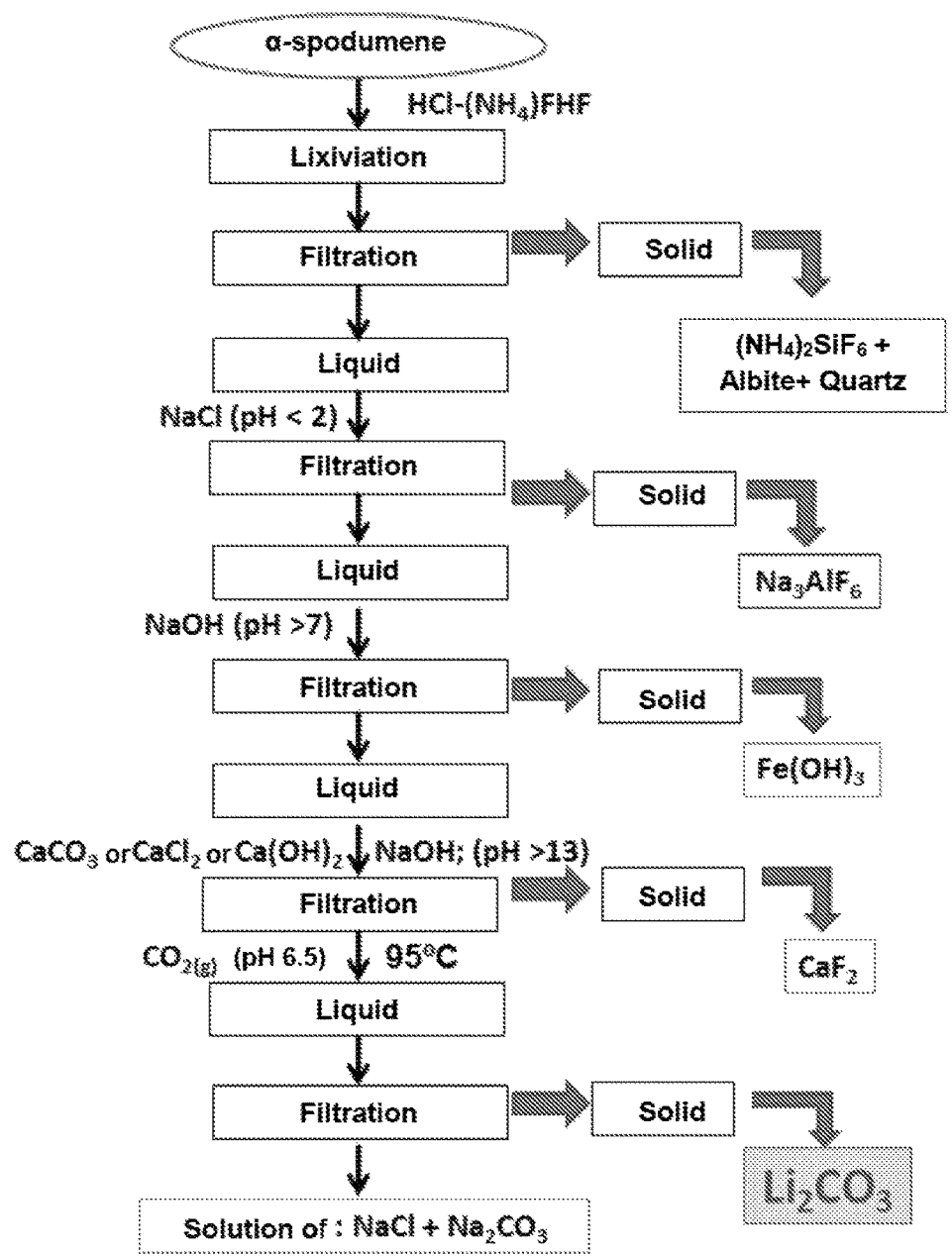
FIG. 34. Flow sheet of the obtainment of $Li_2CO_3$ from lixiviation of α-spodumene with HCl—$(NH_4)FHF$.
Figure 35:
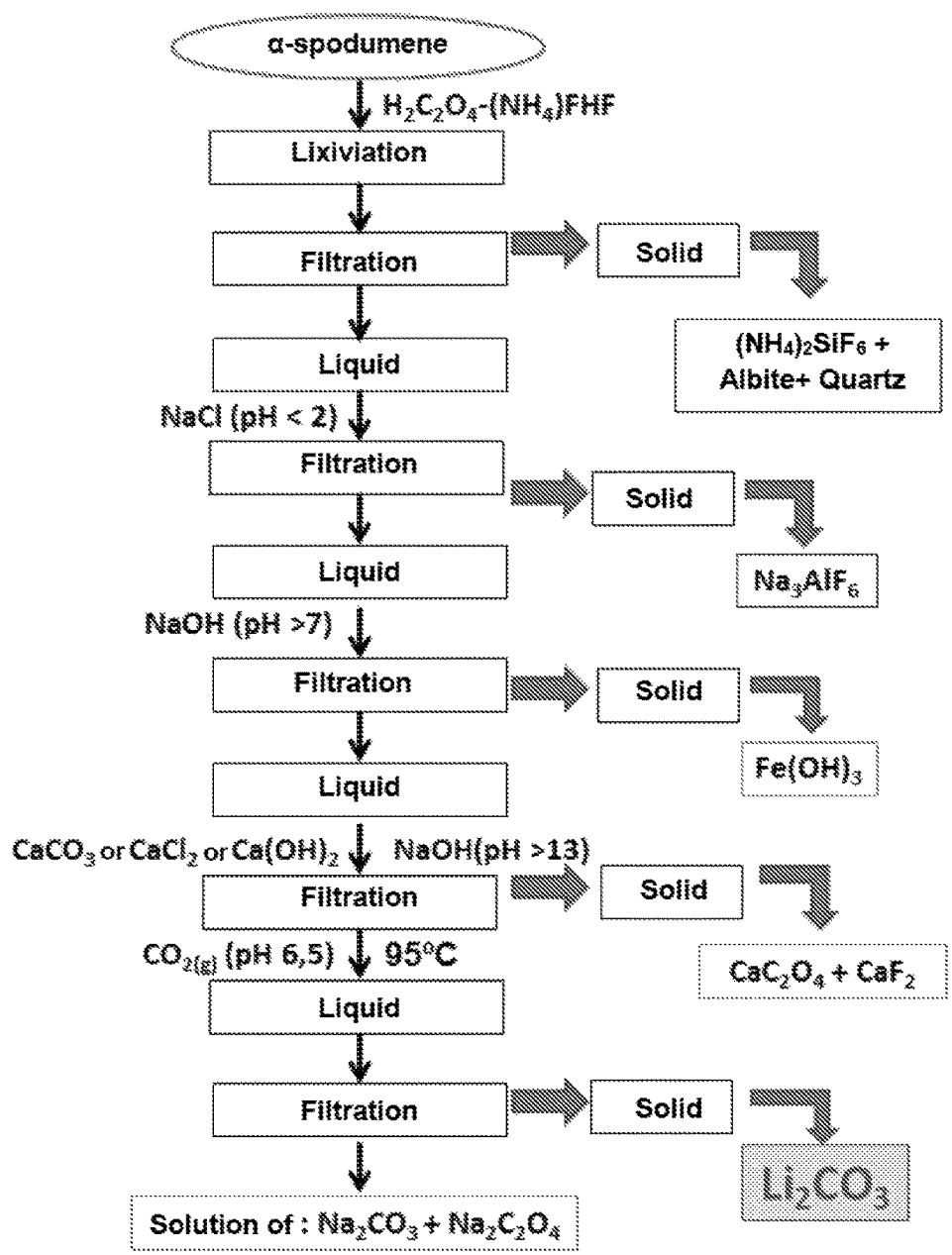
FIG. 35. Flow sheet of the obtainment of $Li_2CO_3$ from lixiviation of α-spodumene with $H_2C_2O_4$—$(NH_4)FHF$.

In another preferred embodiment, the process of the invention comprises the process E (FIG. 24) for the production of LiF from the lixiviates of α-spodumene with HF or HF+$H_2SO_4$. LiF is obtained as the main product and $Na_3AlF_6$, $K_2SiF_6$, $Fe(OH)_3$, $CaF_2$ and NaF as by-products. It should be noted that LiF has many industrial applications.

FIGS. 25 to 35 show different embodiments of the process of the invention using α-spodumene as the raw material.

Assays and processes have been carried out in order to obtain lithium from lepidolite as raw material, as shown below:

For the assays at less than 100° C., a 1000 ml PVC reactor was used, equipped with a mechanical stirring system, a temperature control system and a thermostatic bath.

For the assays at more than 100° C., a 450 ml Parr reactor, built in Monel alloy was used, equipped with a electromagnetic stirring system, a heating mantle and a control unit.

The mineral used was lepidolite from the mine "Las Cuevas" located in the San Martin Department, in the province of San Luis, Argentina.

Characterization of the mineral by X ray diffraction (XRD) was performed in a Rigaku D-Max III C diffractometer, operated at 35 kV and 30 mA, using Cu Kα radiation and a Ni filter, λ=0.15418 nm.

In Table 2, the overall composition of the mineral as determined by AAS, XRF and fluoride ion selective electrode, Thermo Scientific Orion, g is shown.

TABLE 2 overall composition of the mineral

| Compound | % (w/w) | Compound | % (w/w) | Compound | % (w/w) |
|---|---|---|---|---|---|
| $SiO_2$ | 50.78 | Mn | 0.24 | F | 4.46 |
| $Al_2O_3$ | 26.93 | K | 6.5 | Others | 1.41 |
| Fe | 0.13 | Na | 1.25 | | |
| Ca | 0.14 | Li | 2.0 | | |

Figure 36:
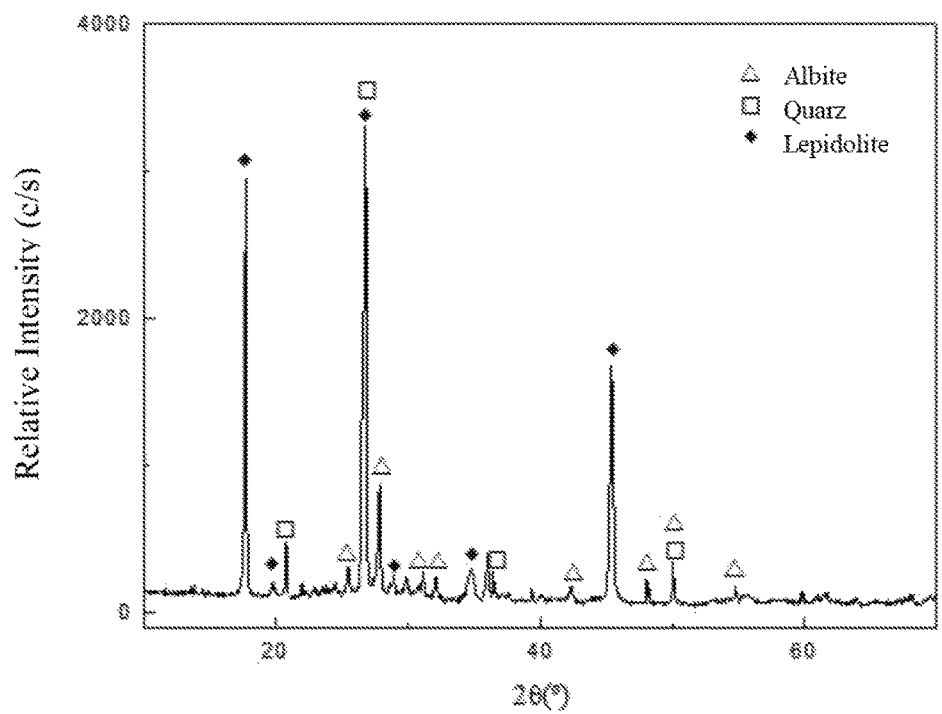
FIG. 36. Diffractograms of the lepidolite mineral.

The results from the characterization by XRD are shown in FIG. 36. In FIG. 36 the sample is observed to be mainly composed by lepidolite (JCPDS 10-0484), together with albite (ICDD 96-900-1631) and quartz (JCPDS 33-1161).

Dissolution Assays

According to the results obtained, the following dissolution reaction for lepidolite is postulated:

$$KLi_2AlSi_4O_{10}F(OH)_{(s)} + 32HF_{(aq)} \rightarrow 2LiF_{(aq)} + H_3AlF_{6(aq)} + 4H_2SiF_{6(aq)} + 2LiF_{(aq)} + 11H_2O \quad (6)$$

The course of the dissolution reaction was calculated as a function of extracted Li, which was determined by atomic absorption. The Li extraction percentage was calculated with the following formula:

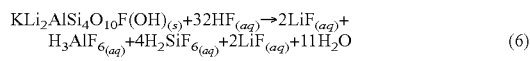

$$\% X = \frac{Li_s}{Li_m} 100 \quad (7)$$

Where: $Li_m$, is the initial amount of Li in the mineral; $Li_s$: is the amount of Li in the solution after lixiviation.

The operative variables assessed were: temperature; HF concentration and reaction time.

Figure 37:
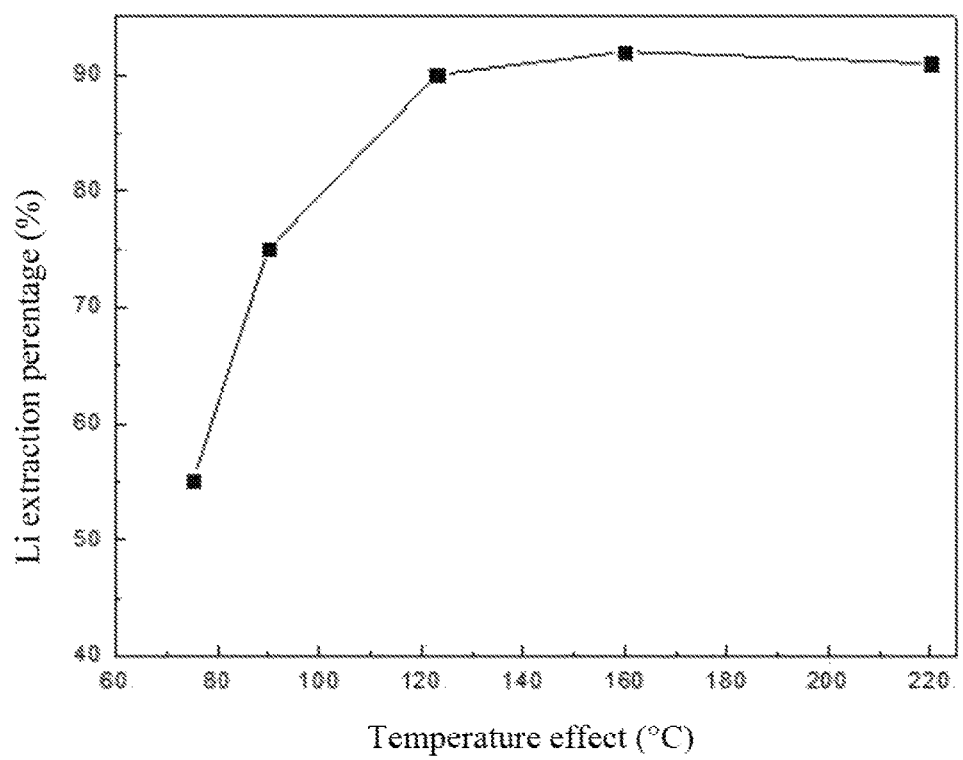
FIG. 37. Effect of the reaction temperature on the extraction of lepidolite.

The influence of reaction temperature over lepidolite dissolution is shown in FIG. 37. For these assays, the operative variables that were kept constant were the following: solid liquid ratio, 1.82% w/v; stirring speed, 330 rpm; reaction time 60 min and a particle size comprised between 29 and 45 μm. The HF concentration used was 7% (v/v) HF.

In FIG. 37 it is observed that dissolution of the mineral increases as reaction temperature increases. These results are consistent with those found in the literature where temperature has a marked effect increasing the reactivity of the solids and favoring the dissolution reaction.

FIG. 37 shows that working at 123° C. with a HF concentration slightly above the stoichiometric value (7% v/v) as calculated for reaction (6) a dissolution of the mineral close to 90% was obtained.

Effect of the HF Concentration

The assays for the lixiviation of lepidolite with different HF concentrations were performed using a particle size comprised between 29 and 45 μm, a reaction time of 60 min, a stirring speed of 330 rpm and a temperature of 123° C.

Figure 38:
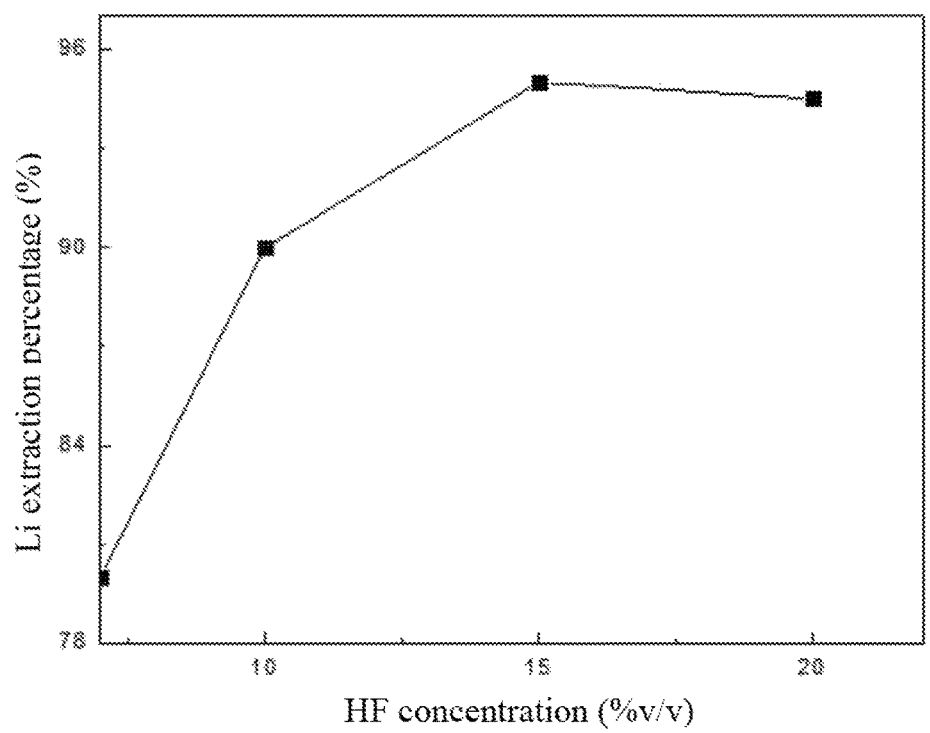
FIG. 38. Effect of HF concentration on the extraction of Li from lepidolite.

In FIG. 38 the results obtained of the effect of HF concentration over dissolution of lepidolite working at 123° C., are shown.

In FIG. 38 it may be seen that the increase in the concentration of the lixiviating agent produces an increase in the dissolution of the mineral. This is due to the fact that for high HF concentrations, there is a larger availability of $F^-$ and $H^+$ ions for reacting with the mineral and forming the soluble products.

Effect of Reaction Time

The assays for the lixiviation of lepidolite at different reaction times were performed using a temperature of 123° C., a particle size comprised between 29 and 45 μm and a stirring speed of 330 rpm.

The assessed reaction times were: 30, 60, 120, 180 and 240 minutes.

Figure 39:
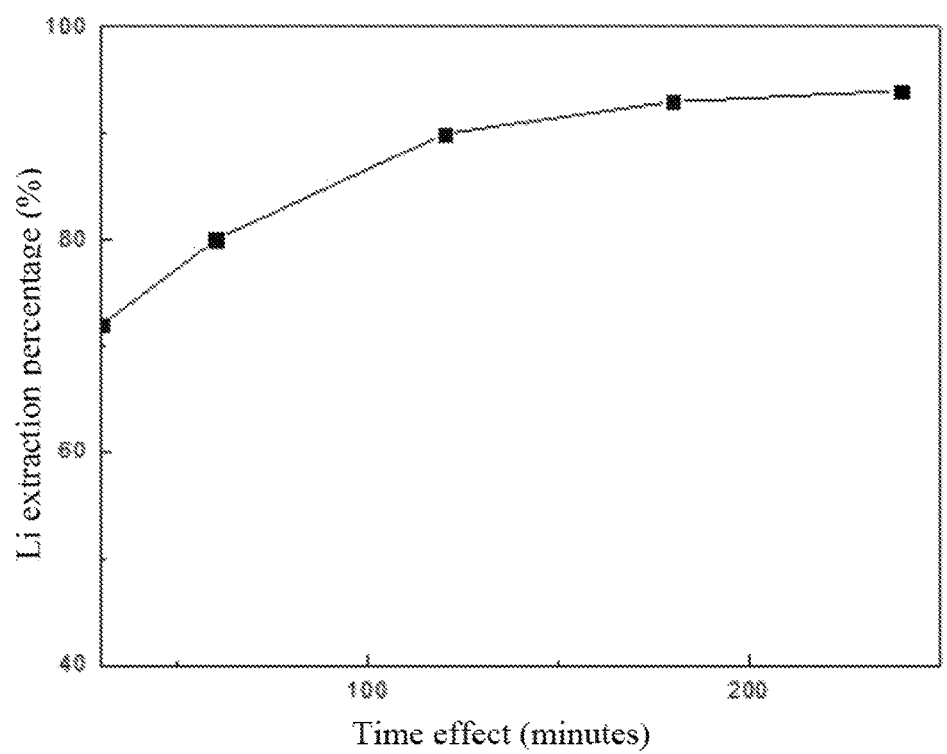
FIG. 39. Effect of the reaction time on the extraction of Li from lepidolite.

In FIG. 39 the results of the effect of reaction time over dissolution of lepidolite dissolution is shown, working at a HF concentration of 7% (v/v).

Data shown in FIG. 39 indicate that when increasing the reaction time an increase in lepidolite dissolution is produced, which is expected given that the increase of contact time between the mineral and the lixiviating agent leads to a larger dissolution of the solid.

Separation Assays

Step 1, separation of K during lixiviation as $K_2SiF_6$: In this step, since lepidolite contains potassium, which is solubilized during the process of mineral dissolution and then, precipitates together with a part of the silicon and the fluorine as the compound $K_2SiF_6$ according to the following reaction:

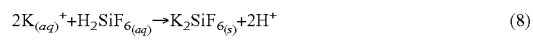

$$2K^+_{(aq)} + H_2SiF_{6(aq)} \rightarrow K_2SiF_{6(s)} + 2H^+ \quad (8)$$

Figure 40:
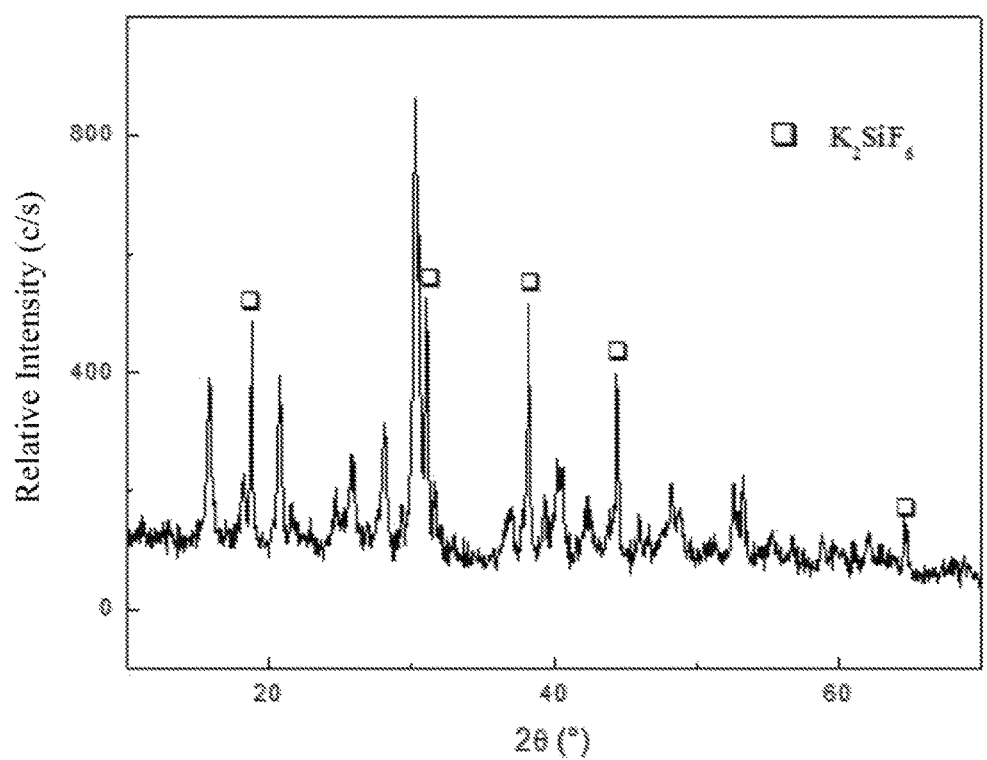
FIG. 40. Solid obtained during the lixiviation process.

In FIG. 40, the diffractogram of the solid obtained in this stage is shown.

In FIG. 40 appearance of the compound $K_2SiF_6$, formed during the lixiviation process (reaction 8) is observed. In addition, other phases were detected which correspond to the gangue present in the starting sample.

Step 2, separation of Al and Si from the solution as $Na_3AlF_6$ and $Na_2SiF_6$: In this step, the solutions generated by lixiviation are treated with an amount of NaOH as calculated from reaction (9). The pH reached by the solution at this step was less than 3.

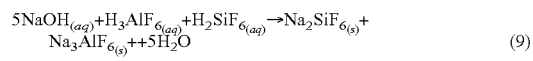

$$5NaOH_{(aq)} + H_3AlF_{6(aq)} + H_2SiF_{6(aq)} \rightarrow Na_2SiF_{6(s)} + Na_3AlF_{6(s)} + 5H_2O \quad (9)$$

Figure 41:
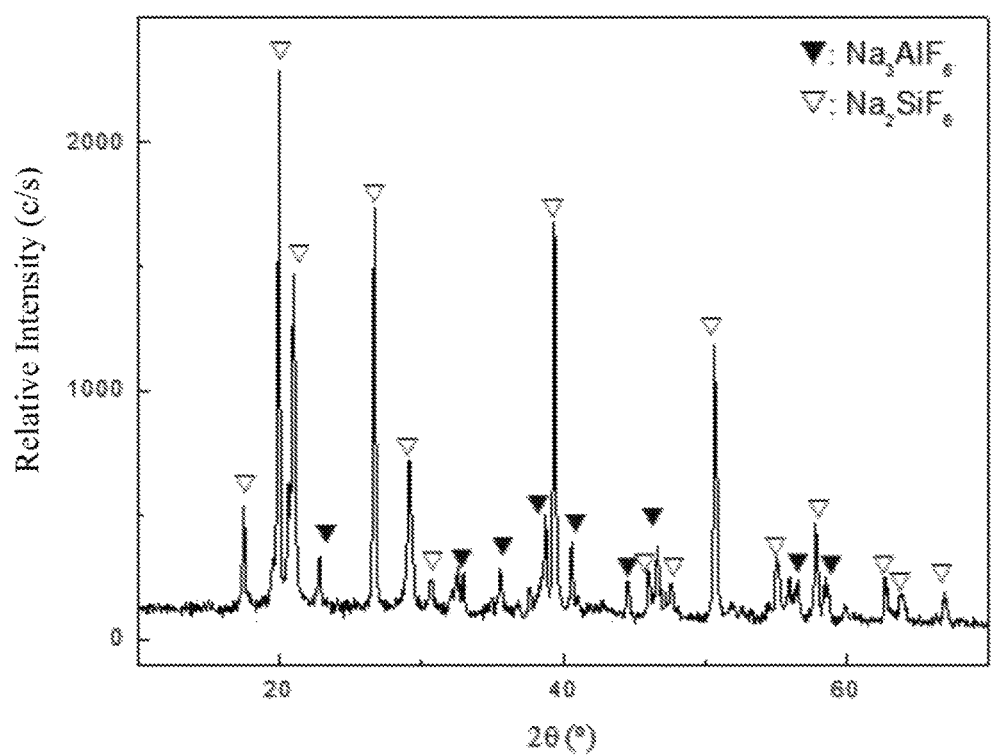
FIG. 41. Diffractogram of the solids obtained in step 2.

In FIG. 41, the diffractograms of the solids obtained in this stage are shown.

The results obtained show that with the addition of NaOH selective precipitation of the compounds $Na_2SiF_6$ and $Na_3AlF_6$ was achieved, since no appearance of other lithium compound was observed. By carrying out a gravimetric analysis of the precipitate, the precipitation was confirmed to be quantitative (total) with respect to postulated reaction 9.

Step 3, removal of remaining $F^-$ as $CaF_2$: The filtrate obtained in Step 2 is treated with a $Ca(OH)_2$ solution in order to remove F⁻ from the medium as solid $CaF_2$, which precipitates and is filtered out.

Figure 42:
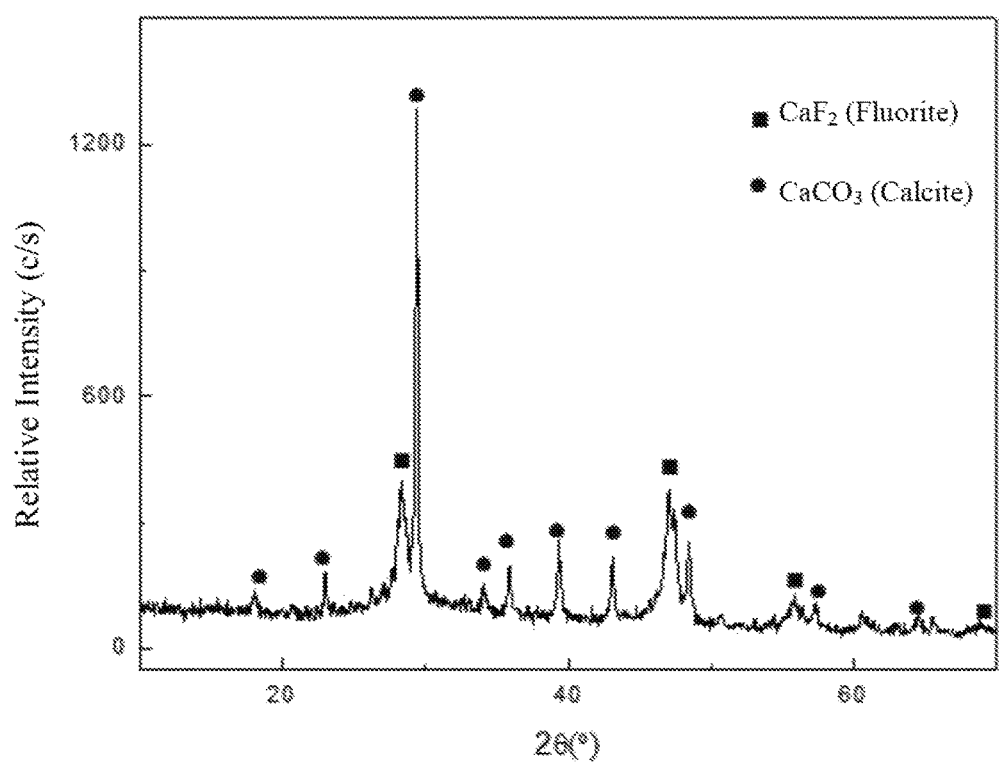
FIG. 42. Diffractogram of the solids obtained in step 3.

In FIG. 42, the diffractogram of the compounds obtained in this stage is shown.

In FIG. 42 the achievement of precipitation of the compound $CaF_2$ is observed. In addition, calcite was detected which comes from the precipitating agent, $Ca(OH)_2$, since this is commercial type.

Step 4, recovery of Li as $Li_2CO_3$: The filtrate obtained in Step 3, to which fluorine ion content was totally removed, is subjected to evaporation until reaching a Li concentration of 20 g/L. Then, the pH of this solution is adjusted (pH 13-14) and carbonation thereof is performed by some of the means found in the literature (bubbling $CO_2$ (g) or adding a saturated $Na_2CO_3$ solution) until lowering the pH of the solution down to 6.5. Finally, the solution was heated at a temperature of 95° C., thus causing precipitation of Li as $Li_2CO_3$.

Figure 43:
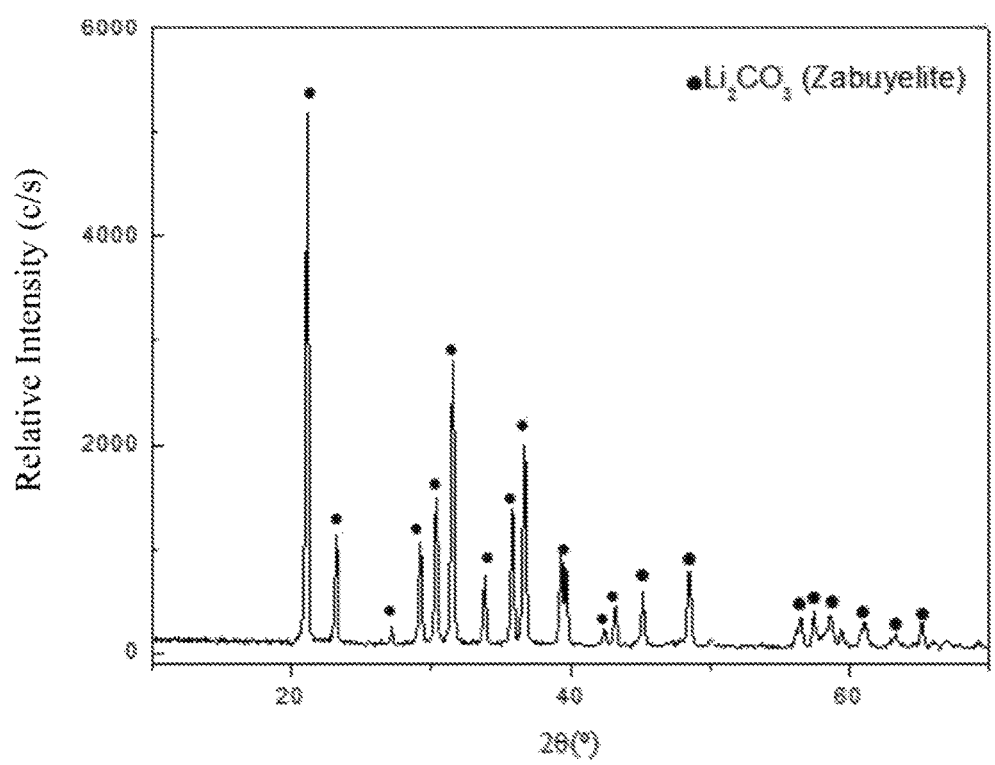
FIG. 43. Diffractogram of the solid obtained in step 4.
Figure 44:
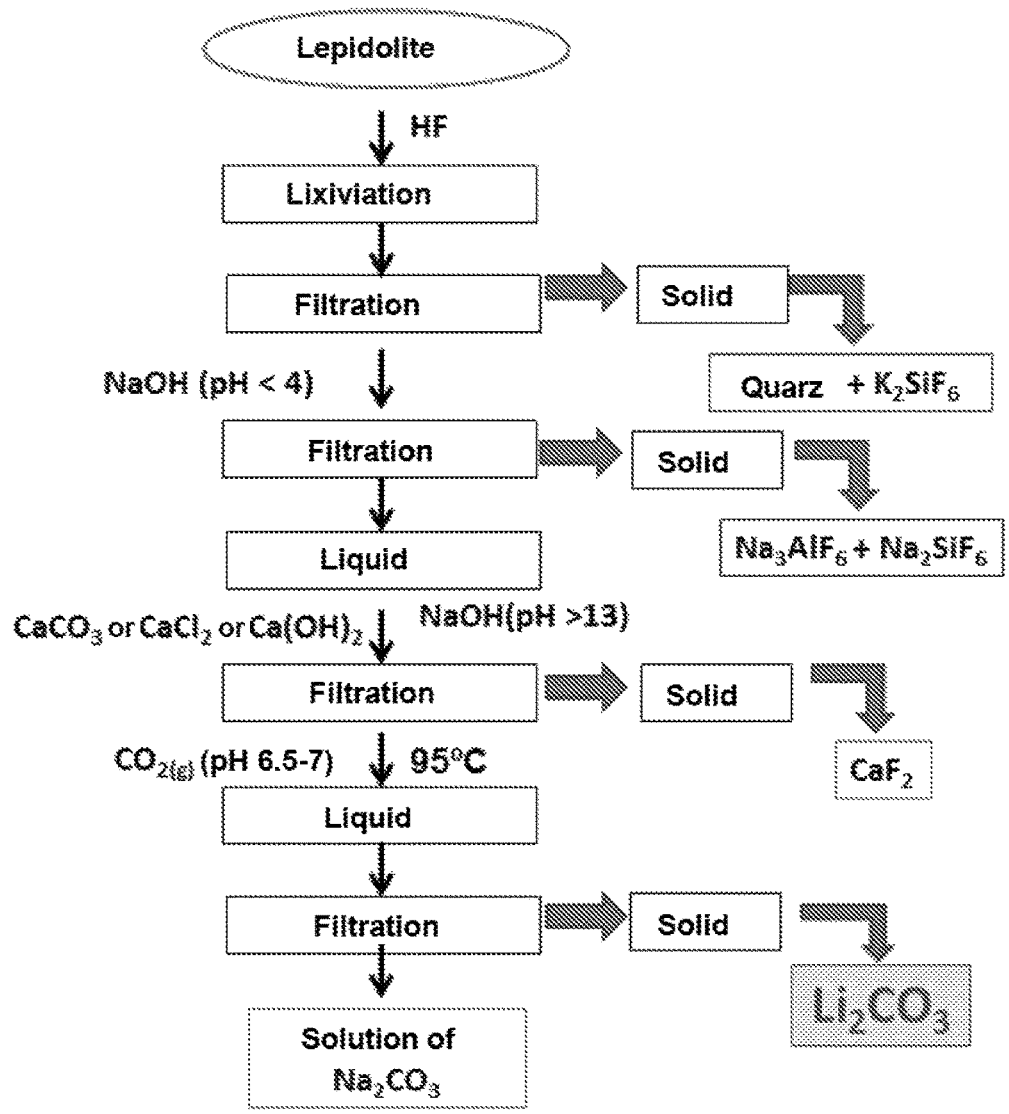
FIG. 44. Flow sheet of the obtainment of $Li_2CO_3$ from lixiviation of lepidolite with HF.
Figure 45:
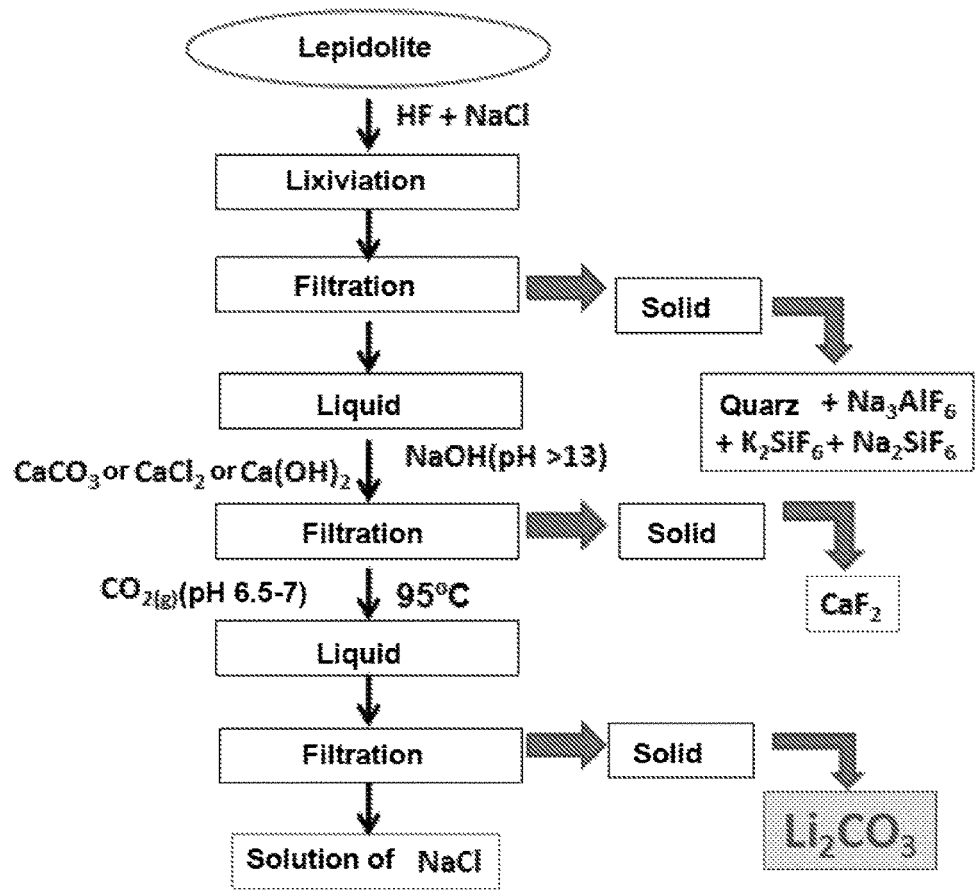
FIG. 45. Flow sheet of the obtainment of $Li_2CO_3$ from lixiviation of lepidolite with HF—NaCl.
Figure 46:
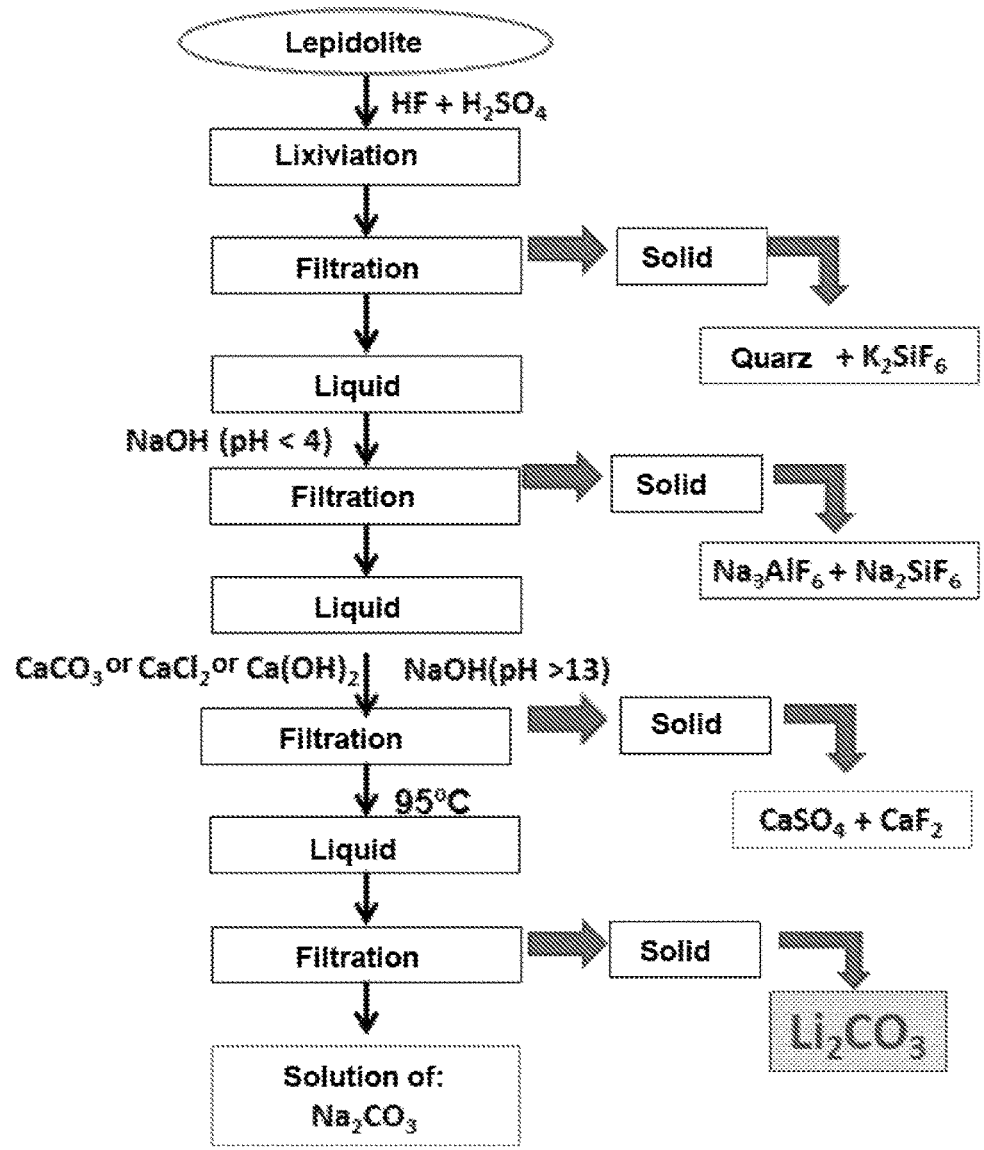
FIG. 46. Flow sheet of the obtainment of $Li_2CO_3$ from lixiviation of lepidolite with HF—$H_2SO_4$.
Figure 47:
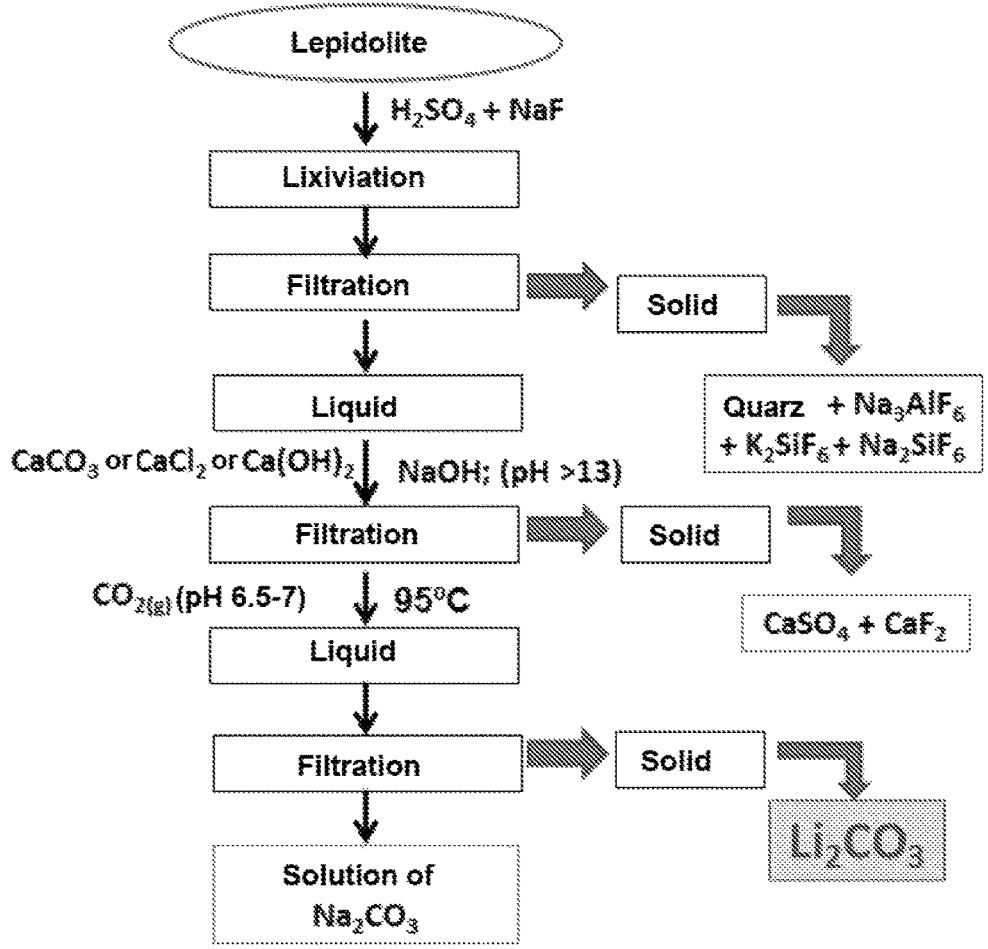
FIG. 47. Flow sheet of the obtainment of $Li_2CO_3$ from lixiviation of lepidolite with $H_2SO_4$—NaF.
Figure 48:
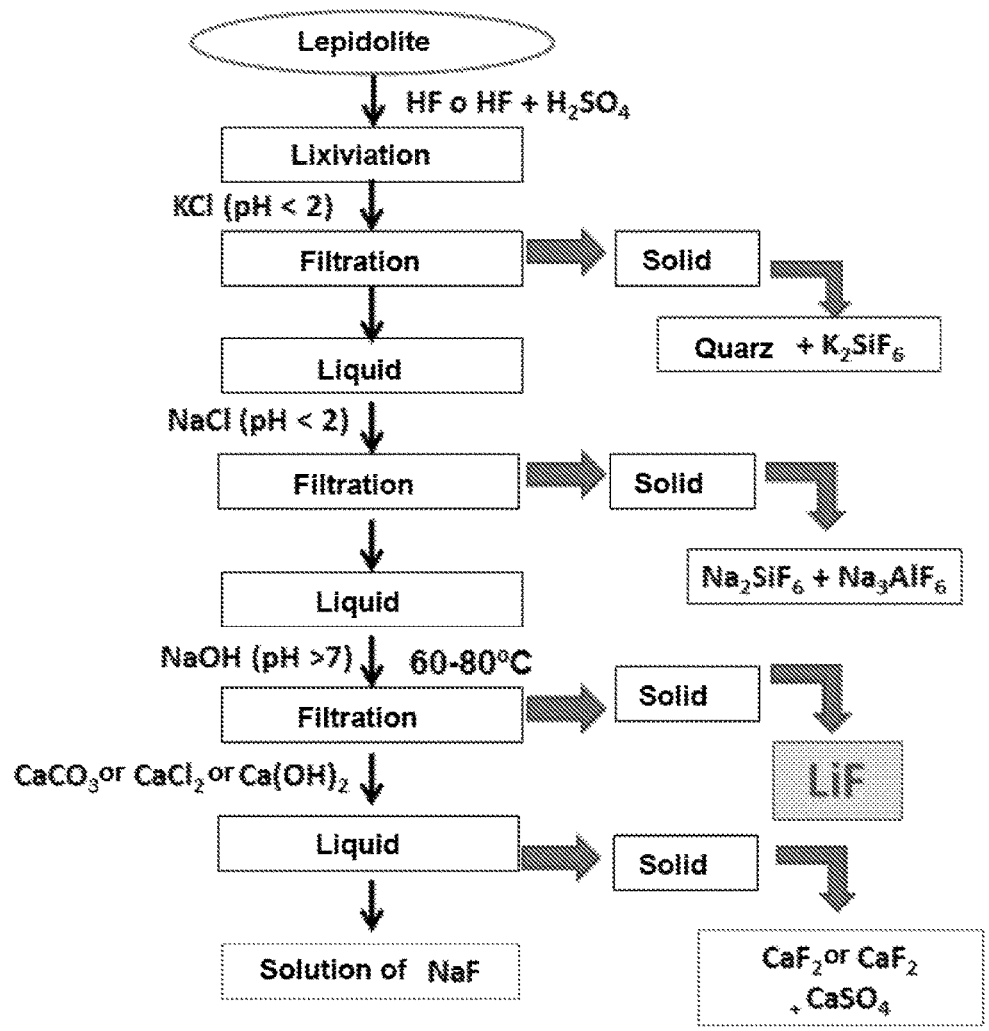
FIG. 48. Flow sheet of the obtainment of LiF from lixiviation of α-lepidolite with HF or HF—$H_2SO_4$.
Figure 49:
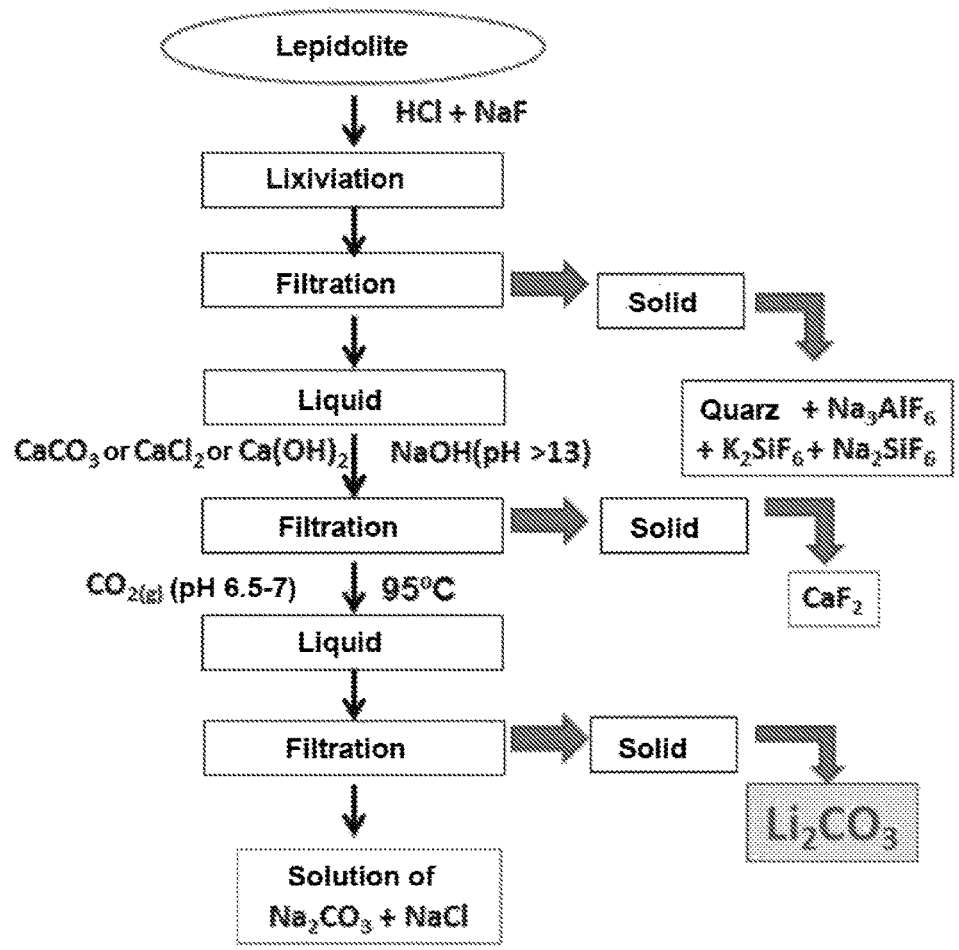
FIG. 49. Flow sheet of the obtainment of $Li_2CO_3$ from lixiviation of lepidolite with HCl—NaF.
Figure 50:
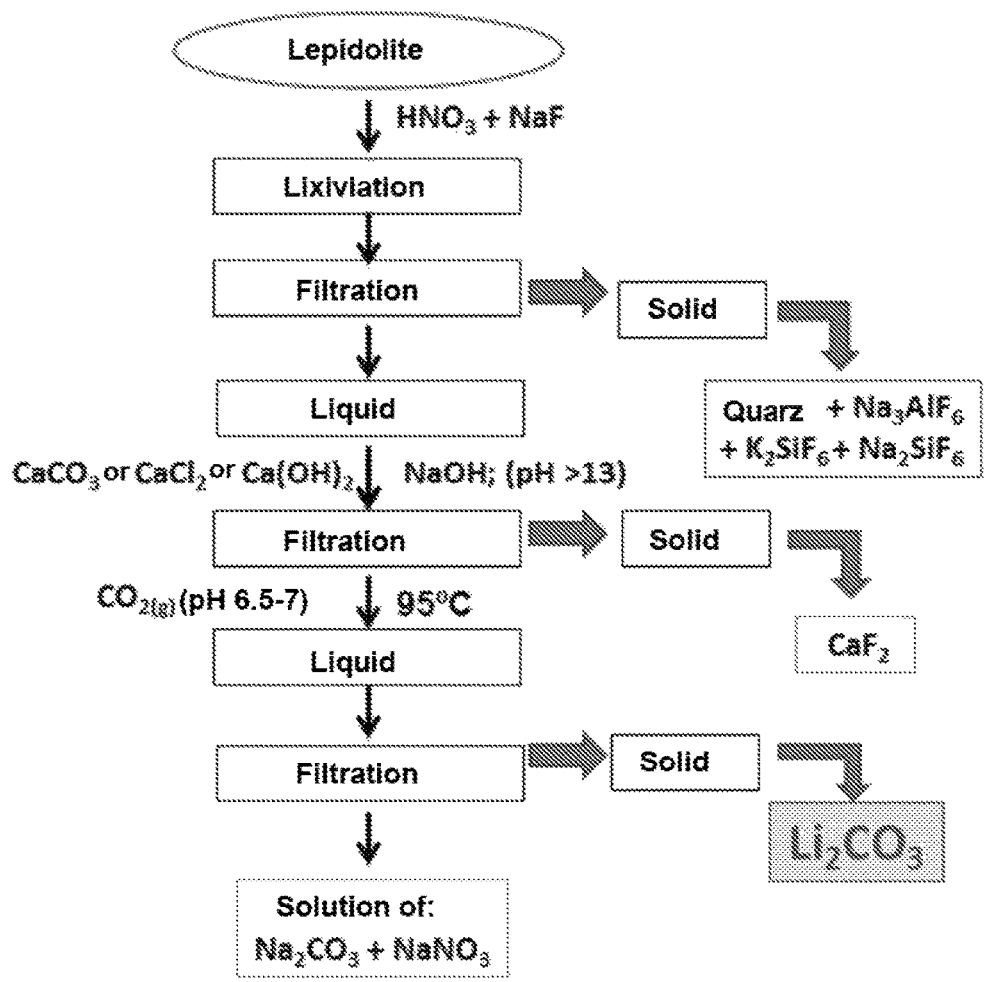
FIG. 50. Flow sheet of the obtainment of $Li_2CO_3$ from lixiviation of lepidolite with HNO₃—NaF.
Figure 51:
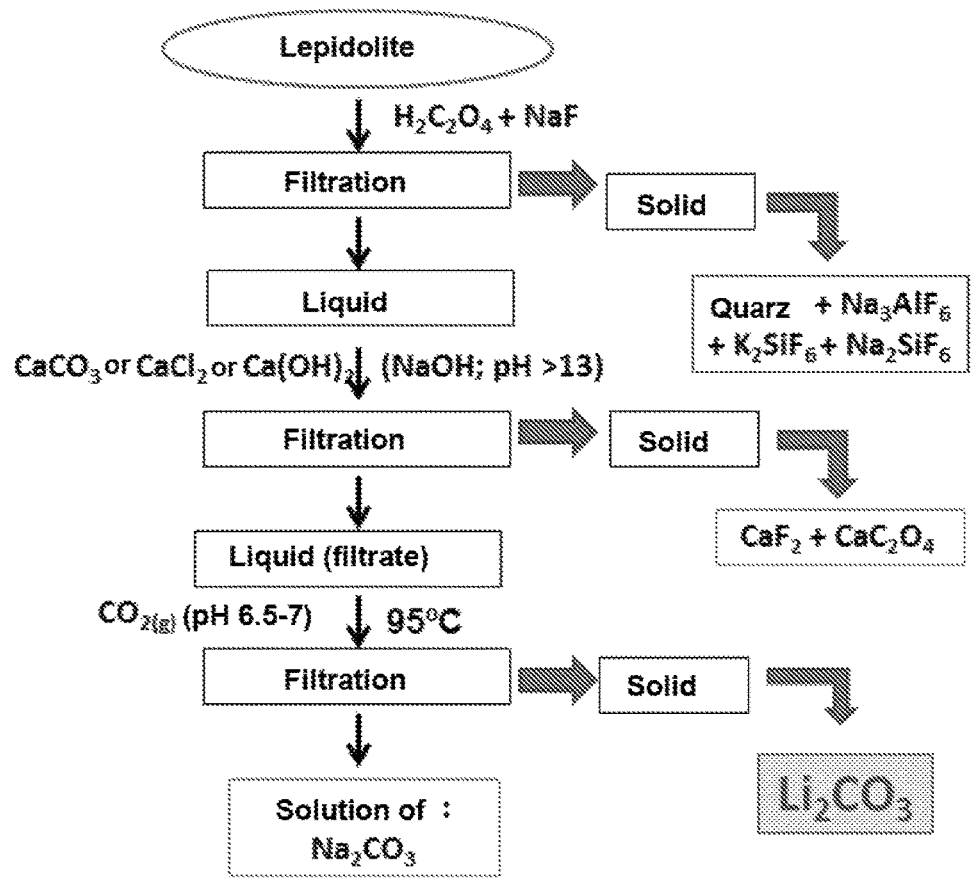
FIG. 51. Flow sheet of the obtainment of $Li_2CO_3$ from lixiviation of lepidolite with $H_2C_2O_4$—NaF.
Figure 52:
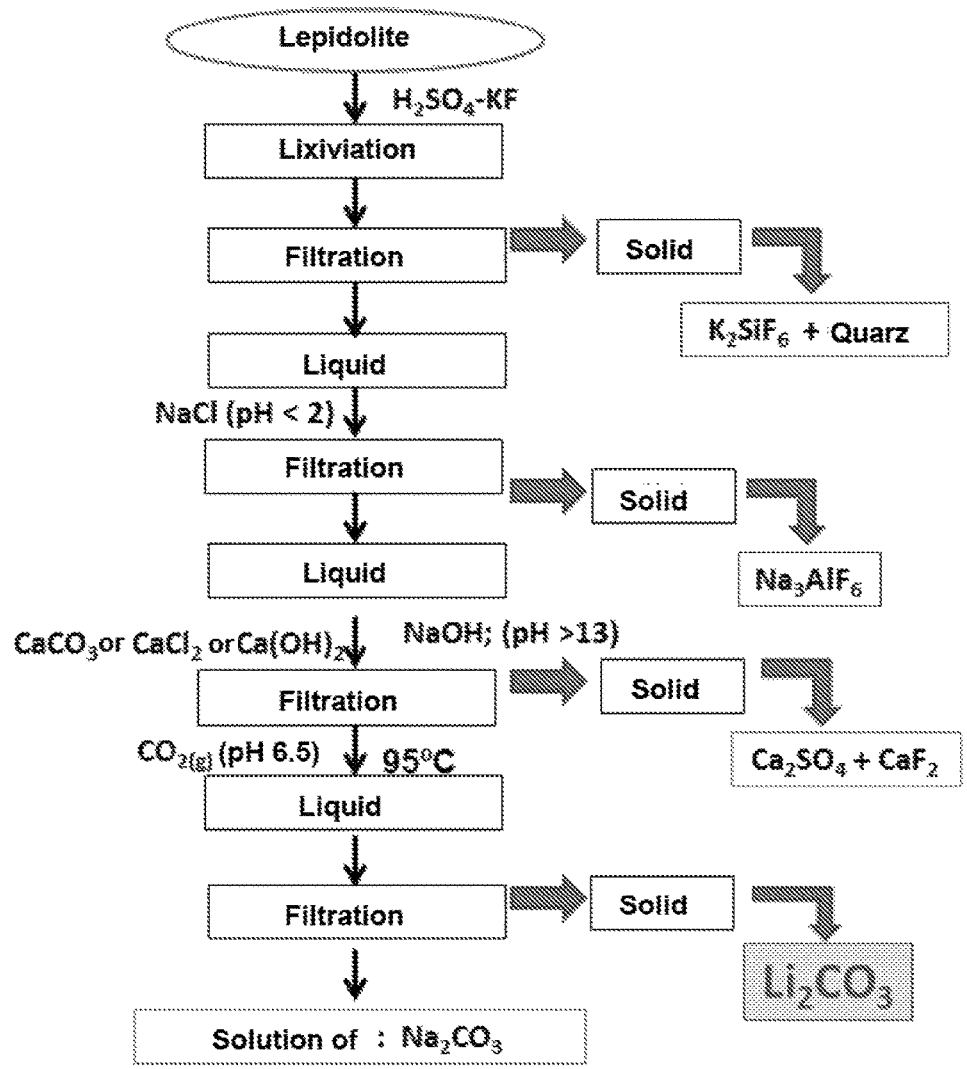
FIG. 52. Flow sheet of the obtainment of $Li_2CO_3$ from lixiviation of lepidolite with $H_2SO_4$—KF.
Figure 53:
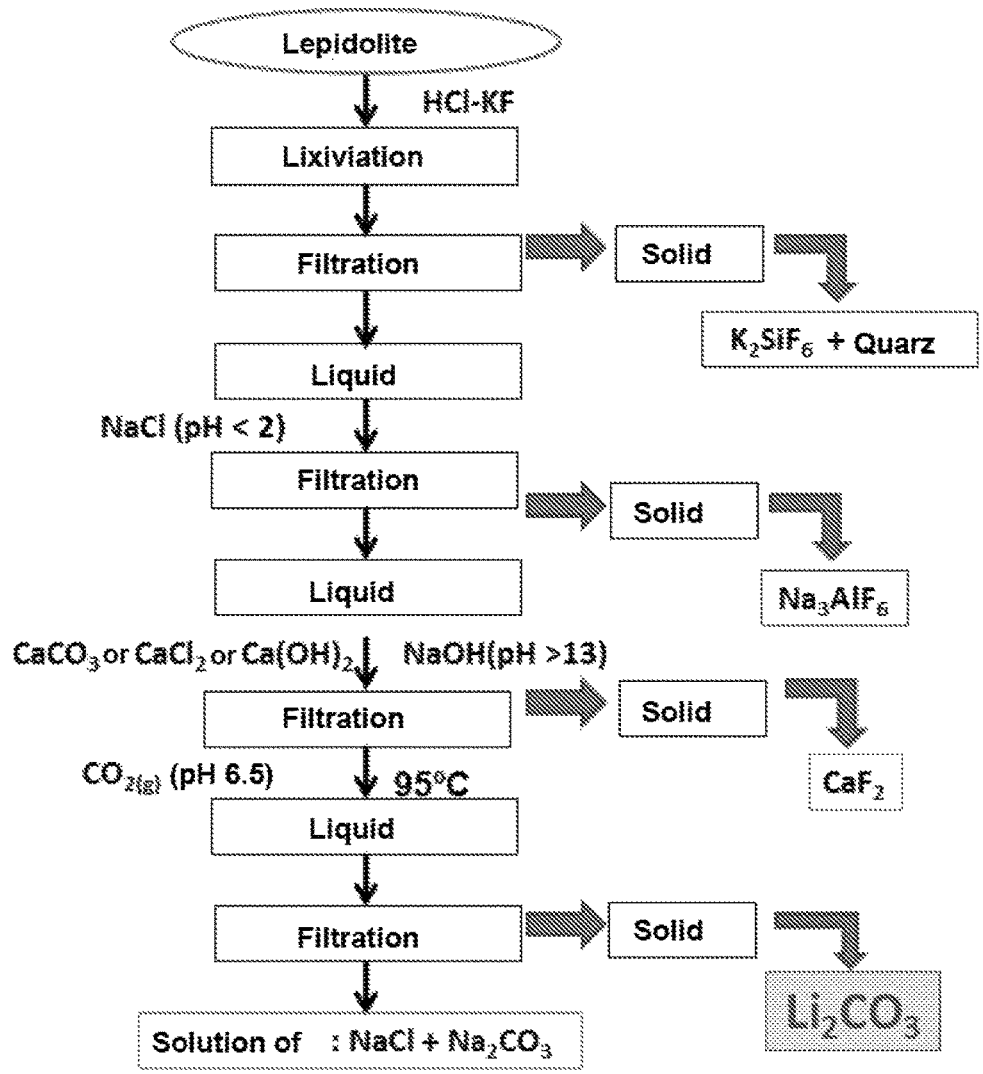
FIG. 53. Flow sheet of the obtainment of $Li_2CO_3$ from lixiviation of lepidolite with HCl—KF.
Figure 54:
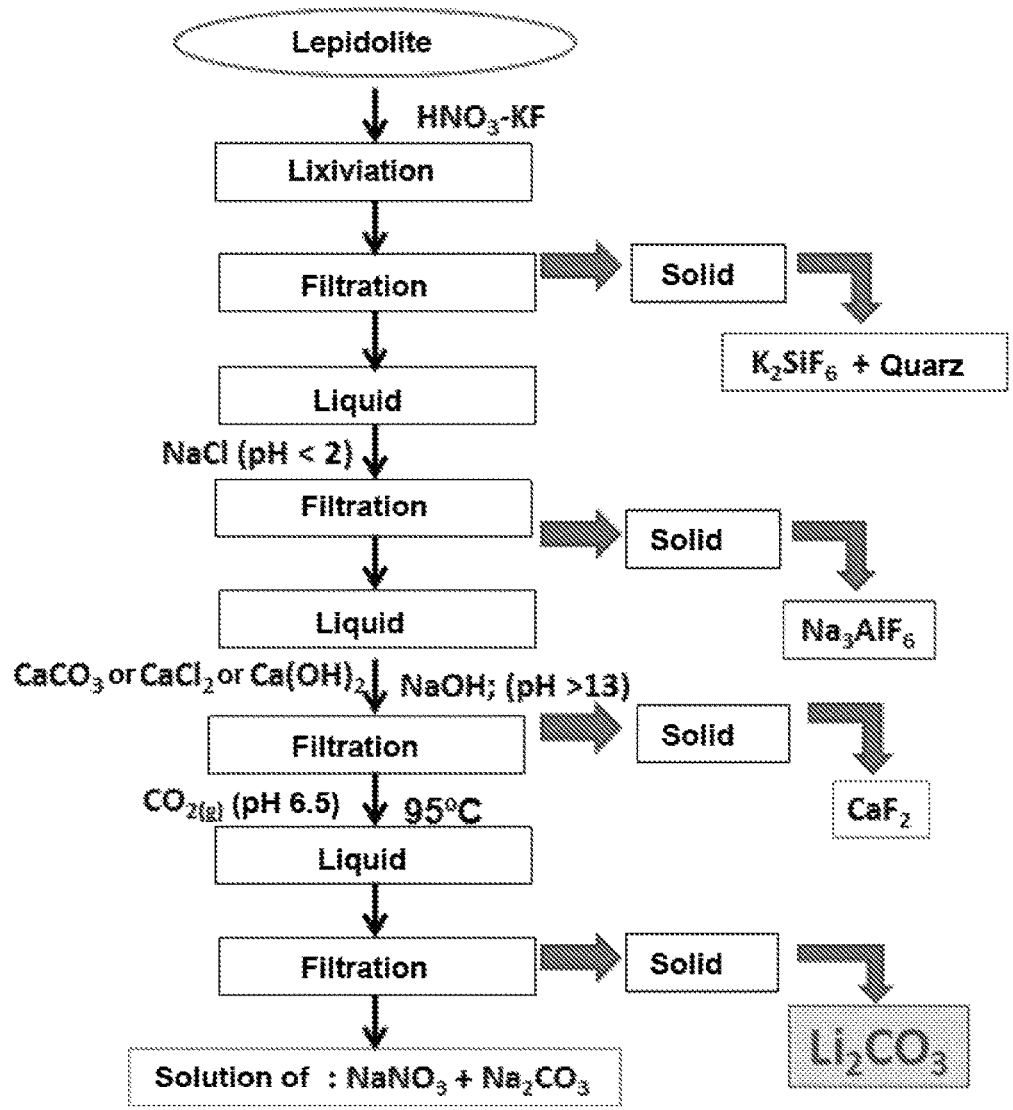
FIG. 54. Flow sheet of the obtainment of $Li_2CO_3$ from lixiviation of lepidolite with HNO₃—KF.
Figure 55:
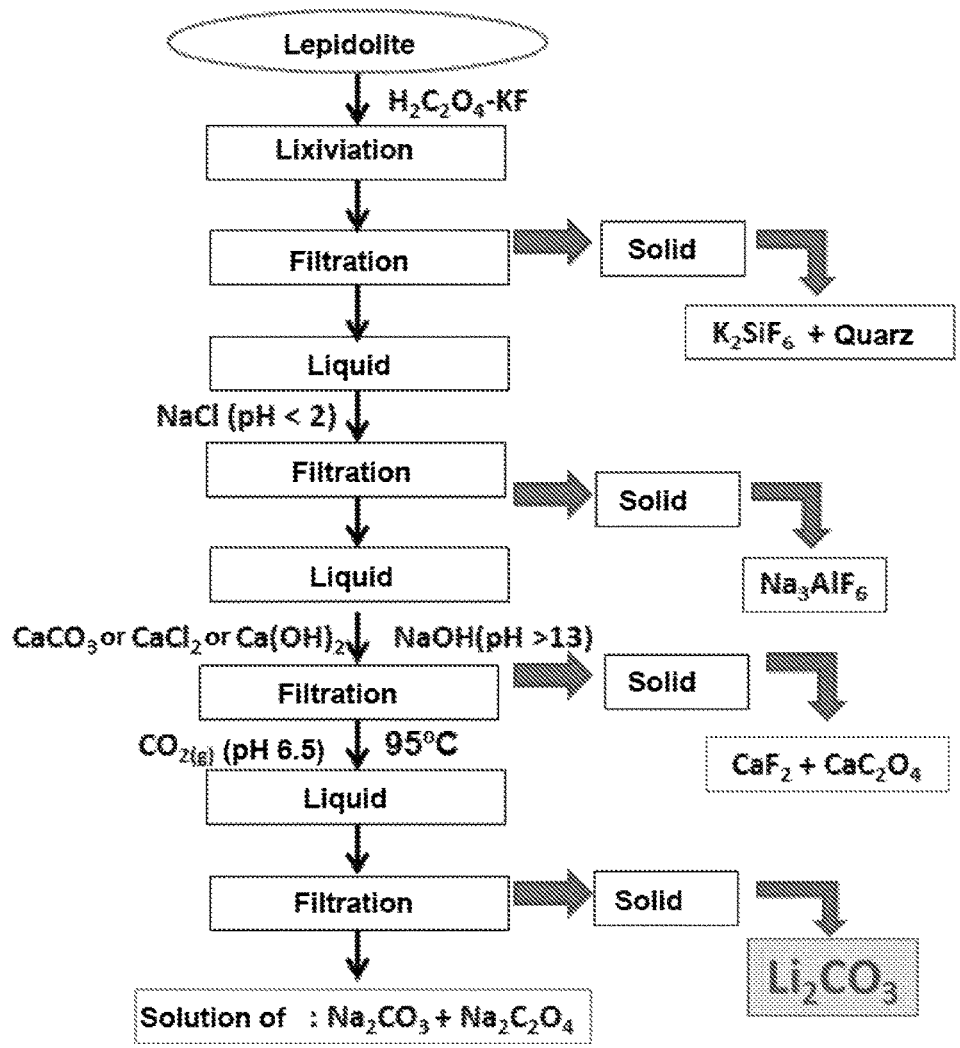
FIG. 55. Flow sheet of the obtainment of $Li_2CO_3$ from lixiviation of lepidolite with $H_2C_2O_4$—KF.
Figure 56:
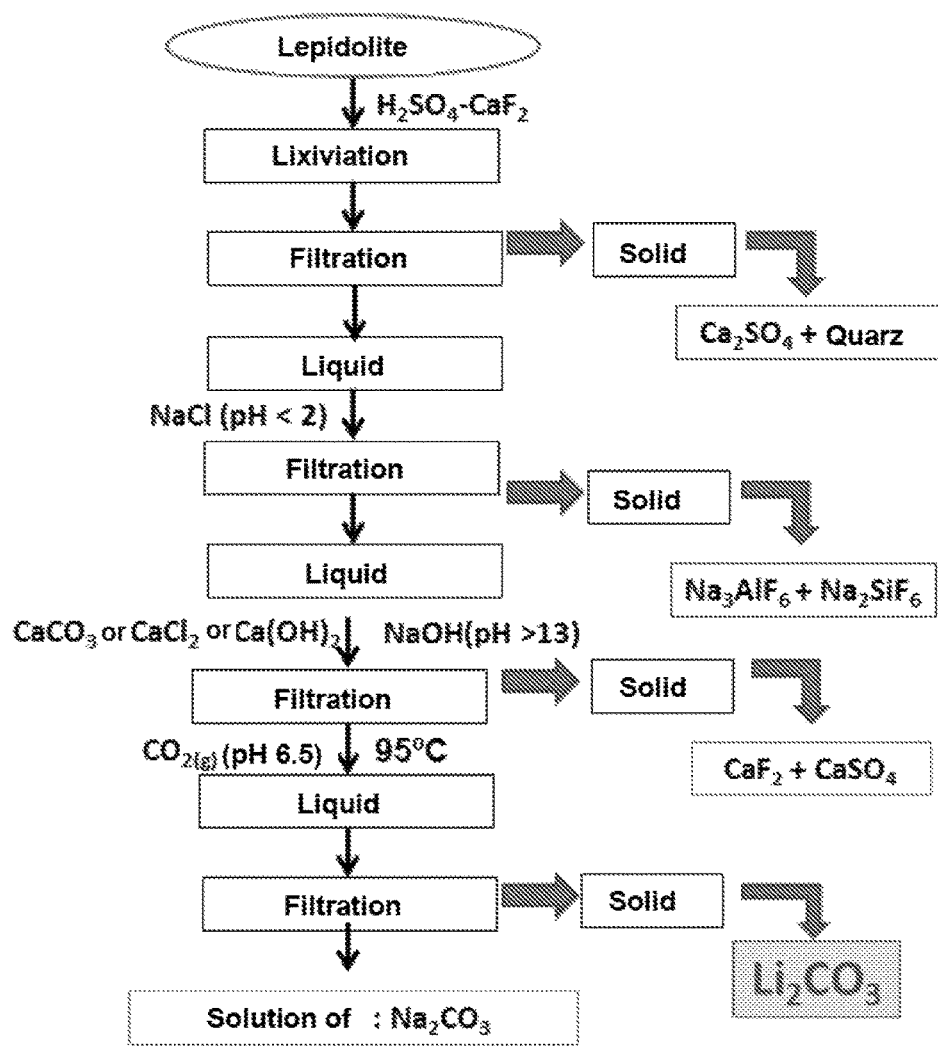
FIG. 56: Flow sheet of the obtainment of $Li_2CO_3$ from lixiviation of lepidolite with $CaF_2$—$H_2SO_4$.
Figure 57:
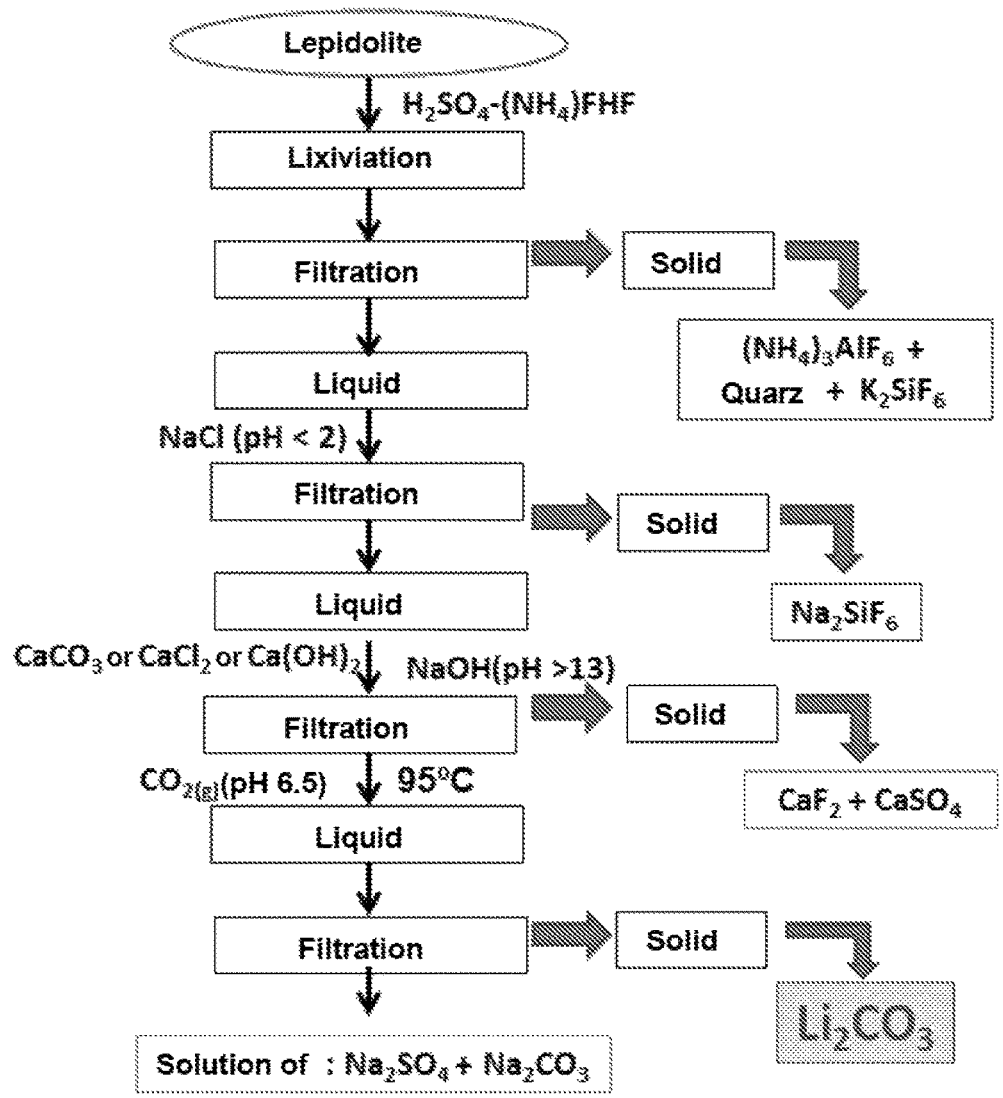
FIG. 57. Flow sheet of the obtainment of $Li_2CO_3$ from lixiviation of lepidolite with $H_2SO_4$—$(NH_4)FHF$.
Figure 58:
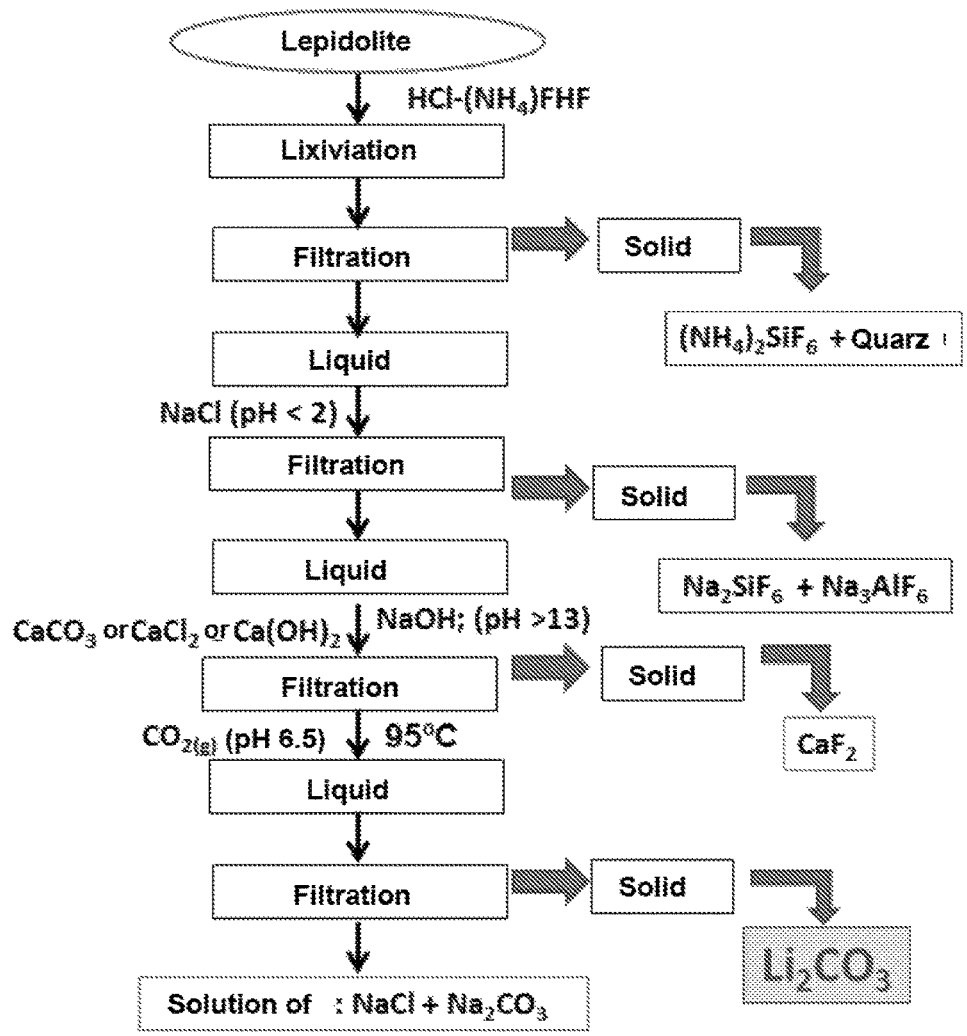
FIG. 58. Flow sheet of the obtainment of $Li_2CO_3$ from lixiviation of lepidolite with HCl—$(NH_4)FHF$.
Figure 59:
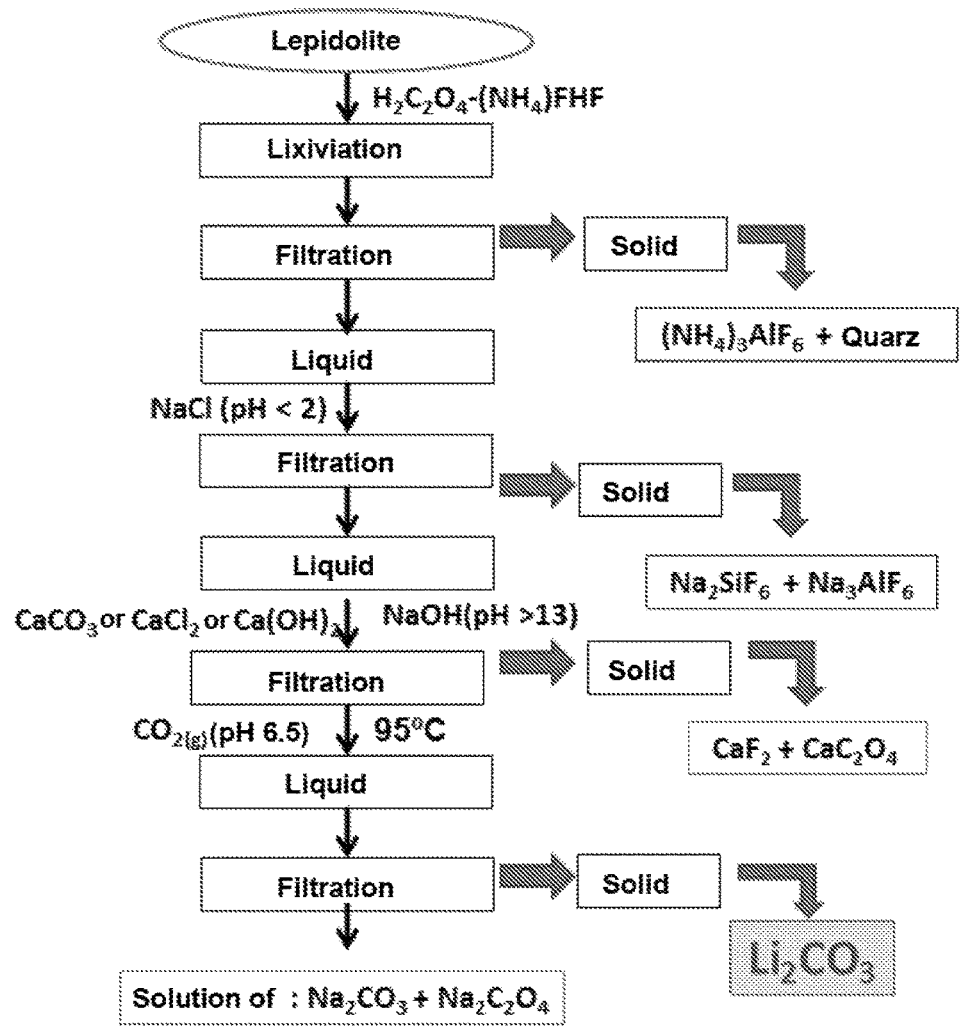
FIG. 59. Flow sheet of the obtainment of $Li_2CO_3$ from lixiviation of lepidolite with $H_2C_2O_4$—$(NH_4)FHF$.
Figure 60:
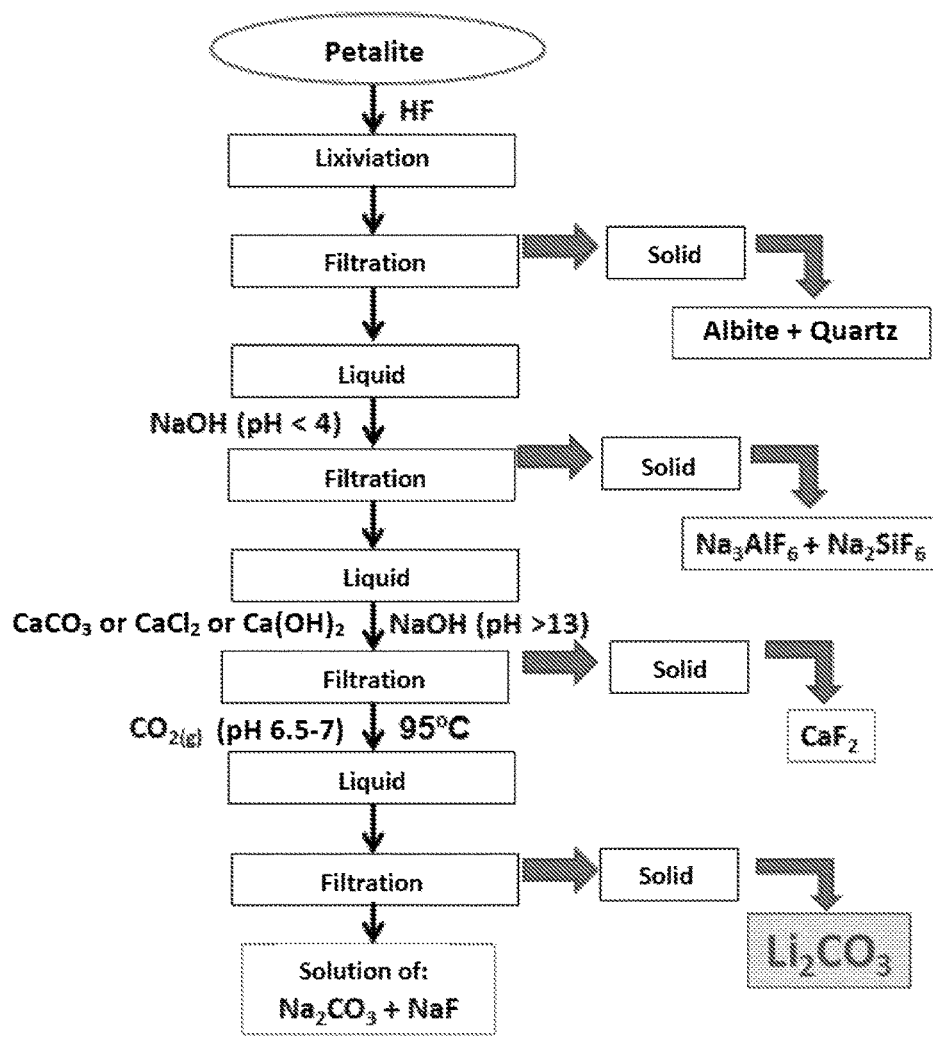
FIG. 60. Flow sheet of the obtainment of $Li_2CO_3$ from lixiviation of petalite with HF.
Figure 61:
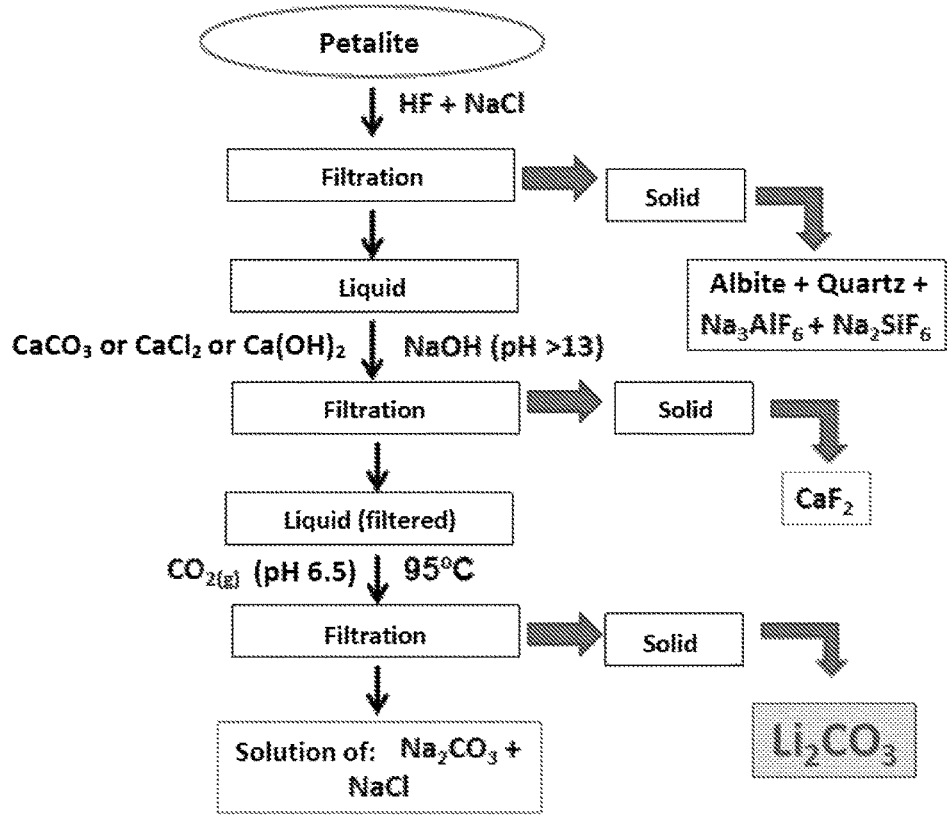
FIG. 61. Flow sheet of the obtainment of $Li_2CO_3$ from lixiviation of petalite with HF—NaCl.
Figure 62:
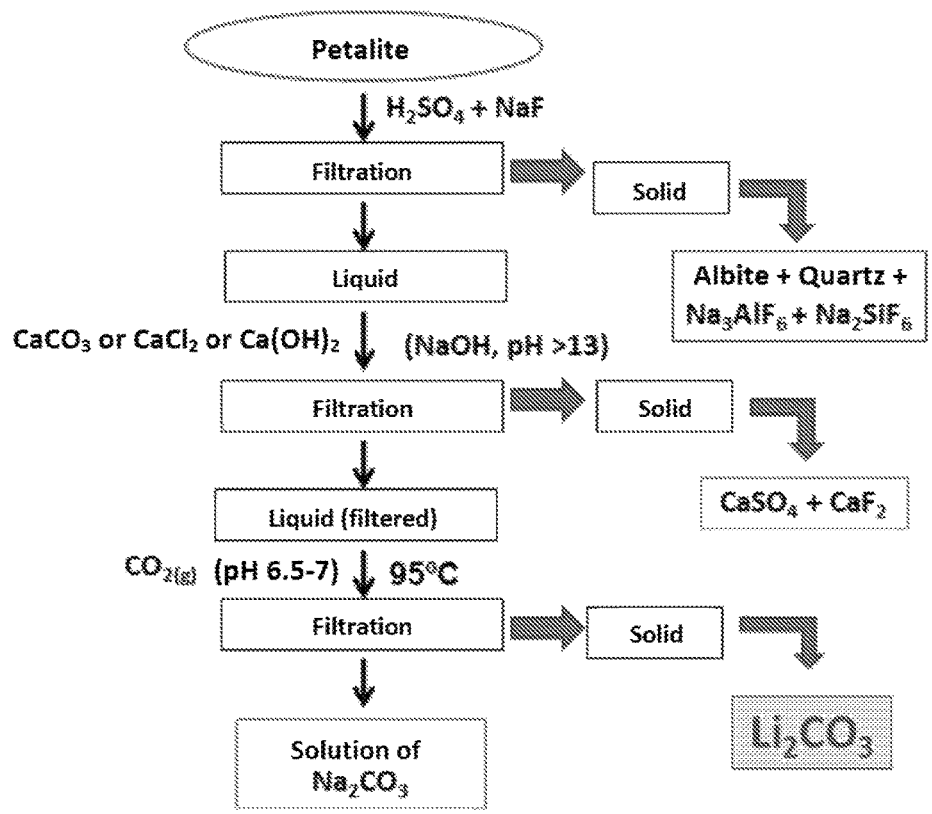
FIG. 62. Flow sheet of the obtainment of $Li_2CO_3$ from lixiviation of petalite with HF—$H_2SO_4$.
Figure 63:
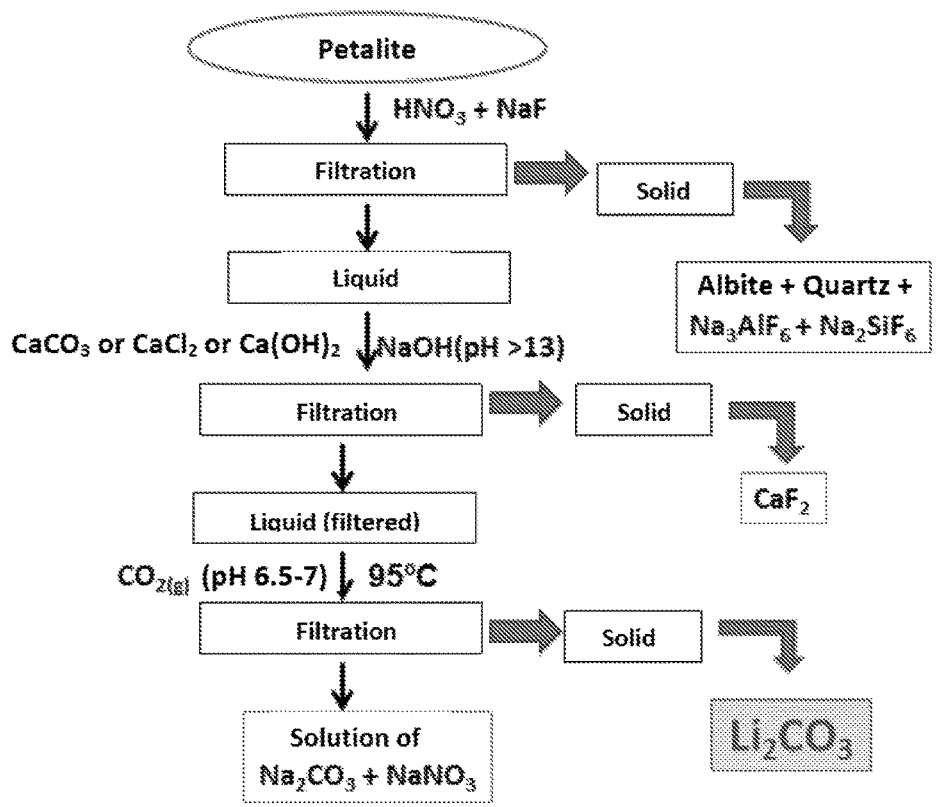
FIG. 63. Flow sheet of the obtainment of $Li_2CO_3$ from lixiviation of petalite with $H_2SO_4$—NaF.
Figure 64:
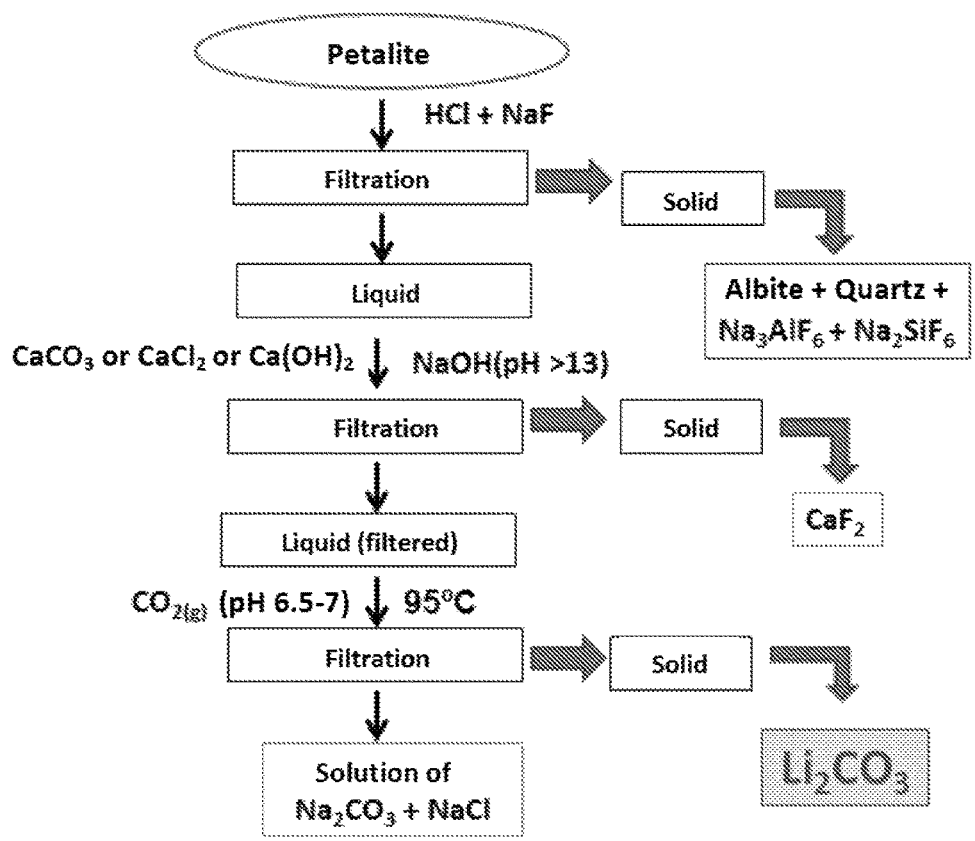
FIG. 64. Flow sheet of the obtainment of LiF from lixiviation of α-petalite with HF or HF—$H_2SO_4$.
Figure 65:
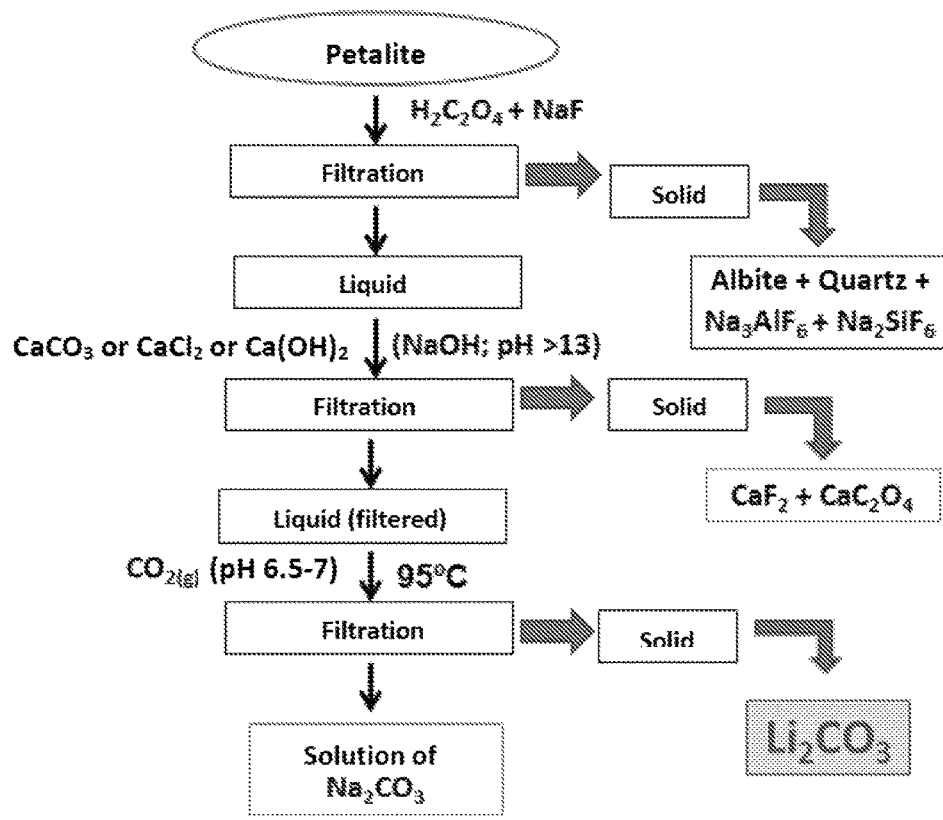
FIG. 65. Flow sheet of the obtainment of $Li_2CO_3$ from lixiviation of petalite with HCl—NaF.
Figure 66:
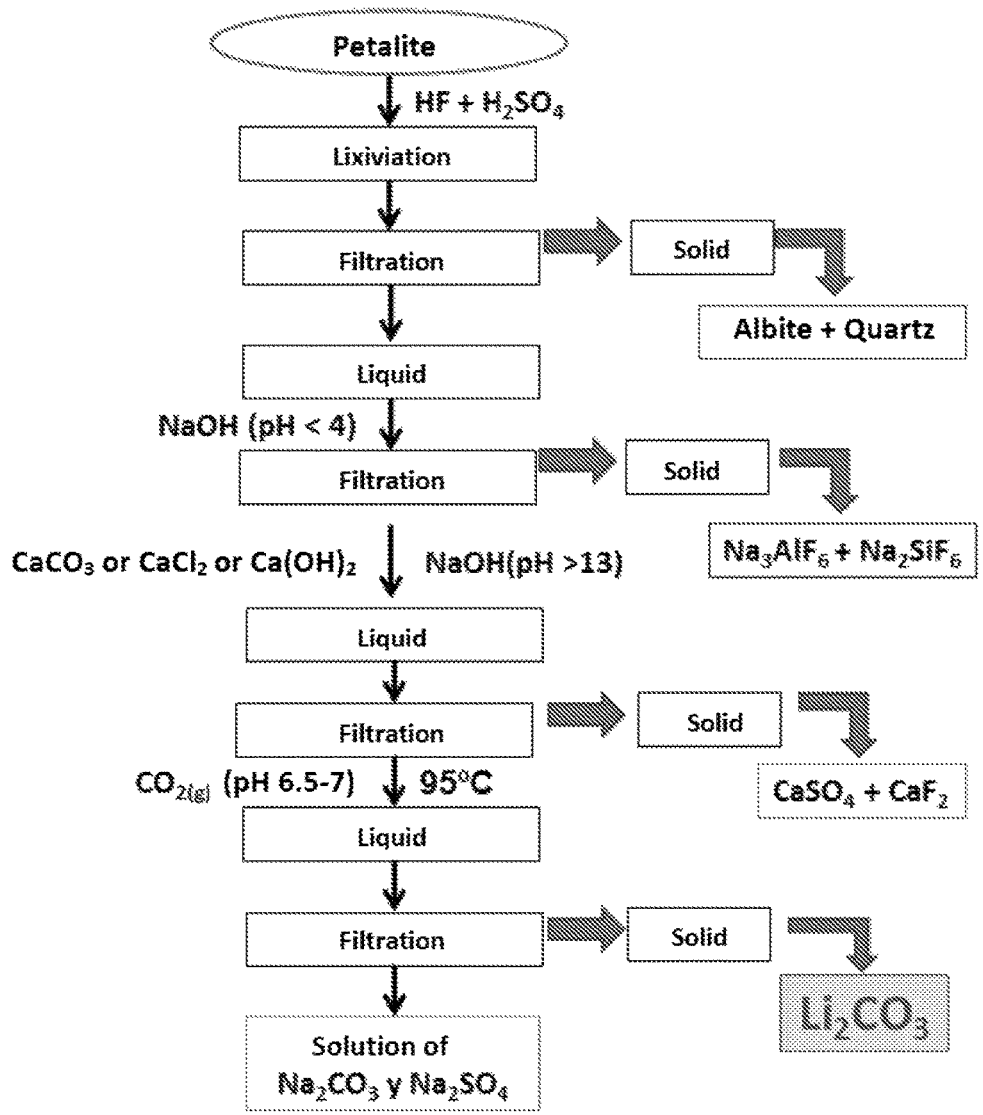
FIG. 66. Flow sheet of the obtainment of $Li_2CO_3$ from lixiviation of petalite with HNO₃—NaF.
Figure 67:
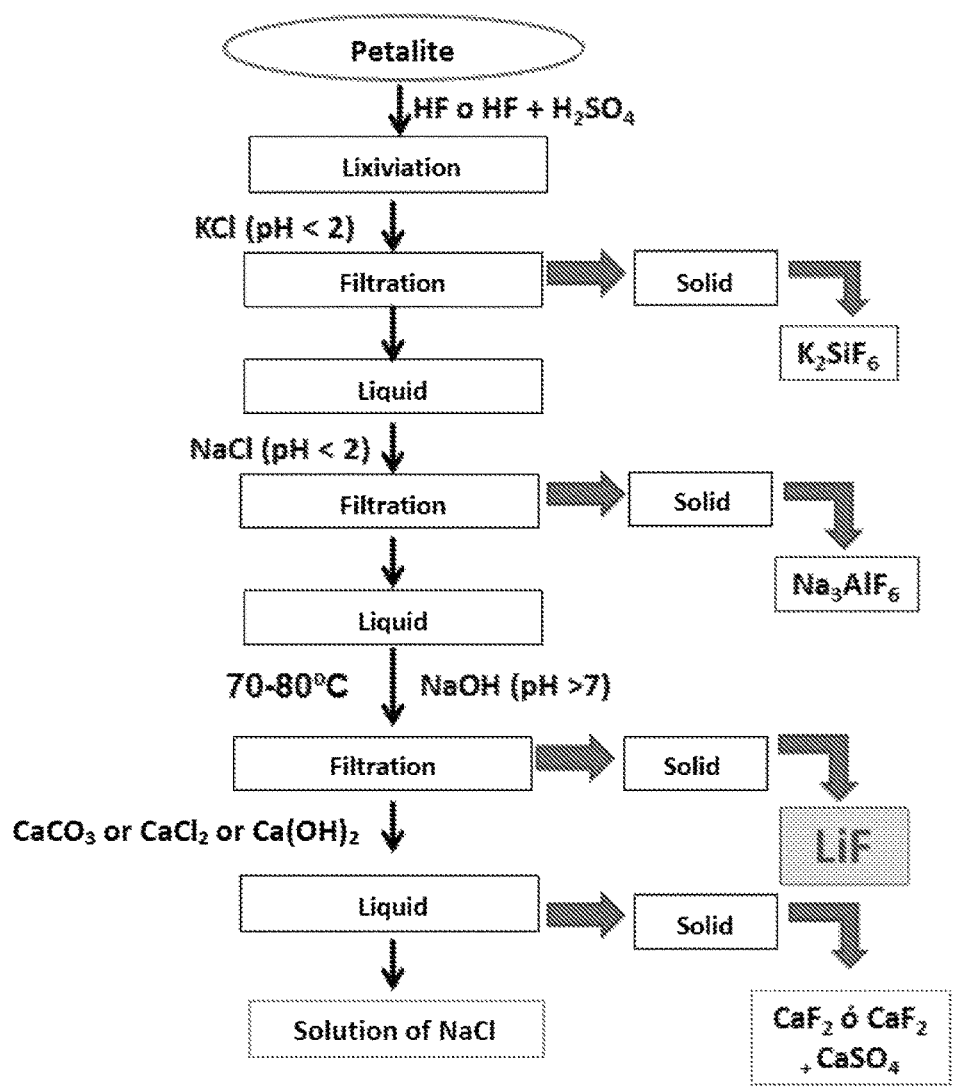
FIG. 67. Flow sheet of the obtainment of $Li_2CO_3$ from lixiviation of petalite with $H_2C_2O_4$—NaF.
Figure 68:
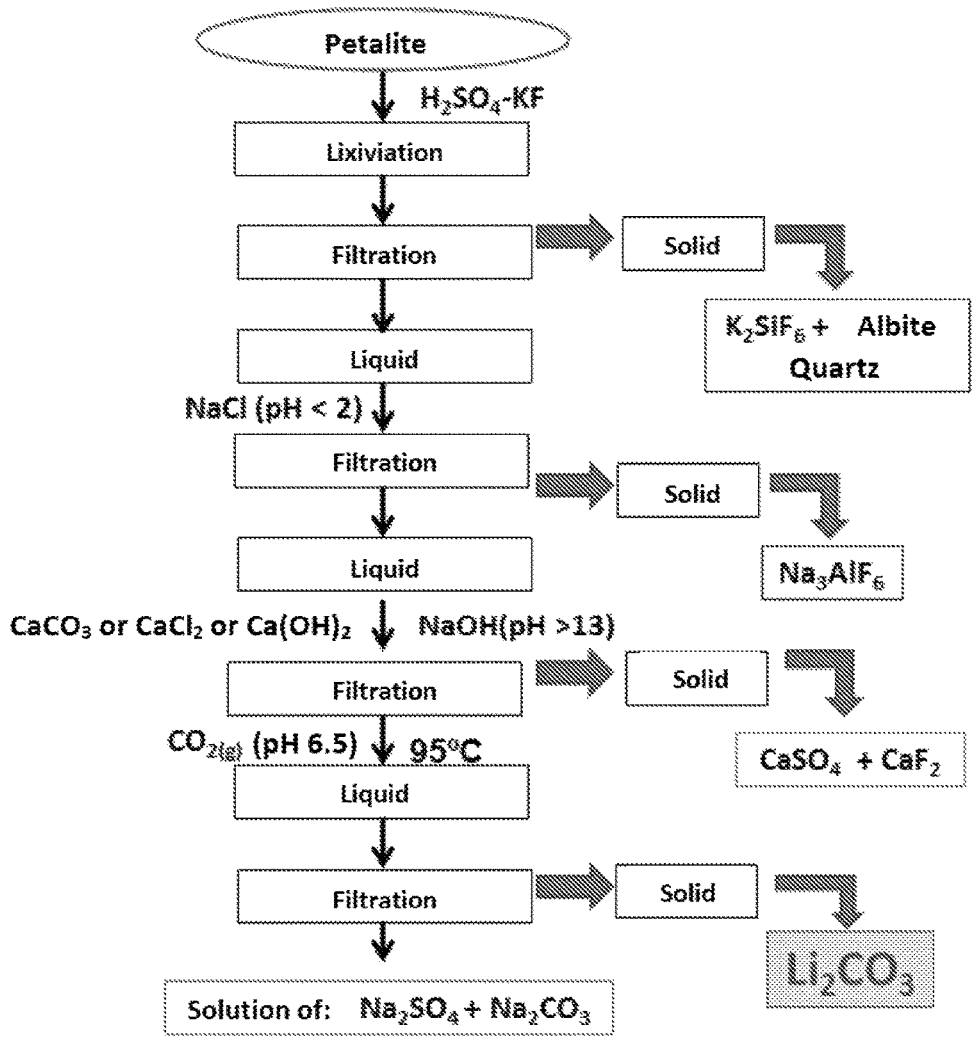
FIG. 68. Flow sheet of the obtainment of $Li_2CO_3$ from lixiviation of petalite with $H_2SO_4$—KF.
Figure 69:
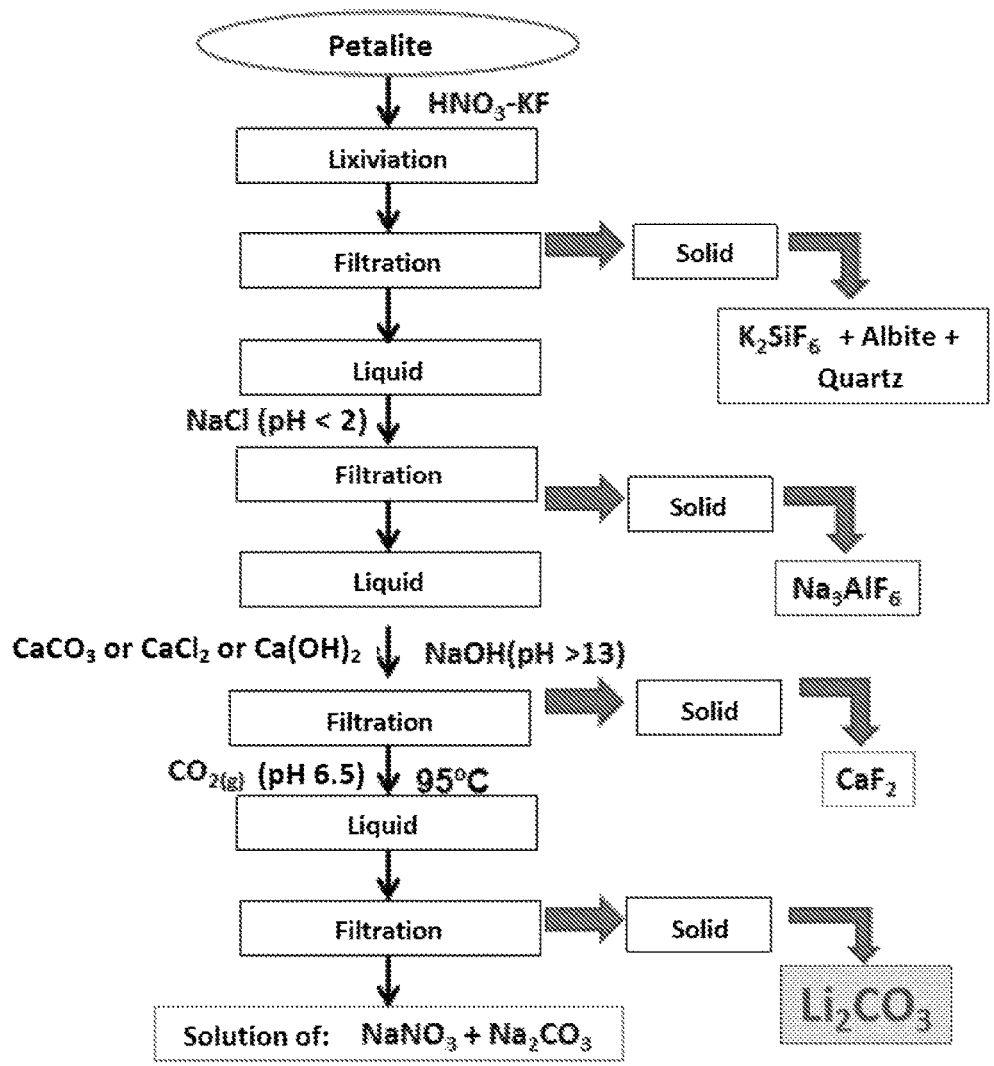
FIG. 69. Flow sheet of the obtainment of $Li_2CO_3$ from lixiviation of petalite with HCl—KF.
Figure 70:
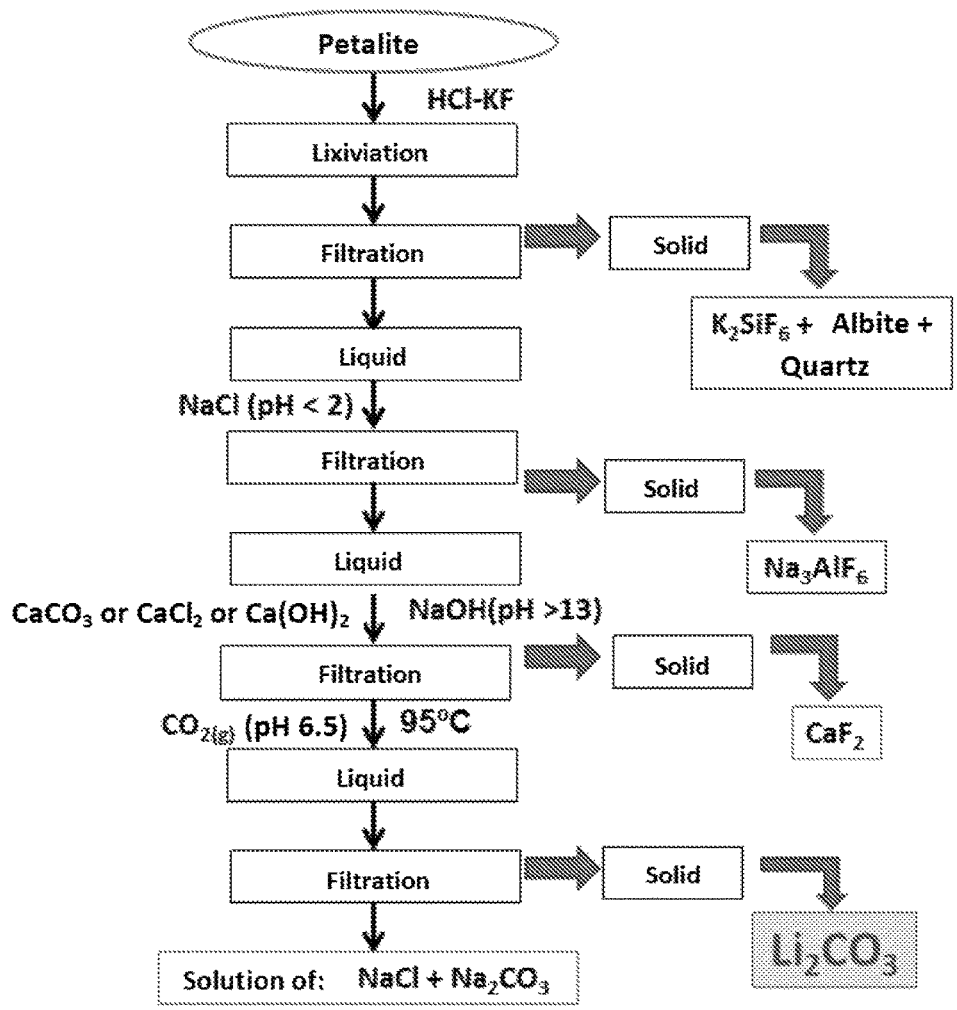
FIG. 70. Flow sheet of the obtainment of $Li_2CO_3$ from lixiviation of petalite with $HNO_3$—KF.
Figure 71:
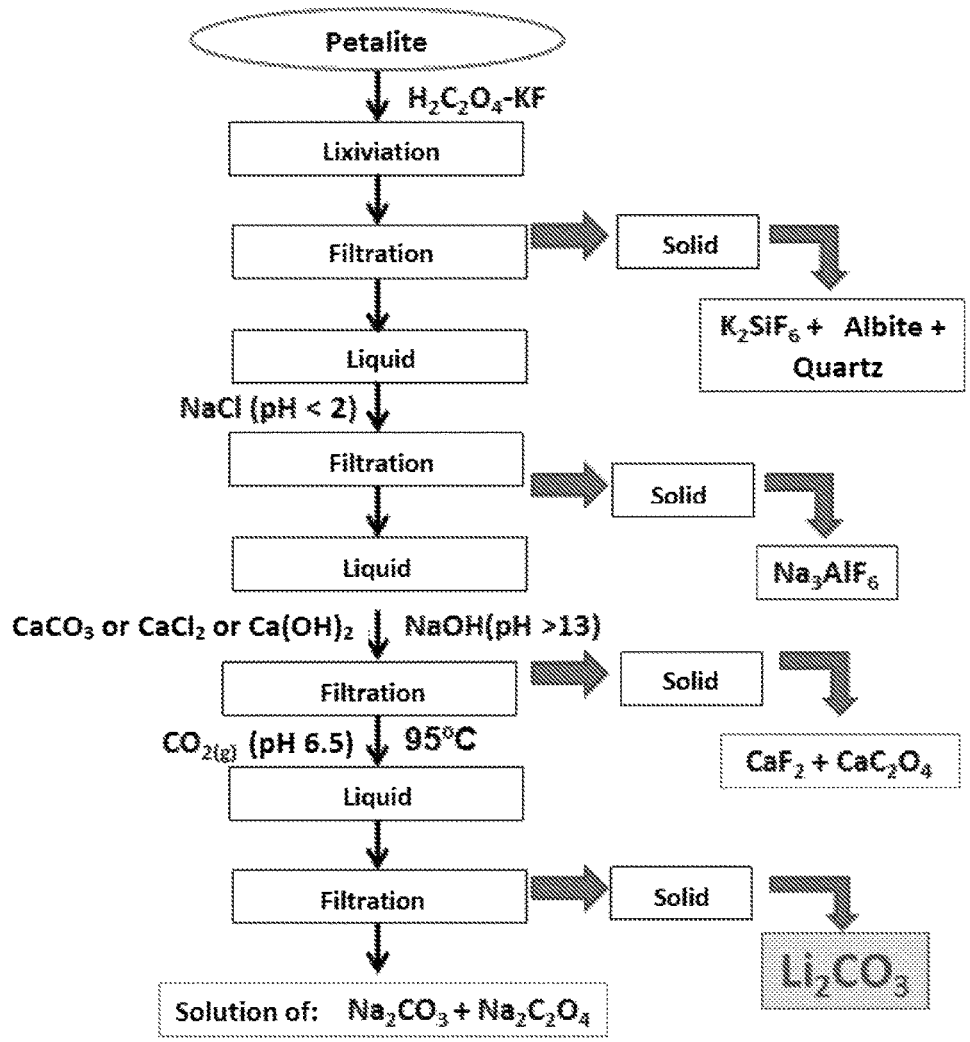
FIG. 71: Flow sheet of the obtainment of $Li_2CO_3$ from lixiviation of petalite with $H_2C_2O_4$—KF.
Figure 72:
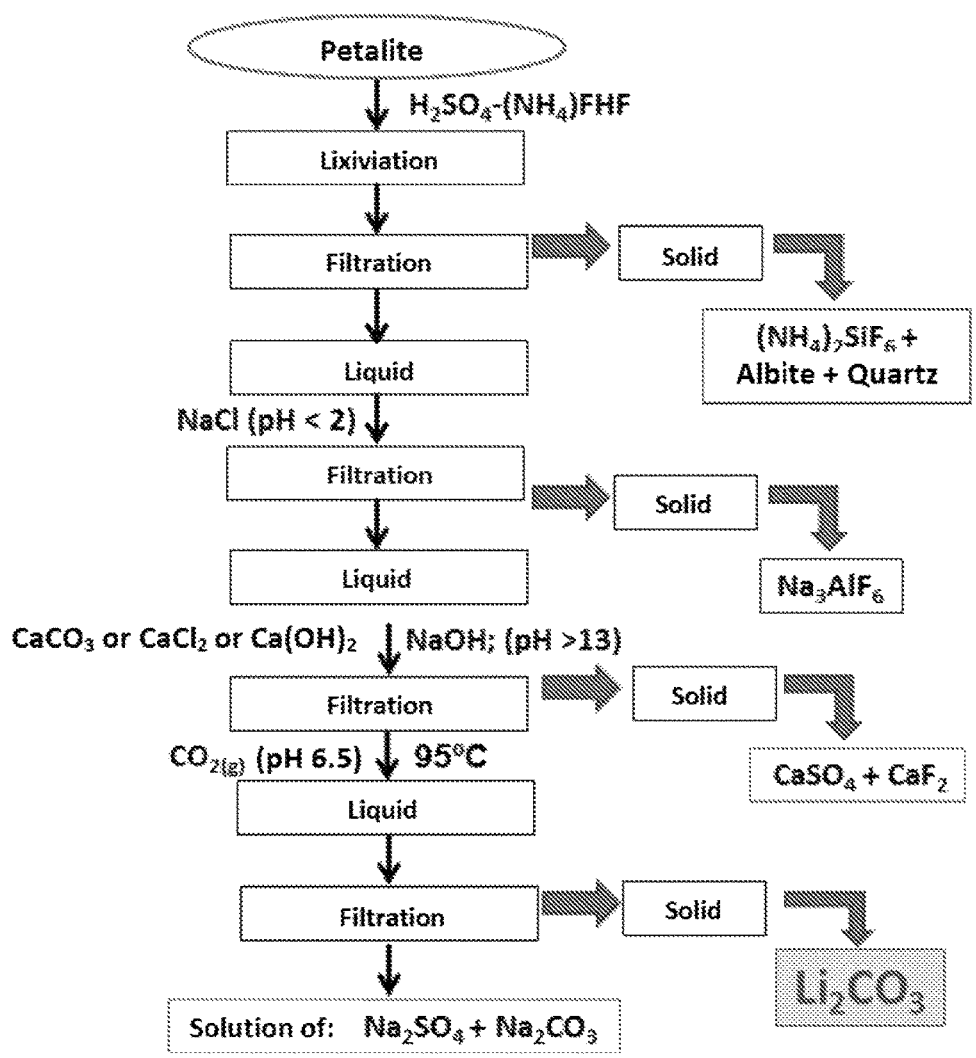
FIG. 72. Flow sheet of the obtainment of $Li_2CO_3$ from lixiviation of petalite with $CaF_2$—$H_2SO_4$.
Figure 73:
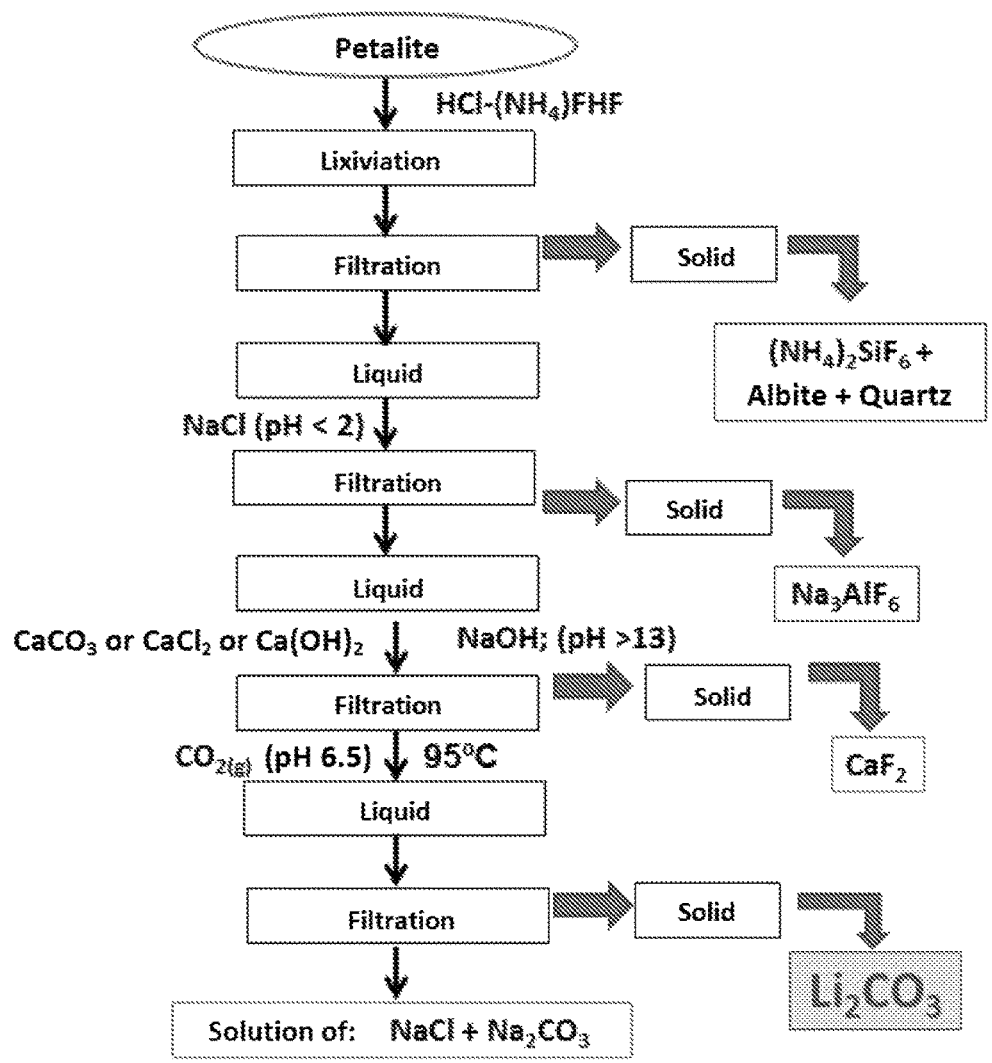
FIG. 73. Flow sheet of the obtainment of $Li_2CO_3$ from lixiviation of petalite with $H_2SO_4$—$(NH_4)FHF$.
Figure 74:
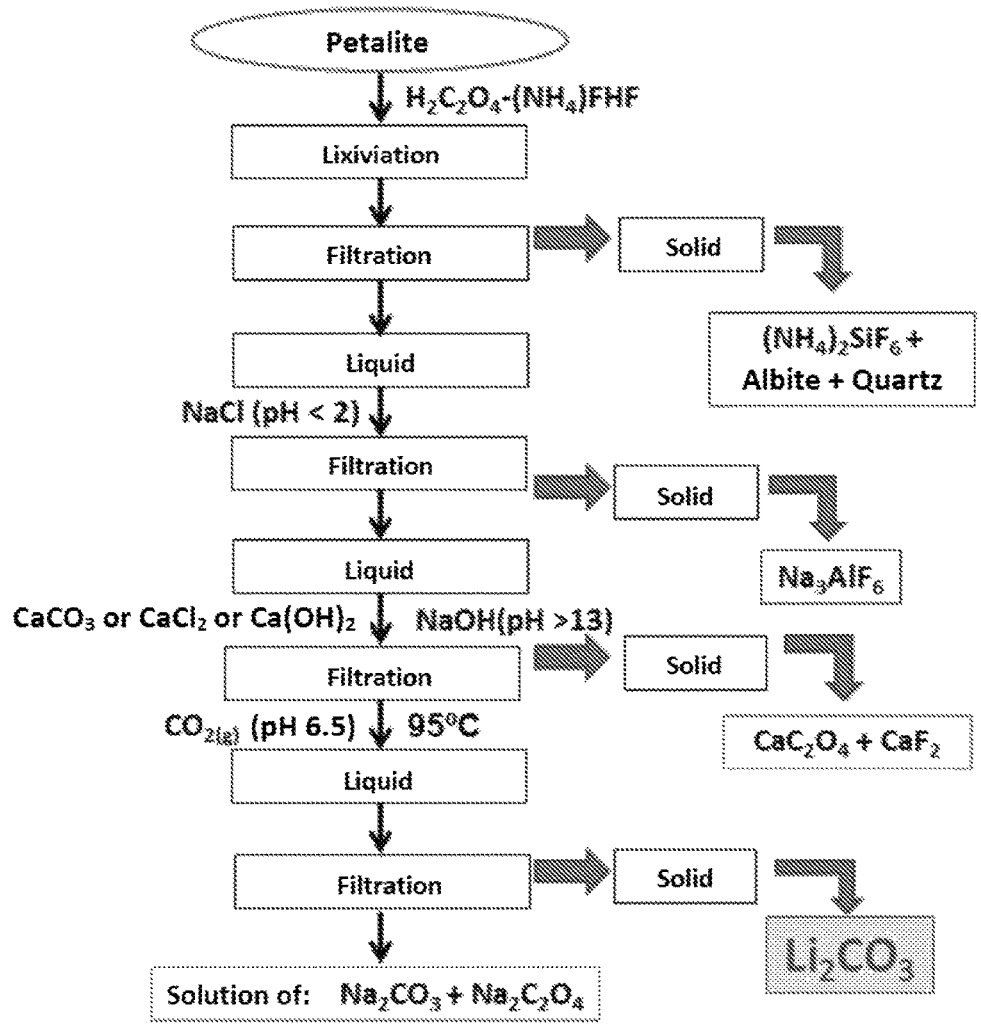
FIG. 74. Flow sheet of the obtainment of $Li_2CO_3$ from lixiviation of petalite with HCl—$(NH_4)FHF$.
Figure 75:
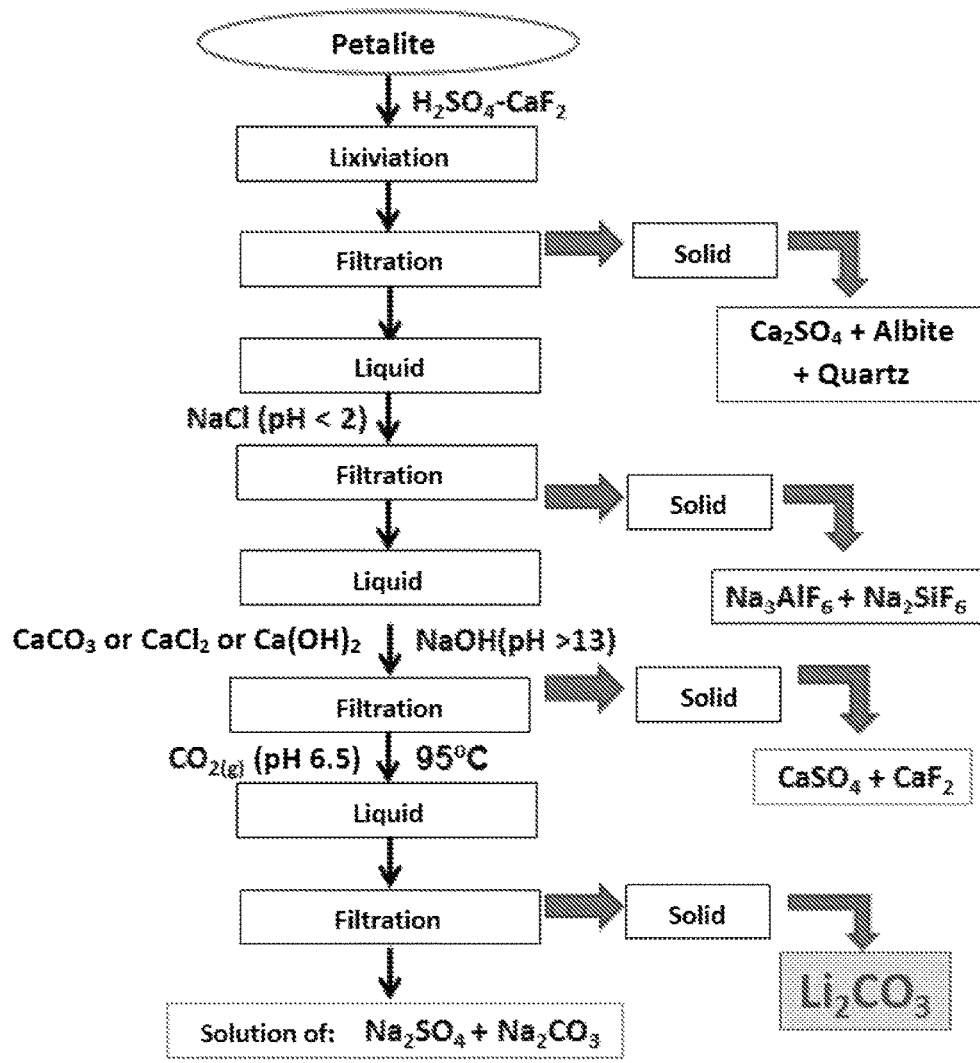
FIG. 75. Flow sheet of the obtainment of $Li_2CO_3$ from lixiviation of petalite with $H_2C_2O_4$—$(NH_4)FHF$.

In FIG. 43 the diffractogram of the solid obtained in this stage is shown.

In FIG. 43 it may be seen that the compound $Li_2CO_3$ was obtained without the presence of other phases as impurities. Analyzing the residual solutions obtained by AAS the achievement of a recovery of Li of more than 90% could be determined.

FIGS. 44 to 59 show different embodiments of the process of the invention using lepidolite as raw material.

In the present patent application, a process for the recovery of Li from the processing of petalite is also disclosed. This process comprises two steps: in the first step, dissolution of the petalite mineral is performed with hydrofluoric acid or some fluorine salt in acid medium, in a closed vessel. In the second step, separation of Li is performed from the leach liquor of the previous step, by means of precipitation thereof as lithium carbonate or lithium fluoride.

FIGS. 60 to 75 show a scheme of the processes using petalite as the mineral.

This invention is best illustrated according to the following examples, which should not be construed as a limitation to the scope thereof. On the contrary, it should be understood that other embodiments, modifications and equivalents thereof may be envisaged after reading the present disclosure, which may provide suggestions to those skilled in the art, without departing from the spirit of the present invention and/or scope of the annexed claims.

EXAMPLES

Example 1: Process of the Invention Using α-Spodumene as Mineral

Process A
Dissolution of the Mineral

An amount of 30 g of mineral was placed in a reactor and a volume of 550 ml of the lixiviating solution of 20% v/v HF was added thereto. This mixture was then heated under stirring until reaching 160° C., keeping this temperature constant for a period of 120 min. After this period of time, the reaction system was allowed to cool, without stirring, until reaching room temperature. Then, the reactor content was filtered, the liquid obtained was subjected to a series of separation steps and the solid obtained was dried at 75° C. and then weighed. The obtained mineral conversion was 90%, as calculated from equation (2).

Step 1:

The obtained filtrate was then treated with a concentrated NaOH solution until achieving a pH equal to or lower than 3, in these conditions, the compounds $Na_3AlF_6$ and $Na_2SiF_6$ precipitated. Then, said solids were filtrated, dried and weighed; the recovery thereof was 92%, as determined gravimetrically.

Step 2:

To the filtrate obtained in Step 1, a NaOH solution was added until reaching a pH equal to 5. At this pH value, the compound $Fe(OH)_3$ precipitated, which was filtered out. Then, this precipitate was calcined at 800° C., the recovery thereof was 97%, as determined gravimetrically.

Step 3

The filtrate obtained in Step 2 was treated with $Ca(OH)_2$ solution in order to remove F⁻ from the medium as solid $CaF_2$ and raise the pH of the solution to 14. Precipitation of $CaF_2$ was accompanied by excess $Ca(OH)_2$.

Step 4

The filtrate obtained in Step 3, from which fluorine ion content was totally removed, was subjected to evaporation until reaching a Li concentration in the solution close to 20 g/L. Then, the solution was cooled down to room temperature, in order to proceed with carbonation thereof by bubbling $CO_2$ (g) to lower the pH from 14 down to 6.5. Finally, the solution was heated to a temperature of 95° C., thus causing precipitation of Li as $Li_2CO_3$. Said precipitate was filtered, dried and weighed, recovery of $Li_2CO_3$ was 90%, as determined by gravimetric analysis.

Process B
Dissolution of the Mineral

An amount of 30 g of mineral was placed in a reactor and a volume of 550 ml of the lixiviating solution of 20% v/v HF was added thereto together with an amount of 66 g of NaCl. This mixture was then heated under stirring until reaching 160° C., keeping this temperature constant for a period of 120 min. After this period of time, the reaction system was allowed to cool, without stirring, until reaching room temperature. Then, the reactor content was filtered, the liquid obtained was subjected to a series of separation steps and the solid obtained was dried at 75° C. and then weighed and characterized. The mineral conversion obtained was 91%, as calculated from the extracted % Li obtained by AAS. Through this process, the compounds $Na_3AlF_6$ and $Na_2SiF_6$ were precipitated together. It was determined gravimetrically that the recovery of both compounds was 90%.

Step 1:

To the filtrate obtained from the dissolution of the mineral, a NaOH solution was added until reaching a pH equal to 5. At this pH value, the compound $Fe(OH)_3$ precipitated, which was filtered out. Then, this precipitate was calcined at 800° C.; the recovery thereof was 96%, as determined gravimetrically.

Step 2

The filtrate obtained in Step 1 was treated with a $Ca(OH)_2$ solution in order to remove F⁻ from the medium as solid $CaF_2$ and raise the pH of the solution to 14. Precipitation of $CaF_2$ is accompanied by excess $Ca(OH)_2$.

Step 3

The filtrate obtained in Step 3, from which fluorine ion content was totally removed, was subjected to evaporation until reaching a Li concentration in the solution close to 20 g/L. Then, the solution was cooled down to room temperature so as to proceed with carbonation thereof by bubbling $CO_2$ (g) to lower the pH from 14 down to 6.5. Finally, the solution was heated to a temperature of 95° C., thus causing precipitation of Li as $Li_2CO_3$. Said precipitate was filtered, dried and weighed; recovery of $Li_2CO_3$ was 90%, as determined by gravimetric analysis.

Process C
Dissolution of the Mineral

An amount of 30 g of mineral was placed in a reactor and a volume of 550 ml of a lixiviating solution of 20% v/v HF and 20% v/v $H_2SO_4$ was added thereto. This mixture was then heated under stirring until reaching 123° C., keeping this temperature constant for a period of 60 min. After this period of time, the reaction system was allowed to cool, without stirring, until reaching room temperature. Then, the reactor content was filtered, the liquid obtained was subjected to a series of separation steps and the solid obtained was dried at 75° C. and then weighed. The mineral conversion obtained was 95%, as calculated from equation (2).

Step 1:

The filtrate obtained was then treated with a concentrated NaOH solution until reaching a pH equal to or lower than 3, in these conditions, the compounds $Na_3AlF_6$ and $Na_2SiF_6$ precipitated. Then, said solids were filtrated, dried and weighed; the recovery thereof was 92%, as determined gravimetrically.

Step 2:

To the filtrate obtained in Step 1, a NaOH solution was added until reaching a pH equal to 5. At this pH value, the compound $Fe(OH)_3$, precipitated which was filtered out. Then, this precipitate was calcined at 800° C., the recovery thereof was 97%, as determined gravimetrically.

Step 3

The filtrate obtained in Step 2 was treated with a $Ca(OH)_2$ solution in order to remove $F^-$ from the medium as solid $CaF_2$ and raise the pH of the solution to 14. Precipitation of $CaF_2$ is accompanied by excess $Ca(OH)_2$.

Step 4

The filtrate obtained in Step 3, from which fluorine ion content was totally removed, was subjected to evaporation until reaching a Li concentration in the solution close to 20 g/L. Then, the solution was cooled down to room temperature so as to proceed with carbonation thereof by bubbling $CO_2$ (g) to lower the pH from 14 down to 6.5. Finally, the solution was heated to a temperature of 95° C., thus causing precipitation of Li as $Li_2CO_3$. Said precipitate was filtered, dried and weighed; recovery of $Li_2CO_3$ was 90%, as determined by gravimetric analysis.

Process D
Dissolution of the Mineral

An amount of 30 g of mineral was placed in a reactor and a volume of 550 ml of a lixiviating solution of 20% v/v $H_2SO_4$ and 20% w/v NaF was added thereto. This mixture was then heated under stirring until reaching 160° C., keeping this temperature constant for a period of 120 min. After this period of time, the reaction system was allowed to cool, without stirring, until reaching room temperature. Then, the reactor content was filtered, the liquid obtained was subjected to a series of separation steps and the solid obtained was dried at 75° C. and then weighed. The mineral conversion obtained was 89%, as calculated from the % Li extracted obtained by AAS. Through this process, the compounds $Na_3AlF_6$ and $Na_2SiF_6$ were precipitated together. It was determined gravimetrically that the recovery of both compounds was 93%.

Step 1:

To the filtrate obtained in Step 1, a NaOH solution was added until reaching a pH equal to 5. At this pH value, the compound $Fe(OH)_3$, precipitated, which was filtered out. Then, this precipitate was calcined at 800° C.; the recovery thereof was 97%, as determined gravimetrically.

Step 2

The filtrate obtained in Step 1 was treated with $Ca(OH)_2$ solution in order to remove $F^-$ from the medium as solid $CaF_2$ and raise the pH of the solution to 14. Precipitation of $CaF_2$ is accompanied by excess $Ca(OH)_2$.

Step 3

The filtrate obtained in Step 2, from which fluorine ion content was totally removed, was subjected to evaporation until reaching a Li concentration in the solution close to 20 g/L. Then, the solution was cooled down to room temperature so as to proceed with carbonation thereof by bubbling $CO_2$ (g) to lower the pH from 14 down to 6.5. Finally, the solution was heated to a temperature of 95° C., thus causing precipitation of Li as $Li_2CO_3$. Said precipitate was filtered, dried and weighed; recovery of $Li_2CO_3$ was 90%, as determined by gravimetric analysis.

Process E
Dissolution of the Mineral

An amount of 30 g of mineral was placed in a reactor and a volume of 550 ml of a lixiviating solution of 20% v/v HF or 20% v/v $H_2SO_4$ and 20% v/v HF was added thereto. This mixture was then heated under stirring until reaching 160 or 123° C., respectively, keeping this temperature constant for a period of 120 min. After this period of time, the reaction system was allowed to cool, without stirring, until reaching room temperature. Then, the reactor content was filtered, the liquid obtained was subjected to a series of separation steps and the solid obtained was dried at 75° C. and then weighed. The mineral conversion obtained was 90%, as calculated from equation (2).

Step 1:

The filtrate obtained was then treated with a 10% w/v KCl, thus precipitating the compound $K_2SiF_6$. Then, the solid was filtrated, dried and weighed. The recovery thereof was 95%, as determined gravimetrically.

Step 2:

The filtrate obtained was then treated with a concentrated NaOH solution until reaching a pH equal to or lower than 3, at these conditions, the compound $Na_3AlF_6$ precipitated. Then, the solid was filtrated, dried and weighed; the recovery thereof was 94%, as determined gravimetrically.

Step 3:

To the filtrate obtained in Step 2 a NaOH solution was added until reaching a pH equal to 5. At this pH value, the compound $Fe(OH)_3$ precipitated, which was filtered out. Then, this precipitate was calcined at 800° C.; the recovery thereof was 97%, as determined gravimetrically.

Step 4

The filtrate obtained in Step 2, was subjected to evaporation at a temperature of 70° C. until obtaining a white colored precipitate corresponding to LiF. Said precipitate was filtered, dried and weighed; recovery of LiF was 95%, as determined by gravimetric analysis.

Step 5

The filtrate obtained in Step 4 was treated with $Ca(OH)_2$ solution in order to remove excess $F^-$ as solid $CaF_2$. Precipitation of $CaF_2$ is accompanied by excess $Ca(OH)_2$.

Process F
Dissolution of the Mineral

An amount of 30 g of mineral was placed in a reactor and a volume of 550 ml of a lixiviating solution of was added thereto HCl al 20% v/v and NaF al 20% w/v. This mixture was then heated under stirring until reaching 160° C., keeping this temperature constant for a period of 120 min. After this period of time, the reaction system was allowed to cool, without stirring, until reaching room temperature. Then, the reactor content was filtered, the liquid obtained was subjected to a series of separation steps and the solid obtained was dried at 75° C. and then weighed. The mineral conversion obtained was 89%, as calculated from the % Li extracted obtained by AAS. Through this process, the compounds $Na_3AlF_6$ and $Na_2SiF_6$ were precipitated together. It was determined gravimetrically that the recovery of both compounds was 93%.

Step 1:

To the filtrate obtained in the dissolution step, a NaOH solution was added until reaching a pH equal to 5. At this pH value, the compound $Fe(OH)_3$ precipitated, which was filtered out. Then, this precipitate was calcined at 800° C.; the recovery thereof was 97%, as determined gravimetrically.

Step 2

The filtrate obtained in Step 1 was treated with $Ca(OH)_2$ solution in order to remove $F^-$ from the medium as solid $CaF_2$ and raise the pH of the solution to 14. Precipitation of $CaF_2$ is accompanied by excess $Ca(OH)_2$.

Step 3

The filtrate obtained in Step 2, from which fluorine ion content was totally removed, was subjected to evaporation until reaching a Li concentration in the solution close to 20 g/L. Then, the solution was cooled down to room temperature so as to proceed with carbonation thereof by bubbling $CO_2$ (g) to lower the pH from 14 down to 6.5. Finally, the solution was heated to a temperature of 95° C., thus causing precipitation of Li as $Li_2CO_3$. Said precipitate was filtered, dried and weighed; recovery of $Li_2CO_3$ was 90%, as determined by gravimetric analysis.

Process G

Dissolution of the Mineral

An amount of 30 g of mineral was placed in a reactor and a volume of 550 ml of a lixiviating solution of 20% v/v $HNO_3$ and 20% w/v NaF was added thereto. This mixture was then heated under stirring until reaching 160° C., keeping this temperature constant for a period of 120 min. After this period of time, the reaction system was allowed to cool, without stirring, until reaching room temperature. Then, the reactor content was filtered, the liquid obtained was subjected to a series of separation steps and the solid obtained was dried at 75° C. and then weighed. The mineral conversion obtained was 89%, as calculated from the extracted % Li obtained by AAS. Through this process, the compounds $Na_3AlF_6$ and $Na_2SiF_6$ were precipitated together. It was determined gravimetrically that the recovery of both compounds was 93%.

Step 1:

To the filtrate obtained in the dissolution step, a NaOH solution was added until reaching a pH equal to 5. At this pH value, the compound $Fe(OH)_3$ precipitated, which was filtered out. Then, this precipitate was calcined at 800° C.; the recovery thereof was 97%, as determined gravimetrically.

Step 2

The filtrate obtained in Step 1 was treated with $Ca(OH)_2$ solution, in order to remove F from the medium as solid $CaF_2$ and raise the pH of the solution to 14. The precipitation of $CaF_2$ is accompanied by excess $Ca(OH)_2$.

Step 3

The filtrate obtained in Step 2, from which fluorine ion content was totally removed, was subjected to evaporation until reaching a Li concentration in the solution close to 20 g/L. Then, the solution was cooled down to room temperature so as to proceed with carbonation thereof by bubbling $CO_2$ (g) to lower the pH from 14 down to 6.5. Finally, the solution was heated to a temperature of 95° C., thus causing precipitation of Li as $Li_2CO_3$. Said precipitate was filtered, dried and weighed; recovery of $Li_2CO_3$ was 90%, as determined by gravimetric analysis.

Process H

Dissolution of the Mineral

An amount of 30 g of mineral was placed in a reactor and a volume of 550 ml of a lixiviating solution of 20% w/v $H_2C_2O_4$ and 20% w/v NaF was added thereto. This mixture was then heated under stirring until reaching 123° C., keeping this temperature constant for a period of 120 min. After this period of time, the reaction system was allowed to cool, without stirring, until reaching room temperature. Then, the reactor content was filtered, the liquid obtained was subjected to a series of separation steps and the solid obtained was dried at 75° C. and then weighed. The mineral conversion obtained was 89%, as calculated from the extracted % Li obtained by AAS. Through this process, the compounds $Na_3AlF_6$ and $Na_2SiF_6$ were precipitated together. It was determined gravimetrically that the recovery of both compounds was 93%.

Step 1:

To the filtrate obtained in the dissolution step, a NaOH solution was added until reaching a pH equal to 5. At this pH value, the compound $Fe(OH)_3$ precipitated, which was filtered out. Then, this precipitate was calcined at 800° C.; the recovery thereof was 97%, as determined gravimetrically.

Step 2

The filtrate obtained in Step 1 was treated with $Ca(OH)_2$ solution in order to remove $F^-$ from the medium as solid $CaF_2$ and raise the pH of the solution to 14. Precipitation of $CaF_2$ is accompanied by excess $Ca(OH)_2$.

Step 3

The filtrate obtained in Step 2, from which fluorine ion content was totally removed, was subjected to evaporation until reaching a Li concentration in the solution close to 20 g/L. Then, the solution was cooled down to room temperature so as to proceed with carbonation thereof by bubbling $CO_2$ (g) to lower the pH from 14 down to 6.5. Finally, the solution was heated to a temperature of 95° C., thus causing precipitation of Li as $Li_2CO_3$. Said precipitate was filtered, dried and weighed; recovery of $Li_2CO_3$ was 90%, as determined by gravimetric analysis.

Process I

Dissolution of the Mineral

An amount of 30 g of mineral was placed in a reactor and a volume of 550 ml of a lixiviating solution of 20% v/v $H_2SO_4$-20% w/v KF was added thereto. This mixture was then heated under stirring until reaching 160° C., keeping this temperature constant for a period of 120 min. After this period of time, the reaction system was allowed to cool, without stirring, until reaching room temperature. Then, the reactor content was filtered, the liquid obtained was subjected to a series of separation steps and the solid obtained was dried at 75° C. and then weighed. The mineral conversion obtained was 90%, as calculated from equation (2).

Step 1:

The filtrate obtained was then treated with a concentrated NaOH solution until reaching a pH equal to or lower than 3, in these conditions, the compound $Na_3AlF_6$ precipitated. Then, said solid was filtrated, dried and weighed; the recovery thereof was 92%, as determined gravimetrically.

Step 2:

To the filtrate obtained in Step 1, a NaOH solution was added until reaching a pH equal to 5. At this pH value, the compound $Fe(OH)_3$ precipitated, which was filtered out. Then, this precipitate was calcined at 800° C.; the recovery thereof was 97%, as determined gravimetrically.

Step 3

The filtrate obtained in Step 2 was treated with $Ca(OH)_2$ solution, in order to remove $F^-$ from the medium as solid $CaF_2$ and raise the pH of the solution to 14. Precipitation of $CaF_2$ is accompanied by excess $Ca(OH)_2$.

Step 4

The filtrate obtained in Step 3, from which fluorine ion content was totally removed, was subjected to evaporation until reaching a Li concentration in the solution close to 20 g/L. Then, the solution was cooled down to room temperature in order to proceed with carbonation thereof by bubbling $CO_2$ (g) to lower the pH from 14 down to 6.5. Finally, the solution was heated to a temperature of 95° C., thus causing precipitation of Li as $Li_2CO_3$. Said precipitate was filtered, dried and weighed; recovery of $Li_2CO_3$ was 90%, as determined by gravimetric analysis.

Process J

Dissolution of the Mineral

An amount of 30 g of mineral was placed in a reactor and a volume of 550 ml of a lixiviating solution of 20% v/v HCl-20% w/v KF was added thereto. This mixture was then heated under stirring until reaching 160° C., keeping this temperature constant for a period of 120 min. After this period of time, the reaction system was allowed to cool, without stirring, until reaching room temperature. Then, the reactor content was filtered, the liquid obtained was subjected to a series of separation steps and the solid obtained was dried at 75° C. and then weighed. The mineral conversion obtained was 90%, as calculated from equation (2).

Step 1:

The filtrate obtained was then treated with a concentrated NaOH solution until reaching a pH equal to or lower than 3, in these conditions, the compound $Na_3AlF_6$ precipitated. Then, said solid was filtrated, dried and weighed; the recovery thereof was 92%, as determined gravimetrically.

Step 2:

To the filtrate obtained in Step 1, a NaOH solution was added until reaching a pH equal to 5. At this pH value, the compound $Fe(OH)_3$ precipitated, which was filtered out. Then, this precipitate was calcined at 800° C.; the recovery thereof was 97%, as determined gravimetrically.

Step 3

The filtrate obtained in Step 2 was treated with $Ca(OH)_2$ solution in order to remove $F^-$ from the medium as solid $CaF_2$ and raise the pH of the solution to 14. Precipitation of $CaF_2$ is accompanied by excess $Ca(OH)_2$.

Step 4

The filtrate obtained in Step 3, from which fluorine ion content was totally removed, was subjected to evaporation until reaching a Li concentration in the solution close to 20 g/L. Then, the solution was cooled down to room temperature in order to proceed with carbonation thereof by bubbling $CO_2$ (g) to lower the pH from 14 down to 6.5. Finally, the solution was heated to a temperature of 95° C., thus causing precipitation of Li as $Li_2CO_3$. Said precipitate was filtered, dried and weighed; recovery of $Li_2CO_3$ was 90%, as determined by gravimetric analysis.

Process K

Dissolution of the Mineral

An amount of 30 g of mineral was placed in a reactor and a volume of 550 ml of a lixiviating solution of 20% v/v $HNO_3$-20% w/v KF was added thereto. This mixture was then heated under stirring until reaching 160° C., keeping this temperature constant for a period of 120 min. After this period of time, the reaction system was allowed to cool, without stirring, until reaching room temperature. Then, the reactor content was filtered, the liquid obtained was subjected to a series of separation steps and the solid obtained was dried at 75° C. and then weighed. The mineral conversion obtained was 90%, as calculated from equation (2).

Step 1:

The filtrate obtained was then treated with a concentrated NaOH solution until reaching a pH equal to or lower than 3, in these conditions, the compound $Na_3AlF_6$ precipitated. Then, said solid was filtrated, dried and weighed; the recovery thereof was 92%, as determined gravimetrically.

Step 2:

To the filtrate obtained in Step 1, a NaOH solution was added until reaching a pH equal to 5. At this pH value, the compound $Fe(OH)_3$ precipitated, which was filtered out. Then, this precipitate was calcined at 800° C.; the recovery thereof was 97%, as determined gravimetrically.

Step 3

The filtrate obtained in Step 2 was treated with $Ca(OH)_2$ solution in order to remove $F^-$ from the medium as solid $CaF_2$ and raise the pH of the solution to 14. Precipitation of $CaF_2$ is accompanied by excess $Ca(OH)_2$.

Step 4

The filtrate obtained in Step 3, from which fluorine ion content was totally removed, was subjected to evaporation until reaching a Li concentration in the solution close to 20 g/L. Then, the solution was cooled down to room temperature, in order to proceed with carbonation thereof by bubbling $CO_2$ (g) to lower the pH from 14 down to 6.5. Finally, the solution was heated to a temperature of 95° C., thus causing precipitation of Li as $Li_2CO_3$. Said precipitate was filtered, dried and weighed; recovery of $Li_2CO_3$ was 90%, as determined by gravimetric analysis.

Process L

Dissolution of the Mineral

An amount of 30 g of mineral was placed in a reactor and a volume of 550 ml of a lixiviating solution of 20% w/v $H_2C_2O_4$-20% w/v KF was added thereto. This mixture was then heated under stirring until reaching 123° C., keeping this temperature constant for a period of 120 min. After this period of time, the reaction system was allowed to cool, without stirring, until reaching room temperature. Then, the reactor content was filtered, the liquid obtained was subjected to a series of separation steps and the solid obtained was dried at 75° C. and then weighed. The mineral conversion obtained was 90%, as calculated from equation (2).

Step 1:

The filtrate obtained was then treated with a concentrated NaOH solution until achieving a pH equal to or lower than 3, in these conditions, the compound $Na_3AlF_6$ precipitated. Then, said solid was filtrated, dried and weighed; the recovery thereof was 92%, as determined gravimetrically.

Step 2:

To the filtrate obtained in Step 1, a NaOH solution was added until reaching a pH equal to 5. At this pH value, the compound $Fe(OH)_3$ precipitated, which was filtered out. Then, this precipitate was calcined at 800° C.; the recovery thereof was 97%, as determined gravimetrically.

Step 3

The filtrate obtained in Step 2 was treated with $Ca(OH)_2$ solution in order to remove $F^-$ from the medium as solid $CaF_2$ and raise the pH of the solution to 14. Precipitation of $CaF_2$ is accompanied by excess $Ca(OH)_2$.

Step 4

The filtrate obtained in Step 3, from which fluorine ion content was totally removed, was subjected to evaporation until reaching a Li concentration in the solution close to 20 g/L. Then, the solution was cooled down to room temperature, in order to proceed with carbonation thereof by bubbling $CO_2$ (g) to lower the pH from 14 down to 6.5. Finally, the solution was heated to a temperature of 95° C., thus causing precipitation of Li as $Li_2CO_3$. Said precipitate was filtered, dried and weighed, recovery of $Li_2CO_3$ was 90%, as determined by gravimetric analysis.

Process M

Dissolution of the Mineral

An amount of 30 g of mineral was placed in a reactor and a volume of 550 ml of a lixiviating solution of 20% v/v $H_2SO_4$ and 20% w/v $CaF_2$ was added thereto. This mixture was then heated under stirring until reaching 160° C., keeping this temperature constant for a period of 60 min. After this period of time, the reaction system was allowed to cool, without stirring, until reaching room temperature. Then, the reactor content was filtered, the liquid obtained was subjected to a series of separation steps and the solid obtained was dried at 75° C. and then weighed. The mineral conversion obtained was 95%, as calculated from equation (2).

Step 1:

The filtrate obtained was then treated with a concentrated NaOH solution until reaching a pH equal to or lower than 3, in these conditions, the compounds $Na_3AlF_6$ and $Na_2SiF_6$ precipitated. Then, said solids were filtrated, dried and weighed; the recovery thereof was 92%, as determined gravimetrically.

Step 2:

To the filtrate obtained in Step 1, a NaOH solution was added until reaching a pH equal to 5. At this pH value, the compound $Fe(OH)_3$ precipitated, which was filtered out. Then, this precipitate was calcined at 800° C.; the recovery thereof was 97%, as determined gravimetrically.

Step 3

The filtrate obtained in Step 2 was treated with $Ca(OH)_2$ solution in order to remove $F^-$ from the medium as solid $CaF_2$ and raise the pH of the solution to 14. Precipitation of $CaF_2$ is accompanied by excess $Ca(OH)_2$.

Step 4

The filtrate obtained in Step 3, from which fluorine ion content was totally removed, was subjected to evaporation until reaching a Li concentration in the solution close to 20 g/L. Then, the solution was cooled down to room temperature, in order to proceed with carbonation thereof by bubbling $CO_2$ (g) to lower the pH from 14 down to 6.5. Finally, the solution was heated to a temperature of 95° C., thus causing precipitation of Li as $Li_2CO_3$. Said precipitate was filtered, dried and weighed, recovery of $Li_2CO_3$ was 90%, as determined by gravimetric analysis.

Process N

Dissolution of the Mineral

Step 1:

An amount of 30 g of mineral was placed in a reactor and a volume of 550 ml of a lixiviating solution of 20% v/v $H_2SO_4$ and 20% w/v $NH_4FHF$ was added thereto. This mixture was then heated under stirring until reaching 160° C., keeping this temperature constant for a period of 120 min. After this period of time, the reaction system was allowed to cool, without stirring, until reaching room temperature. Then, the reactor content was filtered, the liquid obtained was subjected to a series of separation steps and the solid obtained was dried at 75° C. and then weighed. The mineral conversion obtained was 89%, as calculated from the extracted % Li obtained by AAS. Through this process, the compounds $(NH_4)_3AlF_6$ and $(NH_4)_2SiF_6$ were precipitated together. It was determined gravimetrically that the recovery of both compounds was 93%.

Step 2:

To the filtrate obtained in Step 1, a NaOH solution was added until reaching a pH equal to 5. At this pH value, the compound $Fe(OH)_3$ precipitated, which was filtered out. Then, this precipitate was calcined at 800° C.; the recovery thereof was 97%, as determined gravimetrically.

Step 3

The filtrate obtained in Step 2 was treated with $Ca(OH)_2$ solution in order to remove $F^-$ from the medium as solid $CaF_2$ and raise the pH of the solution to 14. Precipitation of $CaF_2$ is accompanied by excess $Ca(OH)_2$.

Step 4

The filtrate obtained in Step 3, from which fluorine ion content was totally removed, was subjected to evaporation until reaching a Li concentration in the solution close to 20 g/L. Then, the solution was cooled down to room temperature, in order to proceed with carbonation thereof by bubbling $CO_2$ (g) to lower the pH from 14 down to 6.5. Finally, the solution was heated to a temperature of 95° C., thus causing precipitation of Li as $Li_2CO_3$. Said precipitate was filtered, dried and weighed; recovery of $Li_2CO_3$ was 90%, as determined by gravimetric analysis.

Process O

Dissolution of the Mineral

Step 1:

An amount of 30 g of mineral was placed in a reactor and a volume of 550 ml of a lixiviating solution of 20% v/v HCl and 20% w/v $NH_4FHF$ was added thereto. This mixture was then heated under stirring until reaching 160° C., keeping this temperature constant for a period of 120 min. After this period of time, the reaction system was allowed to cool, without stirring, until reaching room temperature. Then, the reactor content was filtered, the liquid obtained was subjected to a series of separation steps and the solid obtained was dried at 75° C. and then weighed. The mineral conversion obtained was 89%, as calculated from the extracted % Li obtained by AAS. Through this process, the compounds $(NH_4)_3AlF_6$ and $(NH_4)_2SiF_6$ were precipitated together. It was determined gravimetrically that the recovery of both compounds was 93%.

Step 2:

To the filtrate obtained in Step 1, a NaOH solution was added until reaching a pH equal to 5. At this pH value, the compound $Fe(OH)_3$ precipitated, which was filtered out. Then, this precipitate was calcined at 800° C.; the recovery thereof was 97%, as determined gravimetrically.

Step 3

The filtrate obtained in Step 2 was treated with a $Ca(OH)_2$ solution in order to remove $F^-$ from the medium as solid $CaF_2$ and raise the pH of the solution to 14. Precipitation of $CaF_2$ is accompanied by excess $Ca(OH)_2$.

Step 4

The filtrate obtained in Step 3, from which fluorine ion content was totally removed, was subjected to evaporation until reaching a Li concentration in the solution close to 20 g/L. Then, the solution was cooled down to room temperature, in order to proceed with carbonation thereof by bubbling $CO_2$ (g) to lower the pH from 14 down to 6.5. Finally, the solution was heated to a temperature of 95° C., thus causing precipitation of Li as $Li_2CO_3$. Said precipitate was filtered, dried and weighed; recovery of $Li_2CO_3$ was 90%, as determined by gravimetric analysis.

Process P

Dissolution of the Mineral

Step 1:

An amount of 30 g of mineral was placed in a reactor and a volume of 550 ml of a lixiviating solution of 20% w/v H$_2$C$_2$O$_4$ and 20% w/v NH$_4$FHF was added thereto. This mixture was then heated under stirring until reaching 123° C., keeping this temperature constant for a period of 120 min. After this period of time, the reaction system was allowed to cool, without stirring, until reaching room temperature. Then, the reactor content was filtered, the liquid obtained was subjected to a series of separation steps and the solid obtained was dried at 75° C. and then weighed. The mineral conversion obtained was 89%, as calculated from % Li extracted obtained by AAS. Through this process, the compounds (NH$_4$)$_3$AlF$_6$ and (NH$_4$)$_2$SiF$_6$ were precipitated together. It was determined gravimetrically that the recovery of both compounds was 93%.

Step 2:

To the filtrate obtained in Step 1 a NaOH solution was added until reaching a pH equal to 5. At this pH value, the compound Fe(OH)$_3$ precipitated, which was filtered out. Then, this precipitate was calcined at 800° C.; the recovery thereof was 97%, as determined gravimetrically.

Step 3.

The filtrate obtained in Step 2 was treated with a Ca(OH)$_2$ solution, in order to remove F$^-$ from the medium as solid CaF$_2$ and raise the pH of the solution to 14. Precipitation of CaF$_2$ is accompanied by excess Ca(OH)$_2$.

Step 4.

The filtrate obtained in Step 3, from which fluorine ion content was totally removed, was subjected to evaporation until reaching a Li concentration in the solution close to 20 g/L. Then, the solution was cooled down to room temperature, in order to proceed with carbonation thereof by bubbling CO$_2$ (g) to lower the pH from 14 down to 6.5. Finally, the solution was heated to a temperature of 95° C., thus causing precipitation of Li as Li$_2$CO$_3$. Said precipitate was filtered, dried and weighed, recovery of Li$_2$CO$_3$ was 90%, as determined by gravimetric analysis.

Example 2: Process of the Invention Using Lepidolite as the Mineral

Process A

Dissolution of the Mineral

Step 1:

An amount of 60 g of lepidolite was placed in a reactor and a volume of 550 ml of a lixiviating solution of HF was added thereto. This mixture was then heated under stirring until reaching 90° C., keeping this temperature constant for a period of 120 min. After this period of time, the reaction system was allowed to cool, without stirring, until reaching room temperature. Then, the reactor content was filtered, the liquid obtained was subjected to a series of separation steps and the solid obtained was dried at 75° C. and then weighed. The mineral conversion obtained was 90%, as calculated from equation (7).

Step 2:

The filtrate obtained was then treated with a concentrated NaOH solution until reaching a pH equal to or lower than 3, in these conditions, the compounds Na$_3$AlF$_6$ and Na$_2$SiF$_6$ precipitated. Then, said solids were filtrated, dried and weighed; the recovery thereof was 92%, as determined gravimetrically.

Step 3:

The filtrate obtained in Step 2 was treated with CaCO$_3$ and NaOH solutions at a pH equal to or greater than 13, in order to remove F$^-$ from the medium, accompanied by excess CaCO$_3$.

Step 4:

The filtrate obtained in Step 3, from which fluorine ion content was removed, was subjected to evaporation to reach a Li concentration in the solution close to 20 g/L. Then, the solution was cooled down to room temperature, in order to proceed with carbonation thereof by bubbling CO$_2$ (g) lowering the pH from 14 down to 6.5. Finally, the solution was heated to a temperature of 95° C., thus causing precipitation of Li as Li$_2$CO$_3$. Said precipitate was filtered, dried and weighed; recovery of Li$_2$CO$_3$ was 90%, as determined by gravimetric analysis.

Process B

Dissolution of the Mineral

An amount of 60 g of lepidolite was placed in a reactor and a volume of 550 ml of a lixiviating solution of HF together with an amount of NaCl was added thereto. This mixture was then heated under stirring until reaching 90° C., keeping this temperature constant for a period of 120 min. After this period of time, the reaction system was allowed to cool, without stirring, until reaching room temperature. Then, the reactor content was filtered, the liquid obtained was subjected to a series of separation steps and the solid obtained was dried at 75° C. and then weighed and characterized. The mineral conversion obtained was 91%, as calculated from equation (7) by AAS. Through this process, the compounds Na$_3$AlF$_6$ and Na$_2$SiF$_6$ were precipitated together. It was determined gravimetrically that the recovery of both compounds was 90%.

Step 1:

To the filtrate obtained from the dissolution of the mineral, a NaOH solution was added until reaching a pH equal to or greater than 13. The filtrate obtained in Step 1 was treated with saturated CaCO$_3$ solution in order to remove F$^-$ from the medium as solid CaF$_2$, accompanied by excess CaCO$_3$.

Step 2

The filtrate obtained in Step 1, from which fluorine ion content was removed, was subjected to evaporation to reach a Li concentration in the solution close to 20 g/L. Then, the solution was cooled down to room temperature, in order to proceed with carbonation thereof by bubbling CO$_2$ (g) lowering the pH from 14 down to 6.5. Finally, the solution was heated to a temperature of 95° C., thus causing precipitation of Li as Li$_2$CO$_3$. Said precipitate was filtered, dried and weighed, recovery of Li$_2$CO$_3$ was 90%, as determined by gravimetric analysis.

Process C

Dissolution of the Mineral

An amount of 60 g of lepidolite was placed in a reactor and a volume of 550 ml of a lixiviating solution of 20% v/v HF and 20% v/v H$_2$SO$_4$ was added thereto. This mixture was then heated under stirring until reaching 90° C., keeping this temperature constant for a period of 60 min. After this period of time, the reaction system was allowed to cool, without stirring, until reaching room temperature. Then, the reactor content was filtered, the liquid obtained was subjected to a series of separation steps and the solid obtained was dried at 75° C. and then weighed. The mineral conversion obtained was 95%, as calculated from equation (7).

Step 1:

The filtrate obtained was then treated with a concentrated NaOH solution until reaching a pH equal to or lower than 3, in these conditions, the compounds Na$_3$AlF$_6$ and Na$_2$SiF$_6$ precipitated. Then, said solids were filtrated, dried and weighed; the recovery thereof was 92%, as determined gravimetrically.

Step 2:

The filtrate obtained in Step 1 was treated with $CaCO_3$ and NaOH solutions at a pH equal to or greater than 13, in order to remove F— from the medium, accompanied by excess $CaCO_3$.

Step 3

The filtrate obtained in Step 2, from which fluorine ion content was removed, was subjected to evaporation to reach a Li concentration in the solution close to 20 g/L. Then, the solution was cooled down to room temperature, in order to proceed with carbonation thereof by bubbling $CO_2$ (g) lowering the pH from 14 down to 6.5. Finally, the solution was heated to a temperature of 95° C., thus causing precipitation of Li as $Li_2CO_3$. Said precipitate was filtered, dried and weighed; recovery of $Li_2CO_3$ was 90%, as determined by gravimetric analysis.

Process D

Dissolution of the Mineral

An amount of 60 g of lepidolite was placed in a reactor and a volume of 550 ml of a lixiviating solution of 20% v/v $H_2SO_4$ and 20% w/v NaF was added thereto. This mixture was then heated under stirring until reaching 123° C., keeping this temperature constant for a period of 120 min. After this period of time, the reaction system was allowed to cool, without stirring, until reaching room temperature. Then, the reactor content was filtered, the liquid obtained was subjected to a series of separation steps and the solid obtained was dried at 75° C. and then weighed. The mineral conversion obtained was 89%, as calculated from equation (7) by AAS. Through this process, the compounds $Na_3AlF_6$ and $Na_2SiF_6$ were precipitated together. It was determined gravimetrically that the recovery of both compounds was 93%.

Step 1:

The filtrate obtained in the lixiviation step was treated with $CaCO_3$ and NaOH solutions at a pH equal to or greater than 13, in order to remove $F^-$ from the medium, accompanied by excess $CaCO_3$.

Step 2:

The filtrate obtained in Step 1, from which fluorine ion content was removed, was subjected to evaporation to reach a Li concentration in the solution close to 20 g/L. Then, the solution was cooled down to room temperature, in order to proceed with carbonation thereof by bubbling $CO_2$ (g) lowering the pH from 14 down to 6.5. Finally, the solution was heated to a temperature of 95° C., thus causing precipitation of Li as $Li_2CO_3$. Said precipitate was filtered, dried and weighed; recovery of $Li_2CO_3$ was 90%, as determined by gravimetric analysis.

Process E

Dissolution of the Mineral

An amount of 60 g of lepidolite was placed in a reactor and a volume of 550 ml of a lixiviating solution of 20% v/v HF or 20% v/v HF and 20% v/v $H_2SO_4$ was added thereto. This mixture was then heated under stirring until reaching 90° C., keeping this temperature constant for a period of 120 min. After this period of time, the reaction system was allowed to cool, without stirring, until reaching room temperature. Then, the reactor content was filtered, the liquid obtained was subjected to a series of separation steps and the solid obtained was dried at 75° C. and then weighed. The mineral conversion obtained was 90%, as calculated from equation (7).

Step 1:

The filtrate obtained then was treated with 10% w/v KCl, thereby precipitating the compound $K_2SiF_6$. Then, the solid was filtrated, dried and weighed. The recovery thereof was 95%, as determined gravimetrically.

Step 2:

The filtrate obtained in Step 1, was then treated with a concentrated NaOH solution until reaching a pH equal to or lower than 3; at these conditions, the compound $Na_3AlF_6$ precipitated. Then, the solid was filtrated, dried and weighed; the recovery thereof was 94%, as determined gravimetrically.

Step 3

The filtrate obtained in Step 2, was subjected to evaporation at a temperature of 70° C. until obtaining a white colored precipitate corresponding to LiF. Said precipitate was filtered, dried and weighed; recovery of LiF was 95%, as determined by gravimetric analysis.

Step 4:

The filtrate obtained in Step 3 was treated with $CaCO_3$ solutions, in order to remove the remaining $F^-$ accompanied with $CaCO_3$ in excess Process F Dissolution of the Mineral An amount of 60 g of lepidolite was placed in a reactor and a volume of 550 ml of a lixiviating solution of HCl and NaF was added thereto. This mixture was then heated under stirring until reaching 123° C., keeping this temperature constant for a period of 120 min. After this period of time, the reaction system was allowed to cool, without stirring, until reaching room temperature. Then, the reactor content was filtered, the liquid obtained was subjected to a series of separation steps and the solid obtained was dried at 75° C. and then weighed. The mineral conversion obtained was 89%, as calculated from equation (7) by AAS. Through this process, the compounds $Na_3AlF_6$ and $Na_2SiF_6$ were precipitated together. It was determined gravimetrically that the recovery of both compounds was 93%.

Step 1:

The filtrate obtained in the lixiviation step was treated with $CaCO_3$ and NaOH solutions at a pH equal to or greater than 13, in order to remove $F^-$ from the medium, accompanied by excess $CaCO_3$.

Step 2:

The filtrate obtained in Step 1, from which fluorine ion content was removed, was subjected to evaporation to reach a Li concentration in the solution close to 20 g/L. Then, the solution was cooled down to room temperature, in order to proceed with carbonation thereof by bubbling $CO_2$ (g) lowering the pH from 14 down to 6.5. Finally, the solution was heated to a temperature of 95° C., thus causing precipitation of Li as $Li_2CO_3$. Said precipitate was filtered, dried and weighed; recovery of $Li_2CO_3$ was 90%, as determined by gravimetric analysis.

Process G

Dissolution of the Mineral

An amount of 60 g of lepidolite was placed in a reactor and a volume of 550 ml of a lixiviating solution of 20% v/v $HNO_3$ and 20% w/v NaF was added thereto. This mixture was then heated under stirring until reaching 123° C., keeping this temperature constant for a period of 120 min. After this period of time, the reaction system was allowed to cool, without stirring, until reaching room temperature. Then, the reactor content was filtered, the liquid obtained was subjected to a series of separation steps and the solid obtained was dried at 75° C. and then weighed. The mineral conversion obtained was 89%, as calculated from equation (7) by AAS. Through this process, the compounds $Na_3AlF_6$ and $Na_2SiF_6$ were precipitated together. It was determined gravimetrically that the recovery of both compounds was 93%.

Step 1:

The filtrate obtained in the lixiviation step was treated with $CaCO_3$ and NaOH solutions at a pH equal to or greater than 13, in order to remove $F^-$ from the medium, accompanied by excess $CaCO_3$.

Step 2:

The filtrate obtained in Step 1, from which fluorine ion content was removed, was subjected to evaporation to reach a Li concentration in the solution close to 20 g/L. Then, the solution was cooled down to room temperature, in order to proceed with carbonation thereof by bubbling $CO_2$ (g) lowering the pH from 14 down to 6.5. Finally, the solution was heated to a temperature of 95° C., thus causing precipitation of Li as $Li_2CO_3$. Said precipitate was filtered, dried and weighed, recovery of $Li_2CO_3$ was 90%, as determined by gravimetric analysis.

Process H

Dissolution of the Mineral

An amount of 60 g of lepidolite was placed in a reactor and a volume of 550 ml of a lixiviating solution of 20% w/v $H_2C_2O_4$ and 20% w/v NaF was added thereto. This mixture was then heated under stirring until reaching 123° C., keeping this temperature constant for a period of 120 min. After this period of time, the reaction system was allowed to cool, without stirring, until reaching room temperature. Then, the reactor content was filtered, the liquid obtained was subjected to a series of separation steps and the solid obtained was dried at 75° C. and then weighed. The mineral conversion obtained was 89%, as calculated from equation (7) by AAS. Through this process, the compounds $Na_3AlF_6$ and $Na_2SiF_6$ were precipitated together. It was determined gravimetrically that the recovery of both compounds was 93%.

Step 1:

The filtrate obtained in the previous step was treated with $CaCO_3$ and NaOH solutions at a pH equal to or greater than 13, in order to remove $F^-$ from the medium, accompanied by excess $CaCO_3$.

Step 2:

The filtrate obtained in Step 1, from which fluorine ion content was removed, was subjected to evaporation to reach a Li concentration in the solution close to 20 g/L. Then, the solution was cooled down to room temperature, in order to proceed with carbonation thereof by bubbling $CO_2$ (g) lowering the pH from 14 down to 6.5. Finally, the solution was heated to a temperature of 95° C., thus causing precipitation of Li as $Li_2CO_3$. Said precipitate was filtered, dried and weighed; recovery of $Li_2CO_3$ was 90%, as determined by gravimetric analysis.

Process I

Dissolution of the Mineral

An amount of 60 g of lepidolite was placed in a reactor and a volume of 550 ml of a lixiviating solution of $H_2SO_4$-KF of 20% v/v was added thereto. This mixture was then heated under stirring until reaching 123° C., keeping this temperature constant for a period of 120 min. After this period of time, the reaction system was allowed to cool, without stirring, until reaching room temperature. Then, the reactor content was filtered, the liquid obtained was subjected to a series of separation steps and the solid obtained was dried at 75° C. and then weighed. The mineral conversion obtained was 90%, as calculated from equation (7).

Step 1:

The filtrate obtained was then treated with a concentrated NaOH solution until reaching a pH equal to or lower than 3, in these conditions, the compound $Na_3AlF_6$ precipitated. Then, said solid was filtrated, dried and weighed; the recovery thereof was 92%, as determined gravimetrically.

Step 2:

The filtrate obtained in Step 1 was treated with $CaCO_3$ and NaOH solutions at a pH equal to or greater than 13, in order to remove $F^-$ from the medium, accompanied by excess $CaCO_3$.

Step 3:

The filtrate obtained in Step 2, from which fluorine ion content was removed, was subjected to evaporation to reach a Li concentration in the solution close to 20 g/L. Then, the solution was cooled down to room temperature, in order to proceed with carbonation thereof by bubbling $CO_2$ (g) lowering the pH from 14 down to 6.5. Finally, the solution was heated to a temperature of 95° C., thus causing precipitation of Li as $Li_2CO_3$. Said precipitate was filtered, dried and weighed; recovery of $Li_2CO_3$ was 90%, as determined by gravimetric analysis.

Process J

Dissolution of the Mineral

An amount of 60 g of lepidolite was placed in a reactor and a volume of 550 ml of a lixiviating solution of HCl—KF of 20% v/v was added thereto. This mixture was then heated under stirring until reaching 123° C., keeping this temperature constant for a period of 120 min. After this period of time, the reaction system was allowed to cool, without stirring, until reaching room temperature. Then, the reactor content was filtered, the liquid obtained was subjected to a series of separation steps and the solid obtained was dried at 75° C. and then weighed. The mineral conversion obtained was 90%, as calculated from equation (7).

Step 1:

The filtrate obtained was then treated with a concentrated NaOH solution until reaching a pH equal to or lower than 3; in these conditions, the compound $Na_3AlF_6$ precipitated. Then, said solid was filtrated, dried and weighed; the recovery thereof was 92%, as determined gravimetrically.

Step 2:

The filtrate obtained in Step 1 was treated with $CaCO_3$ and NaOH solutions at a pH equal to or greater than 13, in order to remove F— from the medium, accompanied by excess $CaCO_3$.

Step 3:

The filtrate obtained in Step 2, from which fluorine ion content was removed, was subjected to evaporation to reach a Li concentration in the solution close to 20 g/L. Then, the solution was cooled down to room temperature, in order to proceed with carbonation thereof by bubbling $CO_2$ (g) lowering the pH from 14 down to 6.5. Finally, the solution was heated to a temperature of 95° C., thus causing precipitation of Li as $Li_2CO_3$. Said precipitate was filtered, dried and weighed; recovery of $Li_2CO_3$ was 90%, as determined by gravimetric analysis.

Process K

Dissolution of the Mineral

An amount of 60 g of lepidolite was placed in a reactor and a volume of 550 ml of a lixiviating solution of $HNO_3$—KF of 20% v/v was added thereto. This mixture was then heated under stirring until reaching 123° C., keeping this temperature constant for a period of 120 min. After this period of time, the reaction system was allowed to cool, without stirring, until reaching room temperature. Then, the reactor content was filtered, the liquid obtained was subjected to a series of separation steps and the solid obtained was dried at 75° C. and then weighed. The mineral conversion obtained was 90%, as calculated from equation (7).

Step 1:

The filtrate obtained was then treated with a concentrated NaOH solution until reaching a pH equal to or lower than 3; in these conditions, the compound $Na_3AlF_6$ precipitated. Then, said solid was filtrated, dried and weighed; the recovery thereof was 92%, as determined gravimetrically.

Step 2:

The filtrate obtained in Step 1 was treated with $CaCO_3$ and NaOH solutions at a pH equal to or greater than 13, in order to remove $F^-$ from the medium, accompanied by excess $CaCO_3$.

Step 3:

The filtrate obtained in Step 2, from which fluorine ion content was removed, was subjected to evaporation to reach a Li concentration in the solution close to 20 g/L. Then, the solution was cooled down to room temperature, in order to proceed with carbonation thereof by bubbling $CO_2$ (g) lowering the pH from 14 down to 6.5. Finally, the solution was heated to a temperature of 95° C., thus causing precipitation of Li as $Li_2CO_3$. Said precipitate was filtered, dried and weighed; recovery of $Li_2CO_3$ was 90%, as determined by gravimetric analysis.

Process L

Dissolution of the Mineral

An amount of 60 g of lepidolite was placed in a reactor and a volume of 550 ml of a lixiviating solution of $H_2C_2O_4$—KF of 20% w/v was added thereto. This mixture was then heated under stirring until reaching 123° C., keeping this temperature constant for a period of 120 min. After this period of time, the reaction system was allowed to cool, without stirring, until reaching room temperature. Then, the reactor content was filtered, the liquid obtained was subjected to a series of separation steps and the solid obtained was dried at 75° C. and then weighed. The mineral conversion obtained was 90%, as calculated from equation (7).

Step 1:

The filtrate obtained was then treated with a concentrated NaOH solution until reaching a pH equal to or lower than 3; in these conditions, the compound $Na_3AlF_6$ precipitated. Then, said solid was filtrated, dried and weighed; the recovery thereof was 92%, as determined gravimetrically.

Step 2:

The filtrate obtained in Step 1 was treated with $CaCO_3$ and NaOH solutions at a pH equal to or greater than 13, in order to remove $F^-$ from the medium, accompanied by excess $CaCO3$.

Step 3:

The filtrate obtained in Step 2, from which fluorine ion content was removed, was subjected to evaporation to reach a Li concentration in the solution close to 20 g/L. Then, the solution was cooled down to room temperature, in order to proceed with carbonation thereof by bubbling $CO_2$ (g) lowering the pH from 14 down to 6.5. Finally, the solution was heated to a temperature of 95° C., thus causing precipitation of Li as $Li_2CO_3$. Said precipitate was filtered, dried and weighed; recovery of $Li_2CO_3$ was 90%, as determined by gravimetric analysis.

Process M

Dissolution of the Mineral

An amount of 60 g of lepidolite was placed in a reactor and a volume of 550 ml of a lixiviating solution of 20% v/v $H_2SO_4$ and 20% w/v $CaF_2$ was added thereto. This mixture was then heated under stirring until reaching 123° C., keeping this temperature constant for a period of 60 min. After this period of time, the reaction system was allowed to cool, without stirring, until reaching room temperature. Then, the reactor content was filtered, the liquid obtained was subjected to a series of separation steps and the solid obtained was dried at 75° C. and then weighed. The mineral conversion obtained was 95%, as calculated from equation (7).

Step 1:

The filtrate obtained was then treated with a concentrated NaOH solution until reaching a pH equal to or lower than 3; in these conditions, the compounds $Na_3AlF_6$ and $Na_2SiF_6$ precipitated. Then, said solids were filtrated, dried and weighed; the recovery thereof was 92%, as determined gravimetrically.

Step 2:

The filtrate obtained in Step 1 was treated with $CaCO_3$ and NaOH solutions at a pH equal to or greater than 13, in order to remove $F^-$ from the medium, accompanied by excess $CaCO_3$.

Step 3:

The filtrate obtained in Step 2, from which fluorine ion content was removed, was subjected to evaporation to reach a Li concentration in the solution close to 20 g/L. Then, the solution was cooled down to room temperature, in order to proceed with carbonation thereof by bubbling $CO_2$ (g) lowering the pH from 14 down to 6.5. Finally, the solution was heated to a temperature of 95° C., thus causing precipitation of Li as $Li_2CO_3$. Said precipitate was filtered, dried and weighed; recovery of $Li_2CO_3$ was 90%, as determined by gravimetric analysis.

Process N

Dissolution of the Mineral

An amount of 60 g of lepidolite was placed in a reactor and a volume of 550 ml of a lixiviating solution of 20% v/v $H_2SO_4$ and 20% w/v $NH_4FHF$ was added thereto. This mixture was then heated under stirring until reaching 123° C., keeping this temperature constant for a period of 120 min. After this period of time, the reaction system was allowed to cool, without stirring, until reaching room temperature. Then, the reactor content was filtered, the liquid obtained was subjected to a series of separation steps and the solid obtained was dried at 75° C. and then weighed. The mineral conversion obtained was 89%, as calculated from equation (7) by AAS. Through this process, the compounds $(NH_4)_3AlF_6$ and $(NH_4)_2SiF_6$ were precipitated together. It was determined gravimetrically that the recovery of both compounds was 93%.

Step 1:

The filtrate obtained in the previous step was treated with $CaCO_3$ and NaOH solutions at a pH equal to or greater than 13, in order to remove $F^-$ from the medium, accompanied by excess $CaCO_3$.

Step 2:

The filtrate obtained in Step 1, from which fluorine ion content was removed, was subjected to evaporation to reach a Li concentration in the solution close to 20 g/L. Then, the solution was cooled down to room temperature, in order to proceed with carbonation thereof by bubbling $CO_2$ (g) lowering the pH from 14 down to 6.5. Finally, the solution was heated to a temperature of 95° C., thus causing precipitation of Li as $Li_2CO_3$. Said precipitate was filtered, dried and weighed; recovery of $Li_2CO_3$ was 90%, as determined by gravimetric analysis.

Process O
Dissolution of the Mineral

An amount of 60 g of lepidolite was placed in a reactor and a volume of 550 ml of a lixiviating solution of 20% v/v HCl and 20% w/v $NH_4FHF$ was added thereto. This mixture was then heated under stirring until reaching 123° C., keeping this temperature constant for a period of 120 min. After this period of time, the reaction system was allowed to cool, without stirring, until reaching room temperature. Then, the reactor content was filtered, the liquid obtained was subjected to a series of separation steps and the solid obtained was dried at 75° C. and then weighed. The mineral conversion obtained was 89%, as calculated from equation (7) by AAS. Through this process, the compounds $(NH_4)_3AlF_6$ and $(NH_4)_2SiF_6$ were precipitated together. It was determined gravimetrically that the recovery of both compounds was 93%.

Step 1:

The filtrate obtained in the previous step was treated with $CaCO_3$ and NaOH solutions at a pH equal to or greater than 13, in order to remove F— from the medium, accompanied by excess $CaCO_3$.

Step 2:

The filtrate obtained in Step 1, from which fluorine ion content was removed, was subjected to evaporation to reach a Li concentration in the solution close to 20 g/L. Then, the solution was cooled down to room temperature, in order to proceed with carbonation thereof by bubbling $CO_2$ (g) lowering the pH from 14 down to 6.5. Finally, the solution was heated to a temperature of 95° C., thus causing precipitation of Li as $Li_2CO_3$. Said precipitate was filtered, dried and weighed; recovery of $Li_2CO_3$ was 90%, as determined by gravimetric analysis.

Process P
Dissolution of the Mineral

An amount of 60 g of lepidolite was placed in a reactor and a volume of 550 ml of a lixiviating solution of 20% w/v $H_2C_2O_4$ and 20% w/v $NH_4FHF$ was added thereto. This mixture was then heated under stirring until reaching 123° C., keeping this temperature constant for a period of 120 min. After this period of time, the reaction system was allowed to cool, without stirring, until reaching room temperature. Then, the reactor content was filtered, the liquid obtained was subjected to a series of separation steps and the solid obtained was dried at 75° C. and then weighed. The mineral conversion obtained was 89%, as calculated from equation (7) by AAS. Through this process, the compounds $(NH_4)_3AlF6$ and $(NH_4)_2SiF_6$ were precipitated together. It was determined gravimetrically that the recovery of both compounds was 93%.

Step 1:

The filtrate obtained in the previous step was treated with $CaCO_3$ and NaOH solutions at a pH equal to or greater than 13, in order to remove F— from the medium, accompanied by excess $CaCO_3$.

Step 2:

The filtrate obtained in Step 1, from which fluorine ion content was removed, was subjected to evaporation to reach a Li concentration in the solution close to 20 g/L. Then, the solution was cooled down to room temperature, in order to proceed with carbonation thereof by bubbling $CO_2$ (g) lowering the pH from 14 down to 6.5. Finally, the solution was heated to a temperature of 95° C., thus causing precipitation of Li as $Li_2CO_3$. Said precipitate was filtered, dried and weighed; recovery of $Li_2CO_3$ was 90%, as determined by gravimetric analysis.

The invention claimed is:

1. Process for obtaining lithium carbonate ($Li_2CO_3$), the process comprises at least the following steps:
    a) contacting aluminosilicate particles with 5-30% v/v HF wherein the aluminosilicate is selected from the group consisting of α-spodumene, lepidolite and petalite;
    b) stirring the mixture of step a) while heating until reaching a temperature above 50° C.;
    c) carrying out at least a precipitation and filtration process of the mixture of step b);
    d) adding NaOH to the filtrate of step c) until pH equal to or lower than 3; filtering and removing $Na_3AlF_6$ and $Na_2SiF_6$-precipitated;
    e) optionally adding NaOH to the filtrate of step d) until pH equal to or higher than 5; filtering and removing $Fe(OH)_3$ precipitated;
    f) adding a $Ca(OH)_2$ solution in order to remove $F^-$ from the filtrate of step e), as solid $CaF_2$; filtering and removing $CaF_2$; and
    g) recovering the lithium carbonate ($Li_2CO_3$) by carbonation of the filtrate of step f).

2. The process according to claim 1, wherein the temperature of step b) is between 75 and 220° C.

3. The process according to claim 1, wherein the solid/liquid ratio of step a) is comprised between 0.9 and 14.4% w/v.

4. The process according to claim 1, wherein the aluminosilicate particles have a particle size of between 29 and 200 μm.

5. The process according to claim 1, wherein in step b) stirring is carried out at a speed of up to 1100 rpm.

6. The process according to claim 1, wherein step a) further comprises adding NaCl at a concentration between 5 and 20% w/v.

7. The process according to claim 1, wherein step c) further comprises adding a potassium salt at a concentration between 5 and 20% w/v.

8. The process according to claim 7, wherein the potassium salt is KCl.

* * * * *

UNITED STATES PATENT AND TRADEMARK OFFICE
CERTIFICATE OF CORRECTION

PATENT NO. : 10,259,719 B2
APPLICATION NO. : 15/302434
DATED : April 16, 2019
INVENTOR(S) : Mario Humberto Rodriguez et al.

Page 1 of 1

It is certified that error appears in the above-identified patent and that said Letters Patent is hereby corrected as shown below:

On the Title Page

Item (73), should read:
CONSEJO NACIONAL DE INVESTIGACIONES CIENTIFICAS Y TECNICAS (CONICET)

Signed and Sealed this
Nineteenth Day of November, 2019

Andrei Iancu
*Director of the United States Patent and Trademark Office*